United States Patent
Murakami et al.

(10) Patent No.: US 12,052,120 B2
(45) Date of Patent: *Jul. 30, 2024

(54) TRANSMISSION APPARATUS, RECEPTION APPARATUS, TRANSMISSION METHOD, AND RECEPTION METHOD

(71) Applicant: Panasonic Intellectual Property Corporation of America, Torrance, CA (US)

(72) Inventors: Yutaka Murakami, Kanagawa (JP); Yasuaki Yuda, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/354,418

(22) Filed: Jul. 18, 2023

(65) Prior Publication Data

US 2023/0362036 A1 Nov. 9, 2023

Related U.S. Application Data

(63) Continuation of application No. 17/328,852, filed on May 24, 2021, now Pat. No. 11,757,679, which is a (Continued)

(30) Foreign Application Priority Data

Mar. 8, 2017 (JP) ................. 2017-043599

(51) Int. Cl.
*H04L 25/02* (2006.01)
*H04L 5/00* (2006.01)
*H04L 27/26* (2006.01)

(52) U.S. Cl.
CPC ........ *H04L 25/0224* (2013.01); *H04L 5/0048* (2013.01); *H04L 27/2657* (2013.01); *H04L 27/2666* (2013.01)

(58) Field of Classification Search
CPC . H04B 7/0456; H04L 5/0048; H04L 25/0224; H04L 27/261; H04L 27/2613;
(Continued)

(56) References Cited

U.S. PATENT DOCUMENTS 10,201,006 B2 2/2019 Sun et al.
10,419,087 B2 9/2019 Kim et al.
(Continued)

FOREIGN PATENT DOCUMENTS

JP 2007074763 A 3/2007
JP 2015198351 A 11/2015
WO WO 2018125910 A1 7/2018

OTHER PUBLICATIONS

3GPP, "3rd Generation Partnership Project; Technical Specification Group Radio Access Network; NR; Physical layer procedures for data (Release 15)," 3GPP TS 38.214 V1.3.0, Dec. 2017. (71 pages).
(Continued)

*Primary Examiner* — Thomas R Cairns
(74) *Attorney, Agent, or Firm* — Seed IP Law Group LLP

(57) ABSTRACT

A reception apparatus according to the present disclosure includes a receiver which, in operation, receives a downlink signal including a first data signal for the reception apparatus and first Reference Signals for Phase Tracking (PT-RS). The first data signal is mapped on a first set of subcarriers and the first PT-RS is mapped to the downlink signal based on a first Modulation and Coding Scheme (MCS) configured for the
(Continued)

first data signal. The reception apparatus according also includes a circuit which, in operation, estimates a phase noise using the first PT-RS included in the downlink signal.

6 Claims, 40 Drawing Sheets

Related U.S. Application Data continuation of application No. 16/476,063, filed as application No. PCT/JP2018/002723 on Jan. 29, 2018, now Pat. No. 11,153,125.

(58) Field of Classification Search
CPC ............ H04L 27/2627; H04L 27/2657; H04L 27/2666; H04L 27/2675; H04L 27/2695; H04W 52/16; H04W 52/325; H04W 72/04

See application file for complete search history.

(56) References Cited

U.S. PATENT DOCUMENTS

| | | |
|---|---|---|
| 2006/0189279 A1 | 8/2006 | Kobayashi et al. |
| 2011/0255637 A1 | 10/2011 | Murakami et al. |
| 2017/0078973 A1 | 3/2017 | Ohwatari et al. |
| 2018/0041321 A1 | 2/2018 | Guo et al. |
| 2018/0359071 A1 | 12/2018 | Lee et al. |
| 2018/0367277 A1 | 12/2018 | Zhang et al. |
| 2019/0158342 A1 | 5/2019 | Lee et al. |
| 2019/0222385 A1 | 7/2019 | Hessler et al. |
| 2019/0349240 A1 | 11/2019 | Saito et al. |
| 2019/0356463 A1 | 11/2019 | Zhang et al. |
| 2020/0235979 A1 | 7/2020 | Yokomakura et al. |

OTHER PUBLICATIONS

CATT, "Discussion on phase tracking RS for NR," R1-1611382, Agenda Item: 7.1.3.2, 3GPP TSG RAN WG1 Meeting #87, Reno, USA, Nov. 14-18, 2016. (3 pages).
CATT, "Further discussion on RS for phase tracking," R1-1702088, Agenda Item: 8.1.2.4.3, 3GPP TSG RAN WG1 Meeting #88, Athens, Greece, Feb. 13-17, 2017. (5 pages).
CMCC, "Phase-Tracking Reference Signal Design for High-Frequency Systems," R1-1700438, Agenda Item: 5.1.2.3.3, 3GPP TSG RAN WG1 NR Ad-Hoc Meeting, Spokane, USA, Jan. 16-20, 2017. (11 pages).
Communication pursuant to Article 94(3) EPC, dated Aug. 19, 2022, for European Patent Application No. 21150876.7. (8 pages).
Ericsson, "Design considerations for phase noise tracking RS (PTRS)," R1-1612333, Agenda Item: 7.1.3.2, 3GPP TSG-RAN WG1 #87, Reno, USA, Nov. 14-18, 2016. (4 pages).
Ericsson, "On PTRS performance," R1-1703221, Agenda Item: 8.1.2.4.3, 3GPP TSG-RAN WG1 Meeting #88, Athens, Greece, Feb. 13-17, 2017. (9 pages).
Extended European Search Report, dated Apr. 19, 2021, for European Patent Application No. 21150876.7. (11 pages).
Huawei, HiSilicon, "Further details for PT-RS design," R1-1700073, Agenda Item: 5.1.2.3.3, 3GPP TSG RAN WG1 Meeting Ad Hoc for NR, Spokane, USA, Jan. 16-20, 2017. (6 pages).
Huawei, HiSilicon, "Further details for PT-RS design," R1-1701698, Agenda Item: 8.1.2.4.3, 3GPP TSG RAN WG1 Meeting #88, Athens, Greece, Feb. 13-17, 2017. (3 pages).
Huawei, HiSilicon, "Reference signal design for phase tracking," R1-1611240, Agenda Item: 7.1.3.2, 3PP TSG RAN WG1 Meeting #87, Reno, USA, Nov. 14-18, 2016. (5 pages).
IEEE, "IEEE P802.11n(TM)/D3.00, Draft Standard for Information Technology—, Telecommunications and information exchange between systems—, Local and metropolitan area networks—, Specific requirements—, Part 11: Wireless LAN Medium Access Control (MAC) and Physical Layer (PHY) specifications: Amendment 4: Enhancements for Higher Throughput", Sep. 2007. (544 pages).
Indian Examination Report, dated Jan. 4, 2022, for Indian Patent Application No. 201947029465. (6 pages).
International Search Report, dated Apr. 17, 2018, for PCT application No. PCT/JP2018/002723, (4 pages) (with English translation).
LG Electronics, "Discussion on Phase Tracking RS for DL", R1-1702463, Agenda item: 8.1.2.4.3, 3GPP TSG RAN WGl Meeting #88, Athens, Greece, Feb. 13-17, 2017. (5 pages).
LG Electronics, "Discussion on Phase Tracking RS for UL," R1-1700485, Agenda Item: 5.1.2.3.3, 3GPP TSG RAN WG1 NR ad-hoc, Spokane, USA, Jan. 16-20, 2017. (7 pages).
NTT DOCOMO et al., "WF on PTRS," R1-1703879, Agenda item: 8.1.2.4.3, 3GPP TSG RAN WG1 Meeting #88, Athens Greece, Feb. 13-17, 2017. (2 pages).
Panasonic, "Discussion on PT-RS for DL," R1-1702297, Agenda Item: 8.1.2.4.3, 3GPP TSG RAN WG1 Meeting #88, Athens, Greece, Feb. 13-17, 2017. (3 pages).
Taiwan Search Report dated May 11, 2021 for the related Taiwan Patent Application No. 107103084. (2 pages) (English translation).
ZTE, ZTE Microelectronics, "Discussion on RS for phase tracking," R1-1701817, Agenda item: 8.1.2.4.3, 3GPP TSG RAN WG1 Meeting #88, Athens, Greece, Feb. 13-17, 2017. (9 pages).

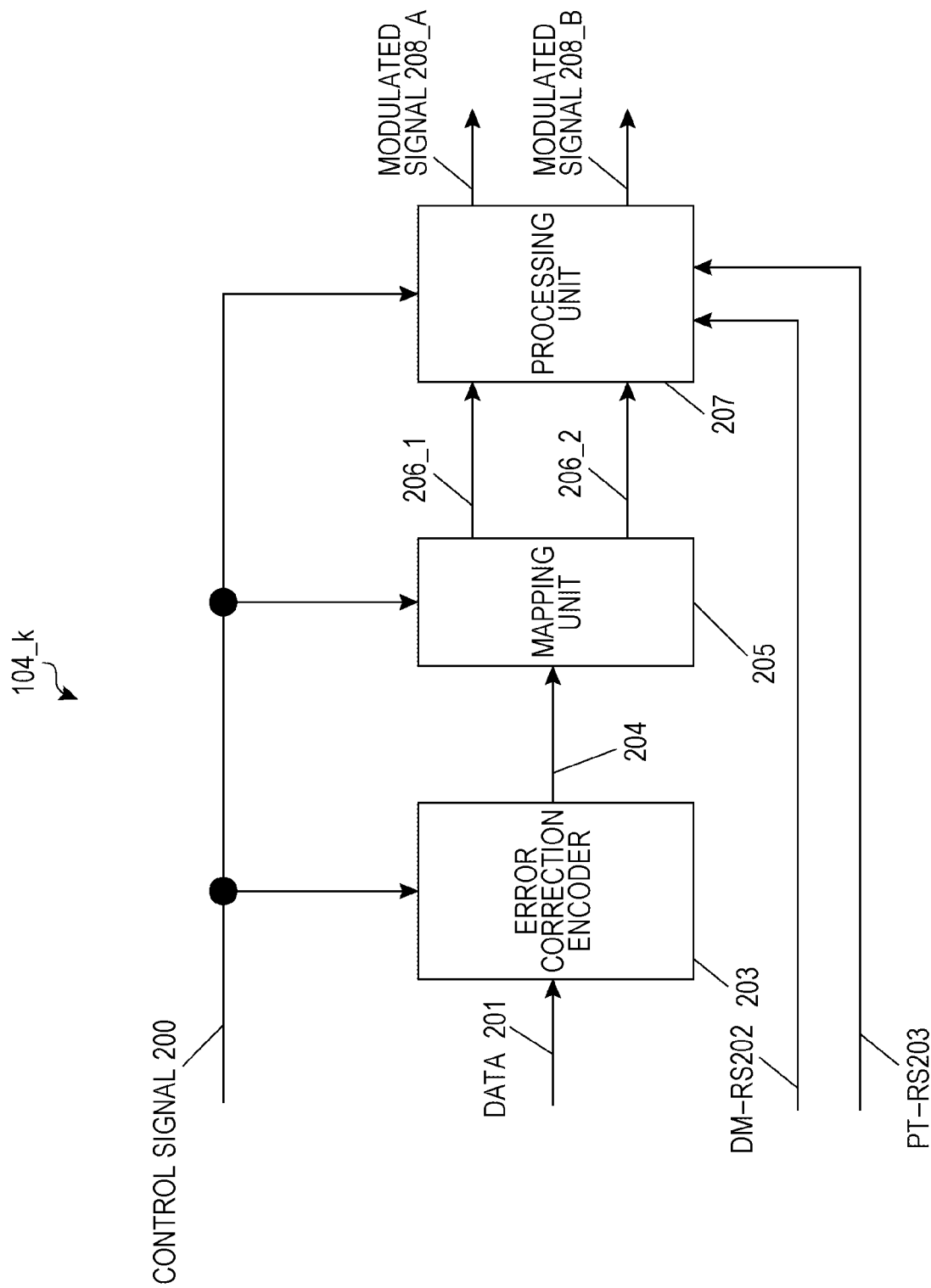

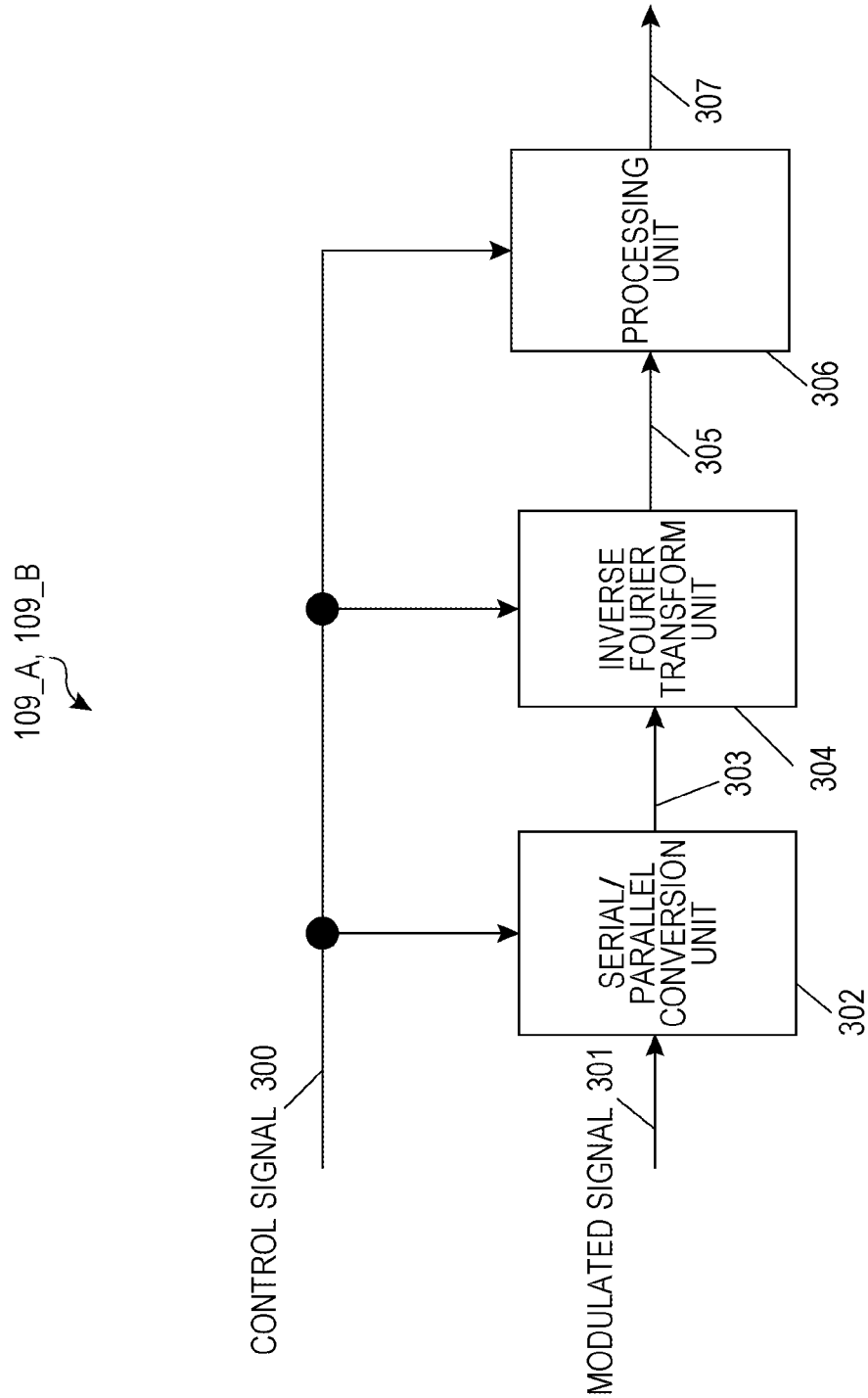

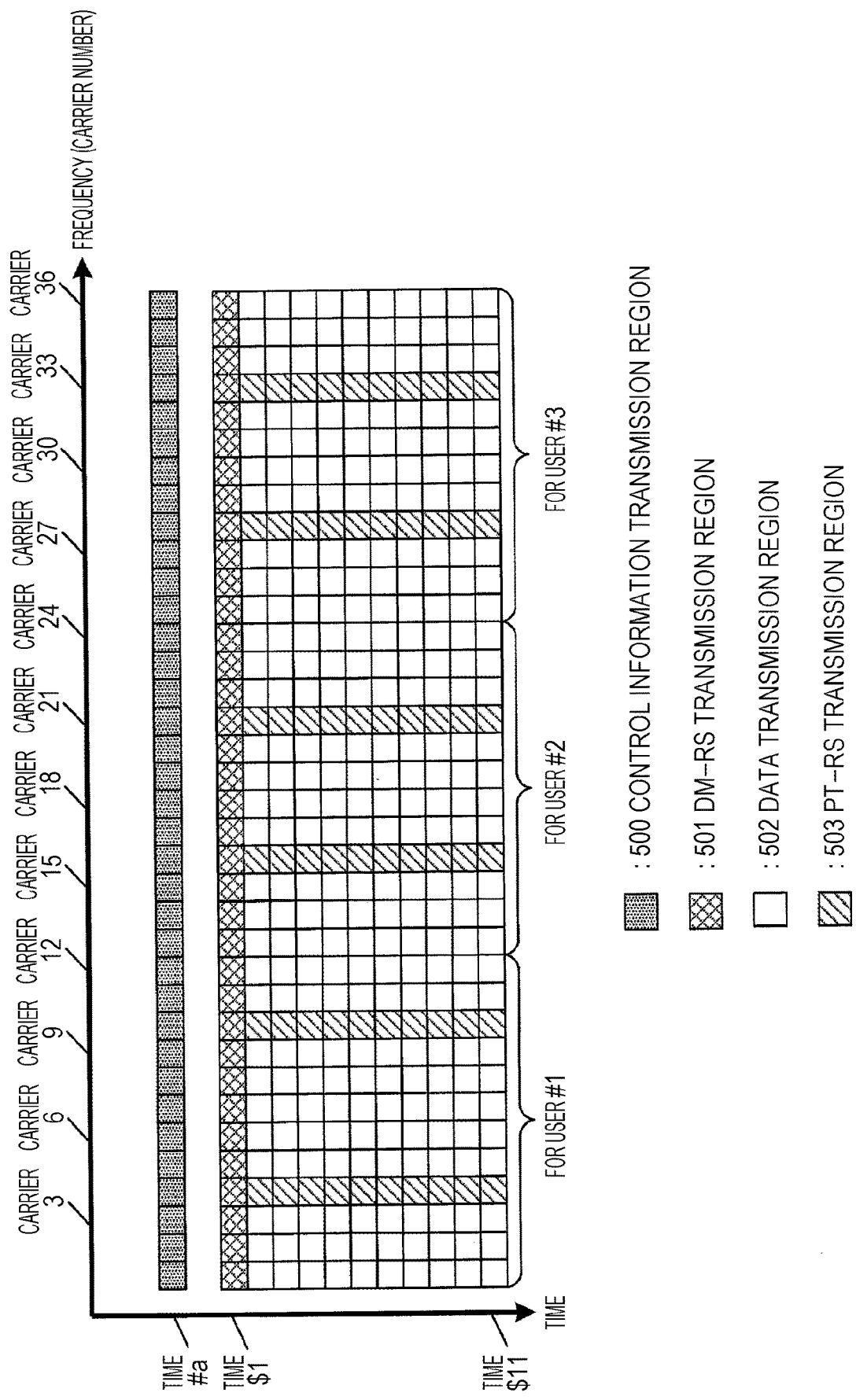

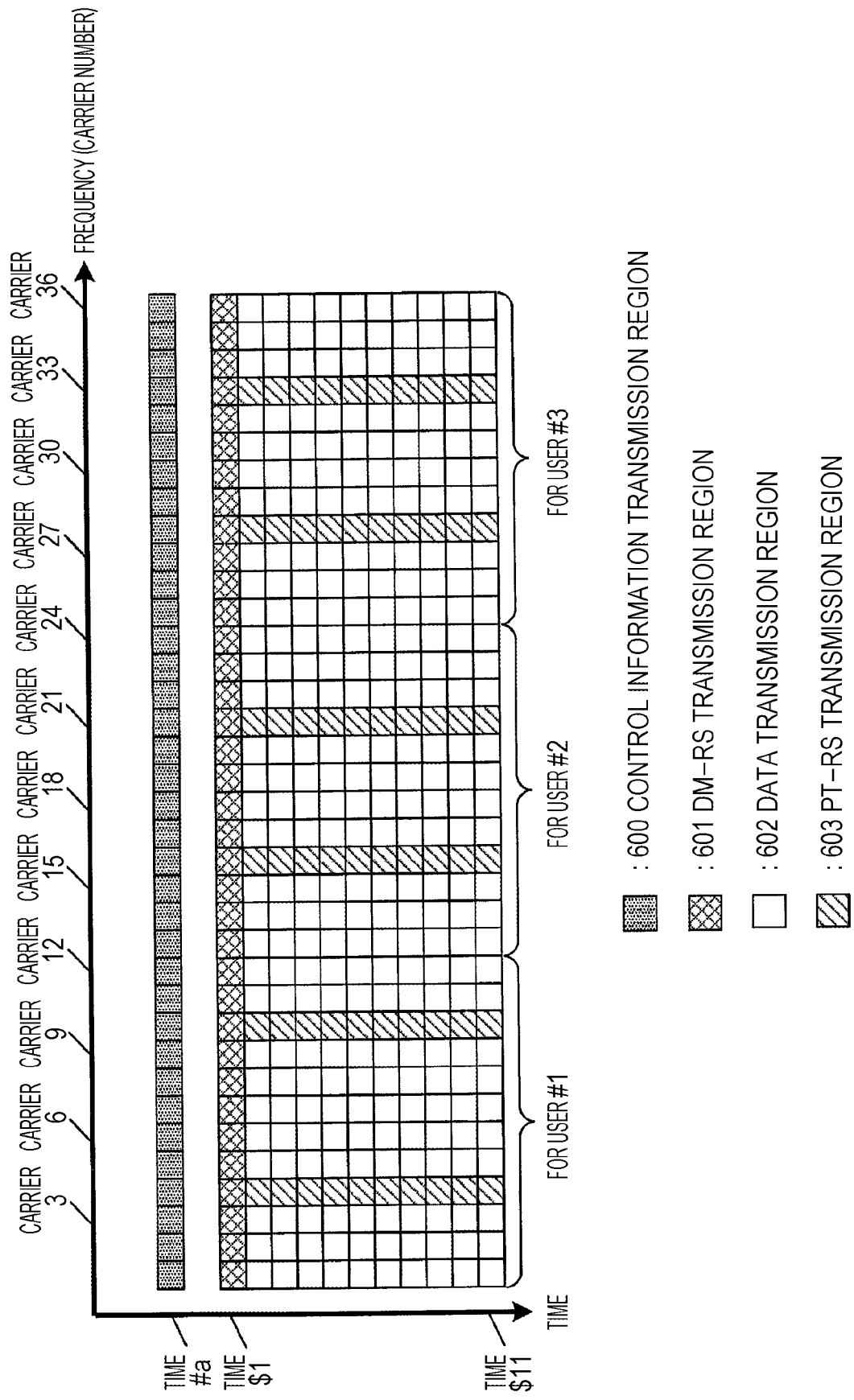

TRANSMISSION APPARATUS, RECEPTION APPARATUS, TRANSMISSION METHOD, AND RECEPTION METHOD

TECHNICAL FIELD

The present disclosure relates to a transmission apparatus, a reception apparatus, a transmission method, and a reception method.

BACKGROUND ART

In wireless communication systems, phase noise occurs in modulation signals, in relation to precision of signals generated by oscillators that a transmission apparatus and reception apparatus have. For example, in NPL 1, a transmission apparatus transmits pilot symbols (also referred to as reference signals) to a reception apparatus to estimate phase noise.

FIG. 1 illustrates an example frame confirmation of a modulated signal that the transmission apparatus disclosed in NPL 1 transmits. In FIG. 1, the horizontal axis is frequency (carrier number), with carrier 1 through carrier 36 illustrated as an example. The vertical axis is time, illustrating time $1 through time $11, as one example.

In FIG. 1, channel estimation symbols 01 are mapped to carrier 1 through carrier 36 at time $1. Also, pilot symbols 03 are mapped to carrier 4, carrier 10, carrier 16, carrier 21, carrier 28, and carrier 33 at time $2 through time $11. Also, data symbols 02 are mapped to carriers other than carrier 4, carrier 10, carrier 16, carrier 21, carrier 28, and carrier 33, at time $2 through time $11.

The transmission apparatus transmits the modulated signal of the frame configuration illustrated in FIG. 1 to a reception apparatus that is a communication partner. And the reception apparatus receives the modulated signal and estimates phase noise by using pilot symbols 03, in particular.

CITATION LIST

Non Patent Literature

NPL 1: IEEE P802.11n (D3.00) Draft STANDARD for Information Technology—Telecommunications and information exchange between systems—Local and metropolitan area networks—Specific requirements—Part 11: Wireless LAN Medium Access Control (MAC) and Physical Layer (PHY) specifications, 2007.

SUMMARY OF INVENTION

However, this does not take into consideration that there are a plurality of reception apparatuses that are communication partners of the transmission apparatus described above. Further, a transmission method of reference signals for estimating phase noise with good precision at each of the a plurality of reception apparatuses to has not been studied.

An aspect of the present disclosure provides a transmission apparatus, reception apparatus, transmission method, and reception method, where a plurality of communication partners can estimate phase noise with good precision.

A transmission apparatus according to the aspect of the present disclosure includes: a circuit that generates a modulated signal including reference signals for phase noise estimation, for a plurality of reception apparatuses, where a correction coefficient of transmission power for the reference signals is associated with a pattern of a sequence used as the reference signals, on a one-to-one basis; and a transmitter that transmits the modulated signal.

A reception apparatus according to the aspect of the present disclosure includes: a receiver that receives a modulated signal including reference signals for phase noise estimation, for a plurality of reception apparatuses, where a correction coefficient of transmission power for the reference signals is associated with a pattern of a sequence used as the reference signals, on a one-to-one basis; and a circuit that estimates phase noise using the reference signals for the plurality of reception apparatuses included in the modulated signal.

It should be noted that these general or specific embodiments may be implemented as a system, an apparatus, a method, an integrated circuit, a computer program, or a computer-readable recording medium, and may be realized by any combination of a system, apparatus, method, integrated circuit, computer program, and recording medium.

According to an aspect of the present disclosure, a plurality of communication partners can estimate phase noise with good precision.

BRIEF DESCRIPTION OF DRAWINGS

FIG. 4 is a block diagram illustrating an internal configuration example of a user #k modulated signal generator 104_k according to the first embodiment.

FIG. 6 is a block diagram illustrating an inner configuration example of wireless units 109_A and 109_B according to the first embodiment.

FIG. 7 is a diagram illustrating the frame configuration example of a modulated signal 108_A according to the first embodiment.

FIG. 8 is a diagram illustrating the frame configuration example of a modulated signal 108_B according to the first embodiment.

DESCRIPTION OF EMBODIMENTS

Embodiments of the present disclosure will be described in detail below with reference to the drawings. Note that each of the embodiments described below is an example, and the present disclosure is not restricted by these embodiments.

Note that in the following a reference signal for estimating phase noise will be described as PT-RS (Reference Signal for Phase Tracking), and a reference signal for data demodulation will be referred to as DM-RS (Demodulation Reference Signal).

First Embodiment

A transmission apparatus, reception apparatus, transmission method, and reception method, according to the present disclosure, will be described in detail.

[Example of Communication State]

Figure 1:
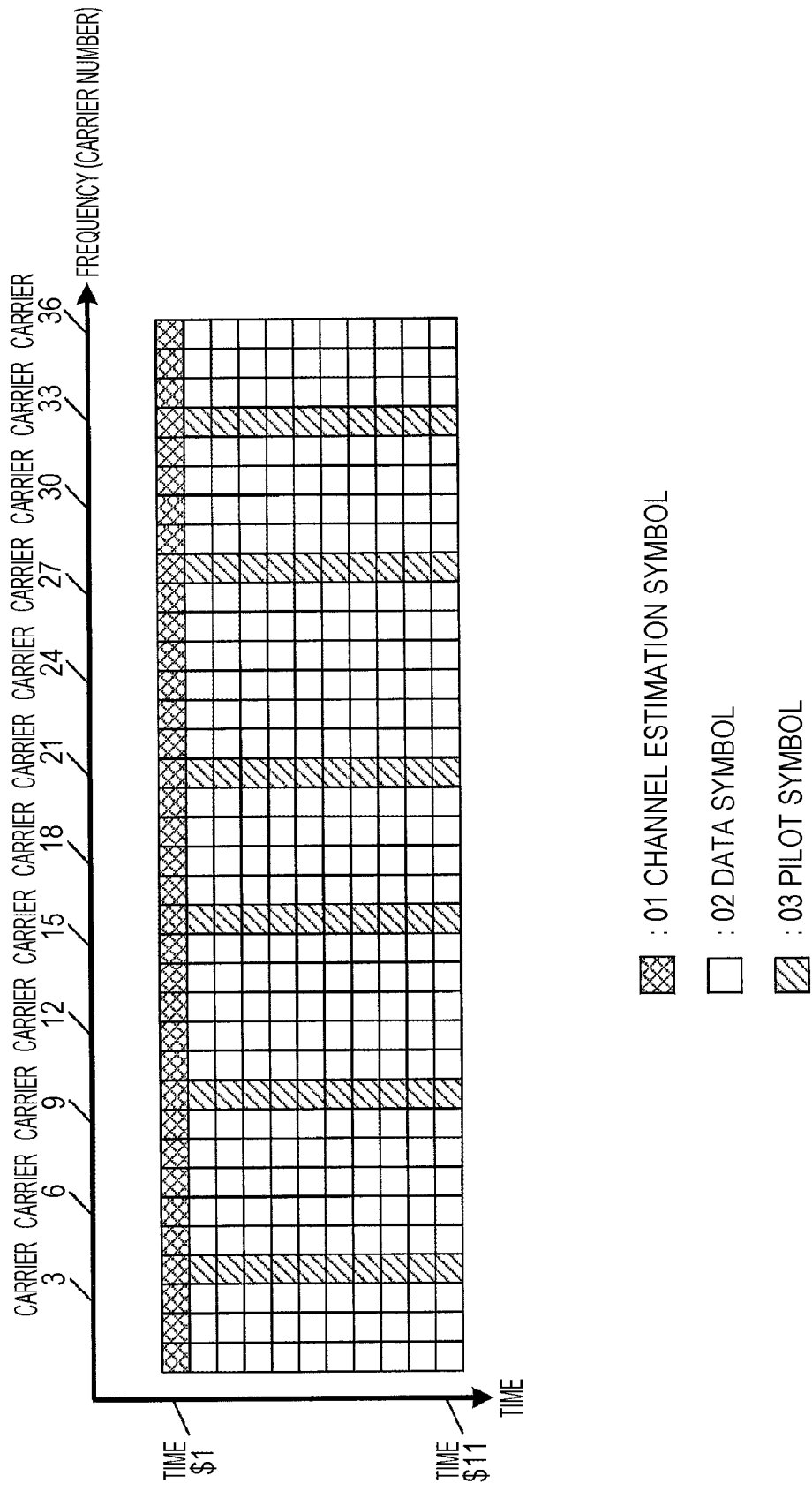
FIG. 1 is a diagram illustrating an example of a frame configuration of a modulated signal.
Figure 2:
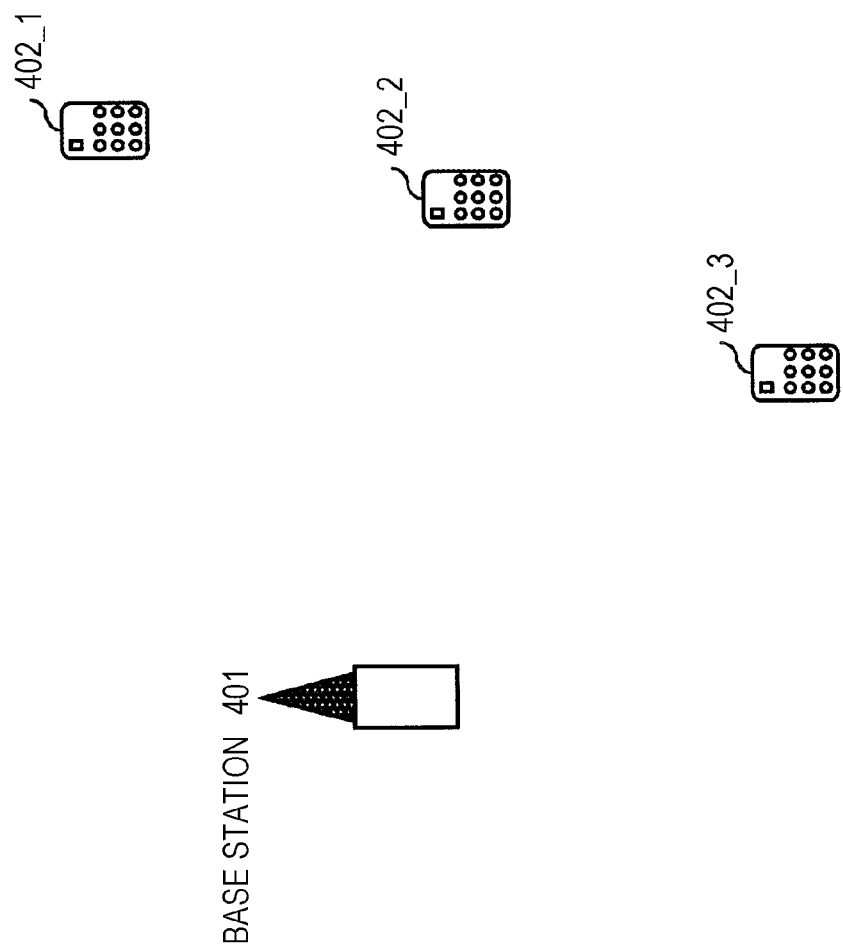
FIG. 2 is a diagram illustrating an example of a communication state between a base station and terminal according to a first embodiment.

FIG. 2 illustrates an example of the communication state between a base station (transmission apparatus) and a terminal (reception apparatus) according to the present embodiment. A base station 401 illustrated in FIG. 2 has the configuration of a later-described transmission apparatus (FIG. 3), for example. Also, terminals 402_1, 402_2, and 402_3 illustrated in FIG. 2, have the configuration of a later-described reception apparatus (FIG. 9), for example.

For example, the base station 401 transmits modulated signals to the terminals 402_1, 402_2, and 402_3. The terminals 402_1, 402_2, and 402_3 estimate phase noise using the PT-RS included in the modulated signals transmitted from the base station 401.

[Configuration of Transmission Apparatus]

Figure 3:
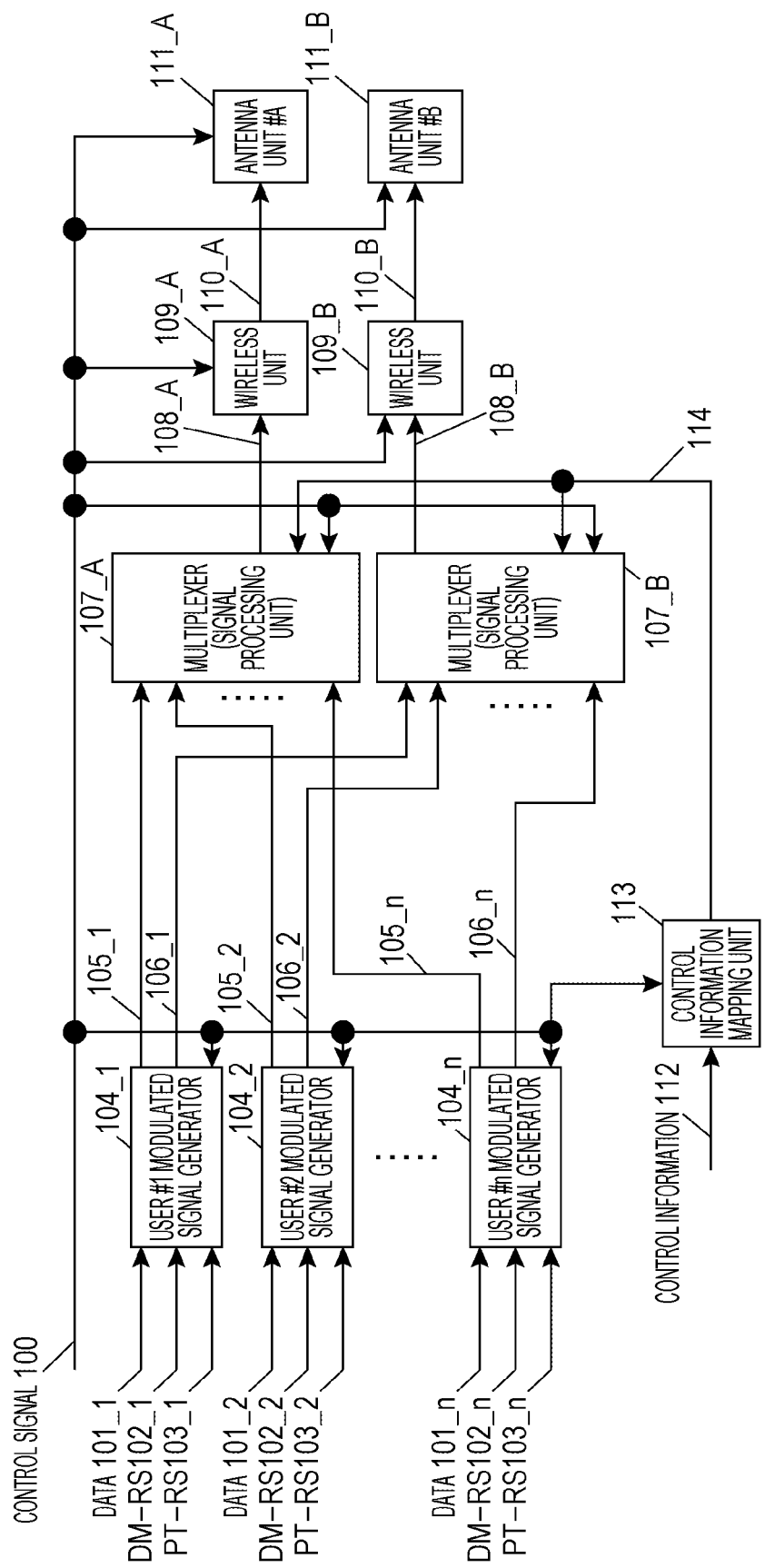
FIG. 3 is a block diagram illustrating a configuration example of a transmission apparatus according to the first embodiment.

FIG. 3 is a block diagram illustrating a configuration example of a transmission apparatus according to the present embodiment. The transmission apparatus illustrated in FIG. 3 is, for example, the base station 401 illustrated in FIG. 2, an access point, or the like.

In FIG. 3, a user #k modulated signal generator 104-$k$ (where k is an integer of 1 or greater but 3 or smaller, for example) takes input of data 101_$k$, DM-RS 102_$k$, PT-RS 103_$k$, and control signals 100. The user #k modulated signal generator 104-$k$ generates and outputs modulated signals 105_$k$ and 106_$k$ of the user #k, based on information regarding the frame configuration, modulation scheme, error correction encoding method, and so forth, included in the control signals 100.

A control information mapping unit 113 takes input of control information 112 and control signals 100, performs mapping for the control information 112 based on information such as frame configuration and the like included in the control signals 100, and outputs control information signals 114.

A multiplexer (signal processing unit) 107_A takes input of a modulated signal 105_1 of user #1, a modulated signal 105_2 of user #2, . . . , a modulated signal 105_$n$−1 of user #n−1, a modulated signal 105_$n$ of user #n, control signals 100 and control information signals 114. The multiplexer 107_A generates and outputs modulated signals 108_A following the frame configuration, based on the information such as frame configuration and so forth included in the control signals 100.

In the same way, a multiplexer (signal processing unit) 107_B takes input of a modulated signal 106_1 of user #1, a modulated signal 106_2 of user #2, . . . , a modulated signal 106_n–1 of user #n–1, a modulated signal 106_n of user #n, control signals 100 and control information signals 114. The multiplexer 107_B generates and outputs a modulated signal 108_B following the frame configuration, based on the information such as frame configuration and so forth included in the control signals 100.

A wireless unit 109_A takes as input the modulated signal 108_A following the frame format, and the control signals 100. The wireless unit 109_A performs wireless-related processing on the modulated signal 108_A, and generates transmission signal 110_A, in accordance with the control signal 100. The transmission signal 110_A is output as radio waves from an antenna unit #A (111_A).

In the same way, a wireless unit 109_B takes as input the modulated signal 108_B following the frame format, and the control signal 100. The wireless unit 109_B performs wireless-related processing on the modulated signal 108_B, and generates a transmission signal 110_B, in accordance with the control signal 100. The transmission signal 110_B is output as radio waves from an antenna unit #B (111_B).

The antenna unit #A (111_A) takes the control signals 100 as input. The antenna unit #A (111_A) may perform transmission directionality control following the control signals 100. The antenna unit #A (111_A) does not have to have the control signals 100 as input. In the same way, the antenna unit #B (111_B) takes the control signals 100 as input. The antenna unit #B (111_B) may perform transmission directionality control following the control signals 100. The antenna unit #B (111_B) does not have to have the control signals 100 as input.

[Configuration Example of User #k Modulated Signal Generator 104-$k$]

FIG. 4 is a block diagram illustrating an internal configuration example of the user #k modulated signal generator 104-$k$ illustrated in FIG. 3.

In FIG. 4, an error correction encoder 203 takes data 201 (equivalent to the data 101_$k$ in FIG. 3) and a control signal 200 (equivalent to the control signals 100 in FIG. 3) as input. The error correction encoder 203 performs error correction encoding on the data 201 based on information relating to the error correction encoding format included in the control signal 200 (e.g., information of error correction encoding, code rate, block length, etc.) and so forth, and outputs post-error-correction-encoding data 204.

A mapping unit 205 takes the post-error-correction-encoding data 204 and control signal 200 as input. The mapping unit 205 performs mapping for the post-error-correction-encoding data 204 based on the modulation scheme information included in the control signal 200, and outputs post-mapping baseband signals 206_1 and 206_2. Note that in the following, the post-mapping baseband signals 206_1 will be referred to as stream #X1, and the post-mapping baseband signals 206_2 will be referred to as stream #X2.

A processing unit 207 takes as input the post-mapping baseband signals 206_1 and 206_2, a DM-RS 202 (equivalent to the DM-RS 102_$k$ in FIG. 3), a PT-RS (equivalent to the PT-RS 103_$k$ in FIG. 3), and the control signal 200. The processing unit 207 performs predetermined processing (e.g., precoding, changing transmission power, CDD (CSD), and like processing), based on information relating to the frame configuration included in the control signal 200, information relating to precoding, information of transmission power, information relating to CDD (Cyclic Delay Diversity) (CSD (Cyclic Shift Diversity)), and so forth, and outputs modulated signal 208_A (equivalent to the modulated signal 105_$k$ in FIG. 3) and 208_B (equivalent to the modulated signal 106_$k$ in FIG. 3).

In the following, the modulated signal 208_A will be expressed as "u1($i$)", and the modulated signal 208_B will be expressed as "u2($i$)". Note that i is a symbol number.

When performing precoding processing, the processing unit 207 may switch precoding (matrix) used in precoding processing in increments of a plurality of symbols, and may perform precoding cycling processing where of switching precoding (matrix) used in precoding processing in increments of symbols. Alternatively, the processing unit 207 does not have to perform precoding processing.

[Example Frame Configuration of Modulated Signals]

Figure 5A:
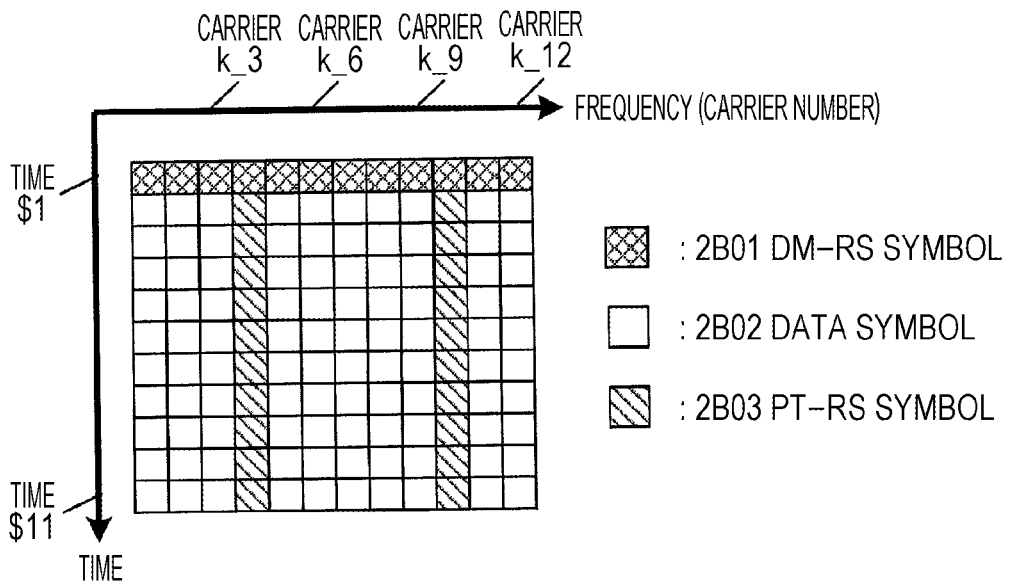
FIG. 5A is a diagram illustrating an example of the frame configuration of data symbols, DM-RS symbols, and PT-RS symbols of a stream #X1 according to the first embodiment.

FIG. 5A illustrates an example of the frame configuration of post-mapping baseband signal 206_1 after mapping by the mapping unit 205 in FIG. 4 (i.e., data symbols of the stream #X1), DM-RS symbols of the stream #X1 added to the data symbols of the stream #X1, and PT-RS symbols of stream #X1. Note that the user # is k.

In FIG. 5A, the horizontal axis is frequency (carrier number), illustrating carrier k_1 to carrier k_12 as an example. The vertical axis in FIG. 5A is time, illustrating time $1 through time $11 as an example. "2B01" in FIG. 5A is the DM-RS symbol of the stream #X1, "2B02" is the data symbol of the stream #X1, and "2B03" is the PT-RS symbol of the stream #X1.

Figure 5B:
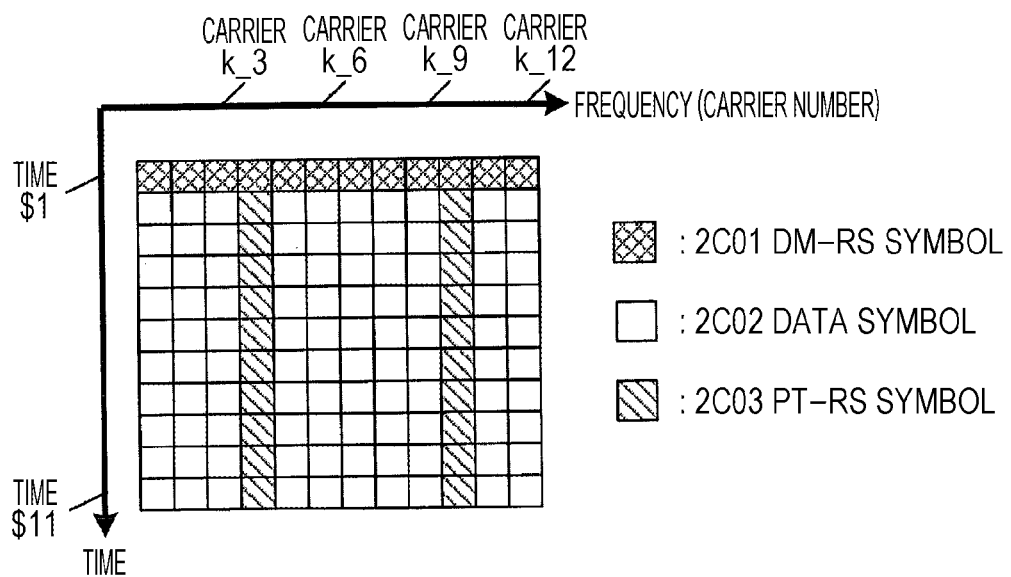
FIG. 5B is a diagram illustrating an example of the frame configuration of data symbols, DM-RS symbols, and PT-RS symbols of a stream #X2 according to the first embodiment.

FIG. 5B illustrates an example of the frame configuration of post-mapping baseband signals 206_2 after mapping by the mapping unit 205 in FIG. 4 (i.e., data symbols of the stream #X2), DM-RS symbols of the stream #X2 added to the data symbols of the stream #X2, and PT-RS symbols of stream #X2. Note that the user # is k.

In FIG. 5B, the horizontal axis is frequency (carrier number), illustrating carrier k_1 to carrier k_12 as an example. The vertical axis in FIG. 5B is time, illustrating time $1 through time $11 as an example. "2C01" in FIG. 5B is the DM-RS symbol of the stream #X2, "2C02" is the data symbol of the stream #X2, and "2C03" is the PT-RS symbol of the stream #X2.

That is to say, the DM-RS 202 illustrated in FIG. 4 includes the DM-RS symbol (2B01) of the stream #X1 and the DM-RS symbol (2C01) of the stream #X2. Also, the PT-RS 203 illustrated in FIG. 4 includes the PT-RS symbol (2B03) of the stream #X1 and the DM-RS symbol (2C03) of the stream #X2.

The processing unit 207 generates the modulated signal 208_A of the stream #X1 based on the frame configuration illustrated in FIG. 5A based on the frame configuration information included in the control signal 200, and the modulated signal 208_B of the stream #X2 based on the frame configuration illustrated in FIG. 5B.

The frame is made up of the DM-RS symbol 2B01 of the stream #X1, data symbol 2B02 of the stream #X1, and the PT-RS symbol of the stream #X1, as illustrated in FIG. 5A. Specifically, in FIG. 5A, the DM-RS symbol 2B01 of the stream #X1 is positioned at time $1, the PT-RS symbol 2B03 of the stream #X1 is positioned at carrier k_4 and carrier _k10 at time $2 through time $11, and the data symbol 2B02 of the stream #X1 is positioned at carriers other than carrier k_4 and carrier _k10 at time $2 through time $11.

In the same way, the frame is made up of the DM-RS symbol 2C01 of the stream #X2, data symbol 2C02 of the stream #X2, and the PT-RS symbol of the stream #X2, as illustrated in FIG. 5B. Specifically, in FIG. 5B, the DM-RS symbol 2C01 of the stream #X2 is positioned at time $1, the PT-RS symbol 2C03 of the stream #X2 is positioned at carrier k_4 and carrier _k10 at time $2 through time $11, and the data symbol 2C02 of the stream #X2 is positioned at carriers other than carrier k_4 and carrier _k10 at time $2 through time $11.

Symbols at the same time in FIG. 5A and FIG. 5B, and of the same carrier, are transmitted using a plurality of antenna units (111_A and 111_B)

[Configuration Example of Wireless Units 109_A and 109_B]

FIG. 6 is a block diagram illustrating an internal configuration example of the wireless units 109_A and 109_B in FIG. 3.

In FIG. 6, a serial/parallel conversion unit 302 takes as input modulated signal 301 following the frame configuration (equivalent to modulated signals 108_A or modulated signal 108_B following the frame configuration in FIG. 3), and a control signal 300 (equivalent to the control signals 100 in FIG. 3). The serial/parallel conversion unit 302 performs serial/parallel conversion of the modulated signal 301 based on the control signal 300, and outputs signal 303.

An inverse Fourier transform unit 304 takes the signal 303 and control signal 300 as input. The inverse Fourier transform unit 304 subjects the signals 303 to inverse Fourier transform based on the control signal 300, and outputs post-inverse-Fourier-transform signal 305.

The processing unit 306 takes as input the post-inverse-Fourier-transform signals 305 and control signal 300. The processing unit 306 subjects the post-inverse-Fourier-transform signal 305 to signal processing (e.g., CDD, CSD, or phase change or the like) based on the control signal 300, and outputs post-processing signal 307 (equivalent to transmission signals 110_A or transmission signals 110_B in FIG. 3).

Note that the processing unit 306 does not have to perform signal processing. In this case, the post-inverse-Fourier-transform signal 305 become the post-processing signals 307 without change. Also, the wireless units 109_A and 109_B do not need to have the processing unit 306. In this case, the post-inverse-Fourier-transform signals 305 are the output of the wireless units 109_A and 109_B (i.e., equivalent to transmission signals 110_A or transmission signals 110_B). The wireless units 109_A and 109_B do not have to perform CDD or CSD processing.

[Example Frame Configuration of Modulated Signals 108_A and 108_B]

FIG. 7 illustrates an example of the configuration of the frame configuration of the modulated signal 108_A that the base station 401 illustrated in FIG. 2 (transmission apparatus illustrated in FIG. 3) transmits. In FIG. 7, the horizontal axis is frequency (carrier number), with carrier 1 through carrier 36 illustrated as an example. The vertical axis is time, illustrating time #a and time $1 through time $11.

The frame illustrated in FIG. 7 is configured of a control information transmission region 500, a DM-RS transmission region 501, a data transmission region 502, and a PT-RS transmission region 503.

Now, in FIG. 7, the transmission region existing from carrier 1 through carrier 12 from time $1 to time $11 is a transmission region for the terminal 402_1 illustrated in FIG. 2 (transmission region directed to terminal 402_1). Hereinafter, the transmission region for the terminal 402_1 will be referred to as transmission region for user #1, as illustrated in FIG. 7.

In the same way, in FIG. 7, the transmission region existing from carrier 13 through carrier 24 from time $1 to time $11 is a transmission region for the terminal 402_2 illustrated in FIG. 2 (transmission region directed to terminal 402_2). Hereinafter, the transmission region for the terminal 402_2 will be referred to as transmission region for user #2, as illustrated in FIG. 7.

Also, in FIG. 7, the transmission region existing from carrier 25 through carrier 36 from time $1 to time $11 is a transmission region for the terminal 402_3 illustrated in FIG. 2 (transmission region directed to terminal 402_3). Hereinafter, the transmission region for the terminal 402_3 will be referred to as transmission region for user #3, as illustrated in FIG. 7.

Control information transmission region 500 is placed at time #a in FIG. 7. The control information transmission region 500 may include for example, the position of presence in the frame of the transmission region for user #1, the transmission region for user #2, and the transmission region for user #3, information relating to the modulation scheme of each transmission region, information relating to error correction encoding, information relating to precoding matrix, information relating to transmission method, and so forth. Note that while the control information transmission region 500 is illustrated as being placed at time #a in the example in of the frame configuration FIG. 7, the position of presence of the control information transmission region 500 is not restricted to this, and various examples can be conceived, such as being present in one of the carriers, being present at one of the times, being present in one of the carrier-time regions, and so forth.

In the transmission region for user #1 illustrated in FIG. 7, the DM-RS transmission region 501 is placed at time $1, the PT-RS transmission region 503 is placed at carrier 4 and carrier 10 at time $2 through time $11, and the data transmission region 502 is placed at carriers other than carrier 4 and carrier 10 at time $2 through time $11.

In the same way, in the transmission region for user #2 illustrated in FIG. 7, the DM-RS transmission region 501 is placed at time $1, the PT-RS transmission region 503 is placed at carrier 16 and carrier 21 at time $2 through time $11, and the data transmission region 502 is placed at carriers other than carrier 16 and carrier 21 at time $2 through time $11.

Also, in the transmission region for user #3 illustrated in FIG. 7, the DM-RS transmission region 501 is placed at time $1, the PT-RS transmission region 503 is placed at carrier 28 and carrier 33 at time $2 through time $11, and the data transmission region 502 is placed at carriers other than carrier 28 and carrier 33 at time $2 through time $11.

Note that the frame configuration illustrated in FIG. 7 is one example, and the configuration of the count of carriers and time is not restricted to the configuration illustrated in FIG. 7. Transmission regions other than the transmission regions illustrated in FIG. 7 may exist, and the layout of the transmission regions as to the frame is not restricted to the configuration in FIG. 7.

Next, a frame configuration example of the modulated signal 108_B will be described.

FIG. 8 illustrates an example of the configuration of the frame configuration of the modulated signal 108_B that the base station 401 illustrated in FIG. 2 (transmission apparatus illustrated in FIG. 3) transmits. In FIG. 8, the horizontal axis is frequency (carrier number), with carrier 1 through carrier 36 illustrated as an example. The vertical axis is time, illustrating time #a and time $1 through time $11.

The frame illustrated in FIG. 8 is configured of a control information transmission region 600, a DM-RS transmission region 601, a data transmission region 602, and a PT-RS transmission region 603.

Now, in FIG. 8, the transmission region existing from carrier 1 through carrier 12 from time $1 to time $11 is a transmission region for the terminal 402_1 illustrated in FIG. 2 (transmission region directed to terminal 402_1). Hereinafter, the transmission region for the terminal 402_1 will be referred to as transmission region for user #1, as illustrated in FIG. 8.

In the same way, in FIG. 8, the transmission region existing from carrier 13 through carrier 24 from time $1 to time $11 is a transmission region for the terminal 402_2 illustrated in FIG. 2 (transmission region directed to terminal 402_2). Hereinafter, the transmission region for the terminal 402_2 will be referred to as transmission region for user #2, as illustrated in FIG. 8.

Also, in FIG. 8, the transmission region existing from carrier 25 through carrier 36 from time $1 to time $11 is a transmission region for the terminal 402_3 illustrated in FIG. 2 (transmission region directed to terminal 402_3). Hereinafter, the transmission region for the terminal 402_3 will be referred to as transmission region for user #3, as illustrated in FIG. 8.

Control information transmission region 600 is placed at time #a in FIG. 8. The control information transmission region 600 may include for example, the position of presence in the frame of the transmission region for user #1, the transmission region for user #2, and the transmission region for user #3, information relating to the modulation scheme of each transmission region, information relating to error correction encoding, information relating to precoding matrix, information relating to transmission method, and so forth. Note that while the control information transmission region 600 is illustrated as being placed at time #a in the example of the frame configuration in FIG. 8, the position of presence of the control information transmission region 600 is not restricted to this, and various examples can be conceived, such as being present in one of the carriers, being present at one of the times, being present in one of the carrier-time regions, and so forth.

In the transmission region for user #1 illustrated in FIG. 8, the DM-RS transmission region 601 is placed at time $1, the PT-RS transmission region 603 is placed at carrier 4 and carrier 10 at time $2 through time $11, and the data transmission region 602 is placed at carriers other than carrier 4 and carrier 10 at time $2 through time $11.

In the same way, in the transmission region for user #2 illustrated in FIG. 8, the DM-RS transmission region 601 is placed at time $1, the PT-RS transmission region 603 is placed at carrier 16 and carrier 21 at time $2 through time $11, and the data transmission region 602 is placed at carriers other than carrier 16 and carrier 21 at time $2 through time $11.

Also, in the transmission region for user #3 illustrated in FIG. 8, the DM-RS transmission region 601 is placed at time $1, the PT-RS transmission region 603 is placed at carrier 28 and carrier 33 at time $2 through time $11, and the data transmission region 602 is placed at carriers other than carrier 28 and carrier 33 at time $2 through time $11.

Note that the frame configuration illustrated in FIG. 8 is one example, and the configuration of the count of carriers and time is not restricted to the configuration illustrated in FIG. 8. Transmission regions other than the transmission regions illustrated in FIG. 8 may exist, and the layout of the transmission regions as to the frame is not restricted to the configuration in FIG. 8.

Also, at the time of the PT-RS transmission regions 503 and 603 for particular carriers being laid out as illustrated in FIG. 7 and FIG. 8, the number of carriers where the PT-RS transmission regions 503 and 603 are placed is not restricted to two carriers for the transmission region of each user, and similar implementation can be carried out as long as the PT-RS transmission regions 503 and 603 are placed at one or more carriers. There also may be cases where the PT-RS transmission regions 503 and 603 are not placed in the transmission region of a certain user. Further, a configuration may be made where the PT-RS transmission regions 503 and 603 are placed in a certain carrier region at a certain time.

[Relation Between Symbols and Transmission Regions]

Next, the relation between "symbols" described in FIG. 5A and FIG. 5B, and "transmission regions" described in FIG. 7 and FIG. 8 will be described. Note that description will be made below regarding user #k.

The processing unit 207 illustrated in FIG. 4 also performs precoding processing, as described above. Signals before precoding are expressed below as s1($i$) and s2($i$), where i is the symbol number.

That is to say, the signal s1($i$) before precoding includes the data symbol of the stream #X1 (post-mapping baseband signal 206_1) (2B02), the DM-RS symbol of the stream #X1 (2B01), and the PT-RS symbol of the stream #X1 (2B03). In the same way, the signal s2($i$) before precoding includes the data symbol of the stream #X2 (post-mapping baseband signal 206_2) (2C02), the DM-RS symbol of the stream #X2 (2C01), and the PT-RS symbol of the stream #X2 (2C03).

<About Data Symbols>

Of the signals s1($i$) before precoding, the data symbol of the stream #X1 (2B02) is written as "sD1($i$)", and of the signals s2($i$) before precoding, the data symbol of the stream #X2 (2C02) is written as "sD2($i$)".

Also, of the modulated signal 208_A that is the output of the processing unit 207 illustrated in FIG. 4, the signals of the data transmission region 502 illustrated in FIG. 7 are written as "uD1($i$)", and of the modulated signal 208_B that is the output of the processing unit 207 illustrated in FIG. 4, the signals of the data transmission region 602 illustrated in FIG. 8 are written as "uD2($i$)".

The precoding matrix (of the user #k) will written as F, the matrix relating to CDD (of the user #k) as W, and values of change in level of transmission (power) (hereinafter "correction coefficients") as α1 and α2.

At this time, the following expressions hold. Note however, that α1 and α2 can be defined by complex numbers or real numbers, may be set for each user, may be set in increments of a plurality of symbols, may be set in increments of symbols, or may be fixed values. Note that in a case where no change of transmission level is performed, this is expressed as α1=α2=1, and computation of change to transmission level is not performed in the following Expressions.

Case of performing precoding and not performing CDD:

[Math 1]

$$\begin{pmatrix} uD1(i) \\ uD2(i) \end{pmatrix} = F \times \begin{pmatrix} \alpha 1 & 0 \\ 0 & \alpha 2 \end{pmatrix} \begin{pmatrix} sD1(i) \\ sD2(i) \end{pmatrix} \qquad \text{Expression (1)}$$

Alternatively,

[Math 2]

$$\begin{pmatrix} uD1(i) \\ uD2(i) \end{pmatrix} = \begin{pmatrix} \alpha 1 & 0 \\ 0 & \alpha 2 \end{pmatrix} \times F \times \begin{pmatrix} sD1(i) \\ sD2(i) \end{pmatrix} \quad \text{Expression (2)}$$

Case of performing precoding and performing CDD:

[Math 3]

$$\begin{pmatrix} uD1(i) \\ uD2(i) \end{pmatrix} = W \times F \times \begin{pmatrix} \alpha 1 & 0 \\ 0 & \alpha 2 \end{pmatrix} \begin{pmatrix} sD1(i) \\ sD2(i) \end{pmatrix} \quad \text{Expression (3)}$$

Alternatively,

[Math 4]

$$\begin{pmatrix} uD1(i) \\ uD2(i) \end{pmatrix} = \begin{pmatrix} \alpha 1 & 0 \\ 0 & \alpha 2 \end{pmatrix} \times W \times F \times \begin{pmatrix} sD1(i) \\ sD2(i) \end{pmatrix} \quad \text{Expression (4)}$$

Case of not performing precoding and not performing CDD:

[Math 5]

$$\begin{pmatrix} uD1(i) \\ uD2(i) \end{pmatrix} = \begin{pmatrix} \alpha 1 & 0 \\ 0 & \alpha 2 \end{pmatrix} \begin{pmatrix} sD1(i) \\ sD2(i) \end{pmatrix} \quad \text{Expression (5)}$$

Case of not performing precoding and performing CDD:

[Math 6]

$$\begin{pmatrix} uD1(i) \\ uD2(i) \end{pmatrix} = W \times \begin{pmatrix} \alpha 1 & 0 \\ 0 & \alpha 2 \end{pmatrix} \begin{pmatrix} sD1(i) \\ sD2(i) \end{pmatrix} \quad \text{Expression (6)}$$

Alternatively, $$\begin{pmatrix} uD1(i) \\ uD2(i) \end{pmatrix} = \begin{pmatrix} \alpha 1 & 0 \\ 0 & \alpha 2 \end{pmatrix} \times W \times \begin{pmatrix} sD1(i) \\ sD2(i) \end{pmatrix} \quad \text{[Math 7]}$$

<About DM-RS Symbols>

Of the signals s1($i$) before precoding, the DM-RS symbol of the stream #X1 (2B01) is written as "sDR1($i$)", and of the signals s2($i$) before precoding, the DM-RS symbol of the stream #X2 (2C01) is written as "sDR2($i$)".

Also, of the modulated signal 208_A that is the output of the processing unit 207 illustrated in FIG. 4, the signals of the DM-RS transmission region 501 illustrated in FIG. 7 are written as "uDR1($i$)", and of the modulated signal 208_B that is the output of the processing unit 207 illustrated in FIG. 4, the signals of the DM-RS transmission region 601 illustrated in FIG. 8 are written as "uDR2($i$)".

At this time, the following Expressions hold. Note that in a case where no change of transmission (power) level is performed, this is expressed as α1=α2=1, and computation of change to transmission level is not performed in the following Expressions.

Case of performing precoding and not performing CDD:

[Math 8]

$$\begin{pmatrix} uDR1(i) \\ uDR2(i) \end{pmatrix} = F \times \begin{pmatrix} \alpha 1 & 0 \\ 0 & \alpha 2 \end{pmatrix} \begin{pmatrix} sDR1(i) \\ sDR2(i) \end{pmatrix} \quad \text{Expression (8)}$$

Alternatively,

[Math 9]

$$\begin{pmatrix} uDR1(i) \\ uDR2(i) \end{pmatrix} = \begin{pmatrix} \alpha 1 & 0 \\ 0 & \alpha 2 \end{pmatrix} \times F \times \begin{pmatrix} sDR1(i) \\ sDR2(i) \end{pmatrix} \quad \text{Expression (9)}$$

Case of performing precoding and performing CDD:

[Math 10]

$$\begin{pmatrix} uDR1(i) \\ uDR2(i) \end{pmatrix} = W \times F \times \begin{pmatrix} \alpha 1 & 0 \\ 0 & \alpha 2 \end{pmatrix} \begin{pmatrix} sDR1(i) \\ sDR2(i) \end{pmatrix} \quad \text{Expression (10)}$$

Alternatively,

[Math 11]

$$\begin{pmatrix} uDR1(i) \\ uDR2(i) \end{pmatrix} = \begin{pmatrix} \alpha 1 & 0 \\ 0 & \alpha 2 \end{pmatrix} \times W \times F \times \begin{pmatrix} sDR1(i) \\ sDR2(i) \end{pmatrix} \quad \text{Expression (11)}$$

Case of not performing precoding and not performing CDD:

[Math 12]

$$\begin{pmatrix} uDR1(i) \\ uDR2(i) \end{pmatrix} = \begin{pmatrix} \alpha 1 & 0 \\ 0 & \alpha 2 \end{pmatrix} \begin{pmatrix} sDR1(i) \\ sDR2(i) \end{pmatrix} \quad \text{Expression (12)}$$

Case of not performing precoding and performing CDD:

[Math 13]

$$\begin{pmatrix} uDR1(i) \\ uDR2(i) \end{pmatrix} = W \times \begin{pmatrix} \alpha 1 & 0 \\ 0 & \alpha 2 \end{pmatrix} \begin{pmatrix} sDR1(i) \\ sDR2(i) \end{pmatrix} \quad \text{Expression (13)}$$

[Math 14]

$$\begin{pmatrix} uDR1(i) \\ uDR2(i) \end{pmatrix} = \begin{pmatrix} \alpha 1 & 0 \\ 0 & \alpha 2 \end{pmatrix} \times W \times \begin{pmatrix} sDR1(i) \\ sDR2(i) \end{pmatrix} \quad \text{Expression (14)}$$

<About PT-RS Symbols>

Of the signals s1($i$) before precoding, the PT-RS symbol of the stream #X1 (2B03) is written as "sPR1($i$)", and of the signals s2($i$) before precoding, the PT-RS symbol of the stream #2 (2C03) is written as "sPR2($i$)".

Also, of the modulated signal 208_A that is the output of the processing unit 207 illustrated in FIG. 4, the signals of the PT-RS transmission region 503 illustrated in FIG. 7 are written as "uPR1($i$)", and of the modulated signal 208_B that is the output of the processing unit 207 illustrated in FIG. 4, the signals of the PT-RS transmission region 603 illustrated in FIG. 8 are written as "uPR2($i$)".

At this time, with values of change in level of PT-RS transmission (electrical power) (correction coefficients) as β1 and β2, the following expressions hold. That is to say, correction coefficients β1 and β2, that are different from the correction coefficients α1 and α2 for transmission level that are applied to the data symbol and DM-RS symbol, are applied to the PT-RS symbol. Note however, that β1 and β2 can be defined by complex numbers or real numbers, may be set for each user, may be set in increments of a plurality of symbols, may be set in increments of symbols, or may be fixed values. Note that in a case where no change of transmission level is performed, this is expressed as β1=β2=1, and computation of change to transmission level is not performed in the following Expressions.

Case of performing precoding and not performing CDD:

[Math. 15]

$$\begin{pmatrix} uPR1(i) \\ uPR2(i) \end{pmatrix} = F \times \begin{pmatrix} \beta 1 & 0 \\ 0 & \beta 2 \end{pmatrix} \begin{pmatrix} sPR1(i) \\ sPR2(i) \end{pmatrix} \qquad \text{Expression (15)}$$

[Math. 16]

$$\begin{pmatrix} uPR1(i) \\ uPR2(i) \end{pmatrix} = \begin{pmatrix} \beta 1 & 0 \\ 0 & \beta 2 \end{pmatrix} \times F \times \begin{pmatrix} sPR1(i) \\ sPR2(i) \end{pmatrix} \qquad \text{Expression (16)}$$

Case of performing precoding and performing CDD:

[Math. 17]

$$\begin{pmatrix} uPR1(i) \\ uPR2(i) \end{pmatrix} = W \times F \times \begin{pmatrix} \beta 1 & 0 \\ 0 & \beta 2 \end{pmatrix} \begin{pmatrix} sPR1(i) \\ sPR2(i) \end{pmatrix} \qquad \text{Expression (17)}$$

Alternatively,

[Math. 18]

$$\begin{pmatrix} uPR1(i) \\ uPR2(i) \end{pmatrix} = \begin{pmatrix} \beta 1 & 0 \\ 0 & \beta 2 \end{pmatrix} \times W \times F \times \begin{pmatrix} sPR1(i) \\ sPR2(i) \end{pmatrix} \qquad \text{Expression (18)}$$

Case of not performing precoding and not performing CDD:

[Math. 19]

$$\begin{pmatrix} uPR1(i) \\ uPR2(i) \end{pmatrix} = \begin{pmatrix} \beta 1 & 0 \\ 0 & \beta 2 \end{pmatrix} \begin{pmatrix} sPR1(i) \\ sPR2(i) \end{pmatrix} \qquad \text{Expression (19)}$$

Case of not performing precoding and performing CDD:

[Math. 20]

$$\begin{pmatrix} uPR1(i) \\ uPR2(i) \end{pmatrix} = W \times \begin{pmatrix} \beta 1 & 0 \\ 0 & \beta 2 \end{pmatrix} \begin{pmatrix} sPR1(i) \\ sPR2(i) \end{pmatrix} \qquad \text{Expression (20)}$$

Alternatively,

[Math. 21]

$$\begin{pmatrix} uPR1(i) \\ uPR2(i) \end{pmatrix} = \begin{pmatrix} \beta 1 & 0 \\ 0 & \beta 2 \end{pmatrix} \times W \times \begin{pmatrix} sPR1(i) \\ sPR2(i) \end{pmatrix} \qquad \text{Expression (21)}$$

Note that in Expression (1) through Expression (21), a case where the precoding matrix used for obtaining signals in the PT-RS transmission region and the precoding matrix used for obtaining signals in the data transmission region and signals in the DM-RS transmission region are the same matrix is described, but different matrices may be used.

Also, the following is conceivable as an example of the precoding matrix F.

[Math. 22]

$$F = \begin{pmatrix} a & b \\ c & d \end{pmatrix} \qquad \text{Expression (22)}$$

In Expression (22), a, b, c, and d can be defined by complex numbers or real numbers. It is sufficient for the conditions of a, b, c, and d to satisfy any one of the following conditions <1> through <4>.

<1> a, b, c, and d are never all zero.
<2> Three or more of a, b, c, and d are never zero.
<3> Two or more of a, b, c, and d are never zero.
<4> Two or more of a, b, c, and d are never zero, a=c=0 is never satisfied, and b=d=0 is never satisfied.

The following is conceivable for an example of a matrix relating to CDD.

[Math. 23]

$$W = \begin{pmatrix} p & q \\ r & s \end{pmatrix} \qquad \text{Expression (23)}$$

In Expression (23), p, q, r, and s can be defined by complex numbers or real numbers. It is sufficient for the conditions of p, q, r, and s to satisfy any one of the following conditions <5> through <8>.

<5> $p=e^{j\theta}$, and q=0, and r=0, and $s=e^{j\lambda}$
where p and s are set for each symbol.
<6> $p=g \times e^{j\theta}$, and q=0, and r=0, and $s=h \times e^{j\lambda}$
where p and s are set for each symbol, and g and h are real numbers.
<7> p=0, and $q=e^{j\theta}$, and $r=e^{j\lambda}$, and s=0
where p and s are set for each symbol.
<8> p=0, and $q=g \times e^{j\theta}$, and $r=h \times e^{j\lambda}$, and s=0
where p and s are set for each symbol, and g and h are real numbers.

[Configuration Example of Reception Apparatus]

Figure 9:
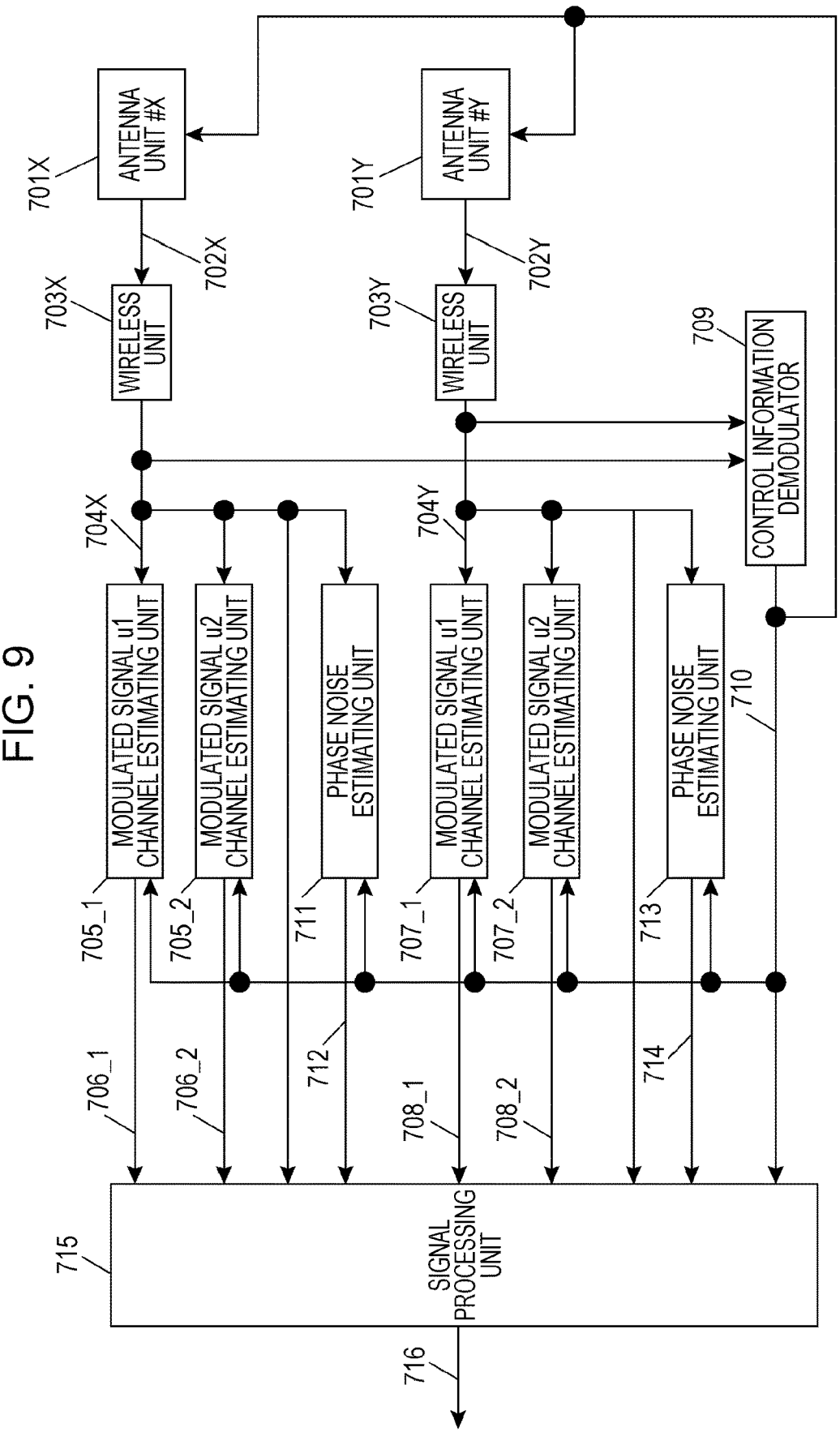
FIG. 9 is a block diagram illustrating a configuration example of a reception apparatus according to the first embodiment.

FIG. 9 is a block diagram illustrating a configuration example of a reception apparatus according to the present embodiment. The reception apparatus illustrated in FIG. 9 is the terminals 402_1, 402_2, and 402_3 that are the communication partners with the base station 401 (the transmission apparatus illustrated in FIG. 3) illustrated in FIG. 2, for example.

Note that in the following, in the transmission apparatus illustrated in FIG. 3, a modulated signal transmitted from the antenna unit #A (111_A) will be referred to as "modulated signal u1", and a modulated signal transmitted from the antenna unit #B (111_B) will be referred to as "modulated signal u2"

A wireless unit 703X takes a reception signal 702X received at an antenna unit #X (701X) as input. The wireless unit 703X subjects the reception signal 702X to signal processing such as frequency conversion, Fourier transform, and so forth, and outputs a baseband signal 704X.

In the same way, a wireless unit 703Y takes a reception signal 702Y received at an antenna unit #Y (701Y) as input. The wireless unit 703Y subjects the reception signal 702Y to signal processing such as frequency conversion, Fourier transform, and so forth, and outputs a baseband signal 704Y.

A control information demodulator 709 takes the baseband signals 704X and 704Y as input. The control information demodulator 709 extracts control information symbols (e.g., the control information transmission region 500 illustrated in FIG. 7 and the control information transmission region 600 illustrated in FIG. 8), demodulates these control information symbols (control information transmission regions), and outputs control information 710.

The antenna unit #X (701X) and the antenna unit #Y (701Y) take the control information 710 as input. The antenna unit #X (701X) and the antenna unit #Y (701Y) may perform reception directionality control following the control information 710. Also, the antenna unit #X (701X) and the antenna unit #Y (701Y) do not have to have the control information 710 as input.

A modulated signal u1 channel estimating unit 705_1 takes the baseband signal 704X and control information 710 as input. The modulated signal u1 channel estimating unit 705_1 performs channel estimation of the modulated signal u1 using the DM-RS transmission region 501 illustrated in FIG. 7 and/or the DM-RS transmission region 601 illustrated in FIG. 8, and outputs channel estimation signal 706_1 for the modulated signal u1.

In the same way, a modulated signal u1 channel estimating unit 707_1 takes the baseband signal 704Y and control information 710 as input. The modulated signal u1 channel estimating unit 707_1 performs channel estimation of the modulated signal u1 using the DM-RS transmission region 501 illustrated in FIG. 7 and/or the DM-RS transmission region 601 illustrated in FIG. 8, and outputs a channel estimation signal 708_1 for the modulated signal u1.

A modulated signal u2 channel estimating unit 705_2 takes the baseband signal 704X and control information 710 as input. The modulated signal u2 channel estimating unit 705_2 performs channel estimation of the modulated signal u2 using the DM-RS transmission region 501 illustrated in FIG. 7 and/or the DM-RS transmission region 601 illustrated in FIG. 8, and outputs a channel estimation signal 706_2 for the modulated signal u2.

In the same way, a modulated signal u2 channel estimating unit 707_2 takes the baseband signal 704Y and control information 710 as input. The modulated signal u2 channel estimating unit 707_2 performs channel estimation of the modulated signal u2 using the DM-RS transmission region 501 illustrated in FIG. 7 and/or the DM-RS transmission region 601 illustrated in FIG. 8, and outputs a channel estimation signal 708_2 for the modulated signal u2.

A phase noise estimating unit 711 takes the baseband signal 704X and control information 710 as input. The phase noise estimating unit 711 estimates phase noise using the PT-RS transmission region 503 and/or PT-RS transmission region 603, and outputs a phase noise estimation signal 712.

In the same way, a phase noise estimating unit 713 takes the baseband signal 704Y and control information 710 as input. The phase noise estimating unit 713 estimates phase noise using the PT-RS transmission region 503 and/or PT-RS transmission region 603, and outputs a phase noise estimation signal 714.

A signal processing unit 715 takes as input channel estimation signals 706_1 and 708_1 of the modulated signal u1, channel estimation signals 706_2 and 708_2 of the modulated signal u2, the phase noise estimation signals 712 and 714, the baseband signals 704X and 704Y, and control information 710. The signal processing unit 715 uses these signals to perform processing such as demodulation, error correction decoding, and so forth, on the data symbols (data transmission regions 502 and 602), and outputs a reception signal 716.

[Phase Noise Estimation Method]

Next, the estimation method of phase noise performed at the reception apparatus illustrated in FIG. 9 will be described.

As one example, the problems at the time of estimating phase noise with high precision at the terminal 402_2 (user #2) illustrated in FIG. 2 will be described.

The frame configuration of modulated signals that the base station 401 illustrated in FIG. 2 (the transmission apparatus illustrated in FIG. 3) transmits is as described in FIG. 7 and FIG. 8. The following two methods 1 and 2 are conceivable as methods for the terminal 402_2 (the reception apparatus illustrated in FIG. 9) to estimate phase noise.

<Method 1>

In method 1, the terminal 402_2 estimates phase noise using PT-TS symbols directed to itself in FIG. 5A and FIG. 5B (2B03 and 2C03), i.e., using the PT-RS transmission region 503 for user #2 in carrier 16 and carrier 21 illustrated in FIG. 7, and the PT-RS transmission region 603 for user #2 in carrier 16 and carrier 21 illustrated in FIG. 8.

<Method 2>

In method 2, the terminal 402_2 estimates phase noise using PT-RS symbols directed to other terminals in addition to the PT-RS symbols directed to itself in FIG. 5A and FIG. 5B (2B03 and 2C03).

That is to say, the terminal 402_2 estimates phase noise using "the PT-RS transmission region 503 for another user in carrier 4, carrier 10, carrier 28, and carrier 33 illustrated in FIG. 7", and "the PT-RS transmission region 603 for another user in carrier 4, carrier 10, carrier 28, and carrier 33 illustrated in FIG. 8", in addition to "the PT-RS transmission region 503 for user #2 in carrier 16 and carrier 21 illustrated in FIG. 7, and the PT-RS transmission region 603 for user #2 in carrier 16 and carrier 21 illustrated in FIG. 8".

Methods 1 and 2 for estimating phase noise at the terminal 402_2 have been described.

There is a possibility that using the method 2 at the terminal 402_2 (reception apparatus) can improve the estimation precision of phase noise using a greater number of PT-RS than the method 1. Accordingly, a method for realizing phase noise estimation by the method 2 will be described below in detail.

In the frame configuration indicated in FIG. 7 and FIG. 8, the base station 401 (transmission apparatus) adjusts the transmission power of at least data symbols (data transmission region) of the user #1 in accordance with the state of the terminal 402_1 (user #1). In the same way, the base station 401 adjusts the transmission power of at least data symbols (data transmission region) of the user #2 in accordance with the state of the terminal 402_2 (user #2), and adjusts the transmission power of at least data symbols (data transmission region) of the user #3 in accordance with the state of the terminal 402_3 (user #3).

At this time, the base station 401 adjusts the transmission power of PT-RS symbols (PT-RS transmission region) placed in carrier 4 and carrier 10, to match the rules of transmission power adjustment of data symbols for the user #1. In the same way, the base station 401 adjusts the transmission power of PT-RS symbols (PT-RS transmission region) placed in carrier 16 and carrier 21, to match the rules of transmission power adjustment of data symbols for the user #2, and adjusts the transmission power of PT-RS symbols (PT-RS transmission region) placed in carrier 28 and carrier 33, to match the rules of transmission power adjustment of data symbols for the user #3.

Note that the relation between "transmission region" in FIG. 7 and FIG. 8, and "symbol" in FIG. 5A and FIG. 5B is as described above.

Now, a case where the base station 401 transmits information relating to transmission power adjudgment described above (transmission power information) in a control information transmission region such as the control information transmission region 500, 600, or the like, will be described.

In this case, the terminal 402_2 illustrated in FIG. 2 (the reception apparatus illustrated in FIG. 9) obtains transmission power information of other users, i.e., the symbol transmission power information for the user #1 and the symbol transmission power information for the user #3, from control information symbols. Accordingly, there is a high probability that the terminal 402_2 will be able to easily use the PT-RS symbols of the PT-RS transmission regions placed in carrier 4, carrier 10, carrier 28, and carrier 33, to estimate phase noise. Thus, the terminal 402_2 can use PT-RS transmission regions (PT-RS symbols) of other users for phase noise estimation, which is advantageous in that reception quality of data obtained from desired data symbols can be improved.

However, there is need to take into consideration protection of data of other users, and increase in control information for a framework to protect data of other users, when performing phase noise estimation using such a method.

A method to realize phase noise estimation, that differs from the above-described method, will be described below.

A first method will be described.

First, the base station 401 performs adjustment of transmission power of data symbols for the users, and transmits transmission power information indicating the level of transmission power, using the control information transmission region 500 illustrated in FIG. 7 and/or control information transmission region 600 illustrated in FIG. 8, for example.

As one example, in the frame configuration in FIG. 7 and FIG. 8, the base station 401 sets the transmission (power) level of "symbols" in transmission regions excluding the PT-RS transmission regions 503 and 603 for the user #1 to "1.0", the transmission (power) level of "symbols" in transmission regions excluding the PT-RS transmission regions 503 and 603 for the user #2 to "4.0", and the transmission (power) level of "symbols" in transmission regions excluding the PT-RS transmission regions 503 and 603 for the user #3 to "16.0", and transmits transmission power information.

On the other hand, the base station 401 sets the transmission (power) level of PT-RS symbols (see FIG. 5A and FIG. 5B) in the PT-RS transmission regions for the user #1, i.e., the PT-RS transmission regions 503 and 603 in carrier 4 and carrier 10 illustrated in FIG. 7 and FIG. 8 to "2.0", sets the transmission (power) level of PT-RS symbols (see FIG. 5A and FIG. 5B) in the PT-RS transmission regions for the user #2, i.e., the PT-RS transmission regions 503 and 603 in carrier 16 and carrier 21 illustrated in FIG. 7 and FIG. 8 to "4.0", and sets the transmission (power) level of PT-RS symbols (see FIG. 5A and FIG. 5B) in the PT-RS transmission regions for the user #3, i.e., the PT-RS transmission regions 503 and 603 in carrier 28 and carrier 33 illustrated in FIG. 7 and FIG. 8 to "8.0", and transmits transmission power information.

That is to say, the base station 401 differentiates the transmission (power) level control method for "symbols" (may be data symbols) in transmission regions excluding the PT-RS transmission region, and the transmission (power) level control method for PT-RS symbols in the PT-RS transmission region, even for the same user. Alternatively, the base station 401 differentiates the transmission (power) level control method for in transmission regions excluding the PT-RS transmission region, and the transmission (power) level control method in the PT-RS transmission region, even for the same user.

At this time, the base station 401 controls the transmission power (power) level for "symbols" or "transmission regions" in transmission regions excluding the PT-RS transmission region, such that securing data reception quality is achieved at terminals that are communication partners of the base station 401. On the other hand, the base station 401 controls the transmission (power) level for PT-RS symbols in the PT-RS transmission region or for the PT-RS transmission region, such that a desired terminal can estimate phase noise with high precision, and other terminals can use the PT-RS symbols for estimating phase noise.

This point will be described below by way of specific examples.

Figure 10:
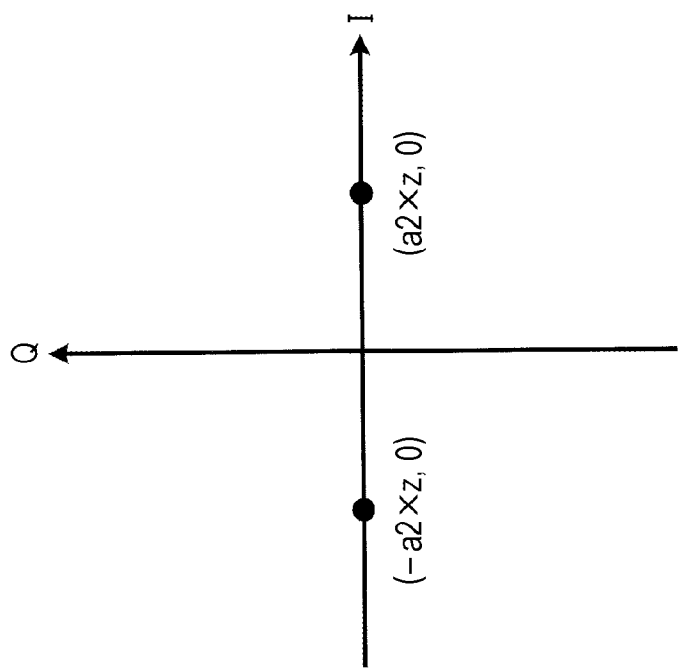
FIG. 10 is a diagram illustrating an example of constellation point layout in an I-Q plane for BPSK.

FIG. 10 illustrates an example of signal point layout in the in-phase I—orthogonal Q plane (I-Q plane) in BPSK (Binary Phase Shift Keying). In the case of BPSK, two signal points are placed in the I-Q plane. If the signal points are expressed as (I2, Q2), then (a2×z, 0) and (−a2×z, 0) exist for (I2, Q2). Note that coefficient a2 can be expressed in the following Expression (24).

[Math 24]

$$a2 = 1.0 \qquad \text{Expression (24)}$$

Also, z is a real number that is greater than 0. At this time, the average transmission power is $z^2$.

Figure 11:
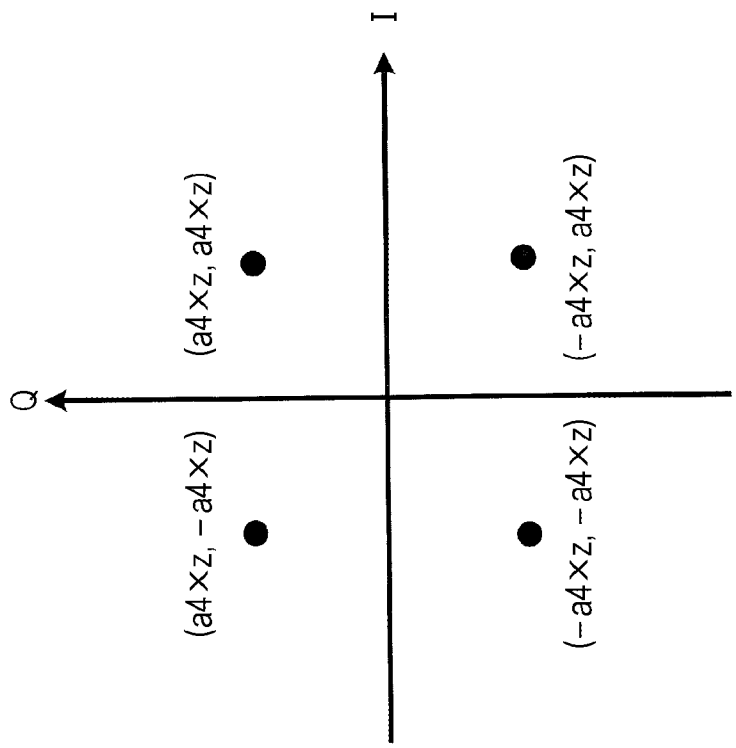
FIG. 11 is a diagram illustrating an example of constellation point layout in an I-Q plane for QPSK.

FIG. 11 illustrates an example of signal point layout in the I-Q plane in QPSK (Quadrature Phase Shift Keying). In the case of QPSK, four signal points are placed in the I-Q plane. If the signal points are expressed as (I4, Q4), then (a4×z, a4×z), (−a4×z, a4×z), (a4×z, −a4×z), and (−a4×z, −a4×z) exist for (I4, Q4). Note that coefficient a4 can be expressed in the following Expression (25).

[Math. 25]

$$a4 = \frac{1}{\sqrt{2}} \qquad \text{Expression (25)}$$

Also, z is a real number that is greater than 0. At this time, the average transmission power is $z^2$. That is to say, by setting a4 as in Expression (25), the transmission level of BPSK and the transmission level of QPSK become equal.

Figure 12:
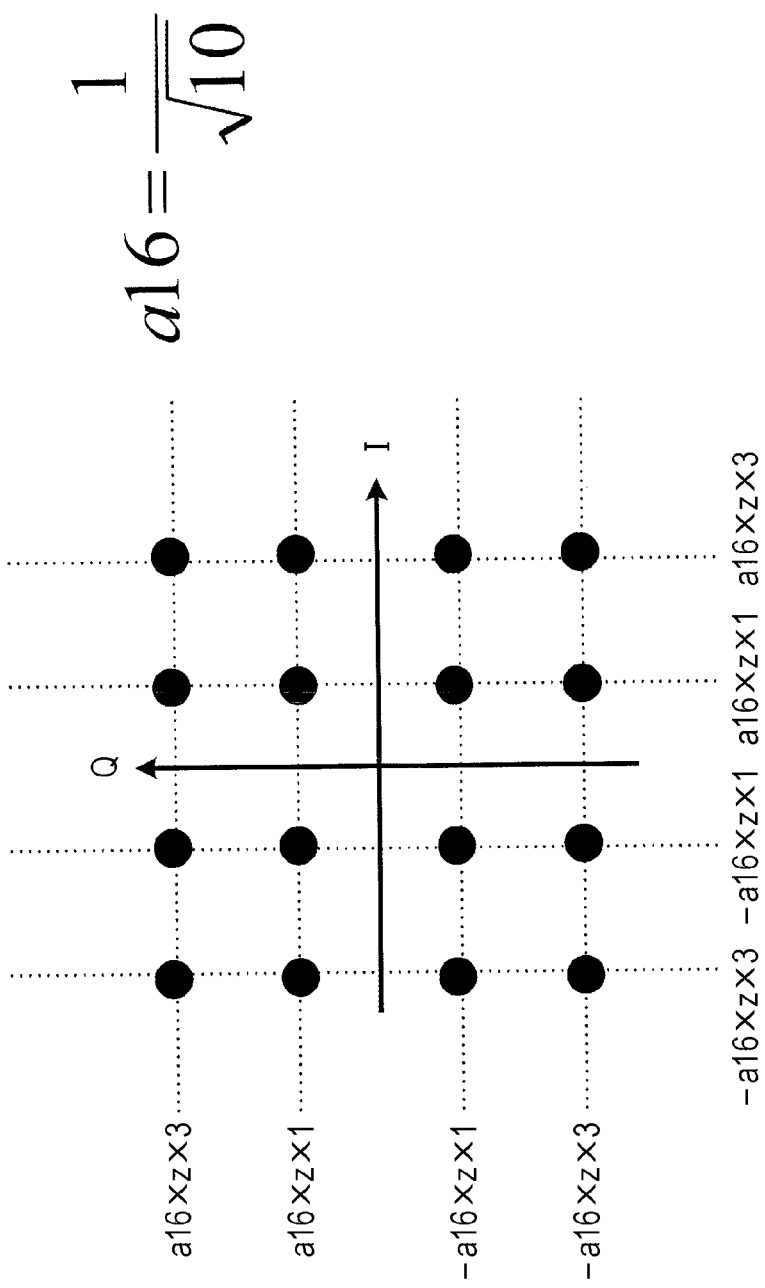
FIG. 12 is a diagram illustrating an example of constellation point layout in an I-Q plane for 16QAM.

FIG. 12 illustrates an example of signal point layout in the I-Q plane in 16QAM (16 Quadrature Amplitude Modulation). In the case of 16QAM, 16 signal points are placed in the I-Q plane. If the signal points are expressed as (I64, Q16), then (a16×z×3, a16×z×3), (a16×z×3, a16×z×1), (a16×z×3, −a16×z×1), (a16×z×3, −a16×z×3), (a16×z×1, a16×z×3), (a16×z×1, a16×z×1), (a16×z×1, −a16×z×1), (a16×z×1, −a16×z×3), (−a16×z×1, a16×z×3), (−a16×z×1, a16×z×1), (−a16×z×1, −a16×z×1), (−a16×z×1, −a16×z×3), (−a16×z×3, a16×z×3), (−a16×z×3, a16×z×1), (−a16×z×3, −a16×z×1), and (−a16×z×3, −a16×z×3) exist for (I16, Q16). Note that coefficient a16 can be expressed in the following Expression (26).

[Math. 26]
$$a16 = \frac{1}{\sqrt{10}}$$ Expression (26)

Also, z is a real number that is greater than 0. At this time, the average transmission power is $z^2$. That is to say, by setting a16 as in Expression (26), the transmission level of BPSK and the transmission level of QPSK and the transmission level of 16QAM become equal.

Figure 13:
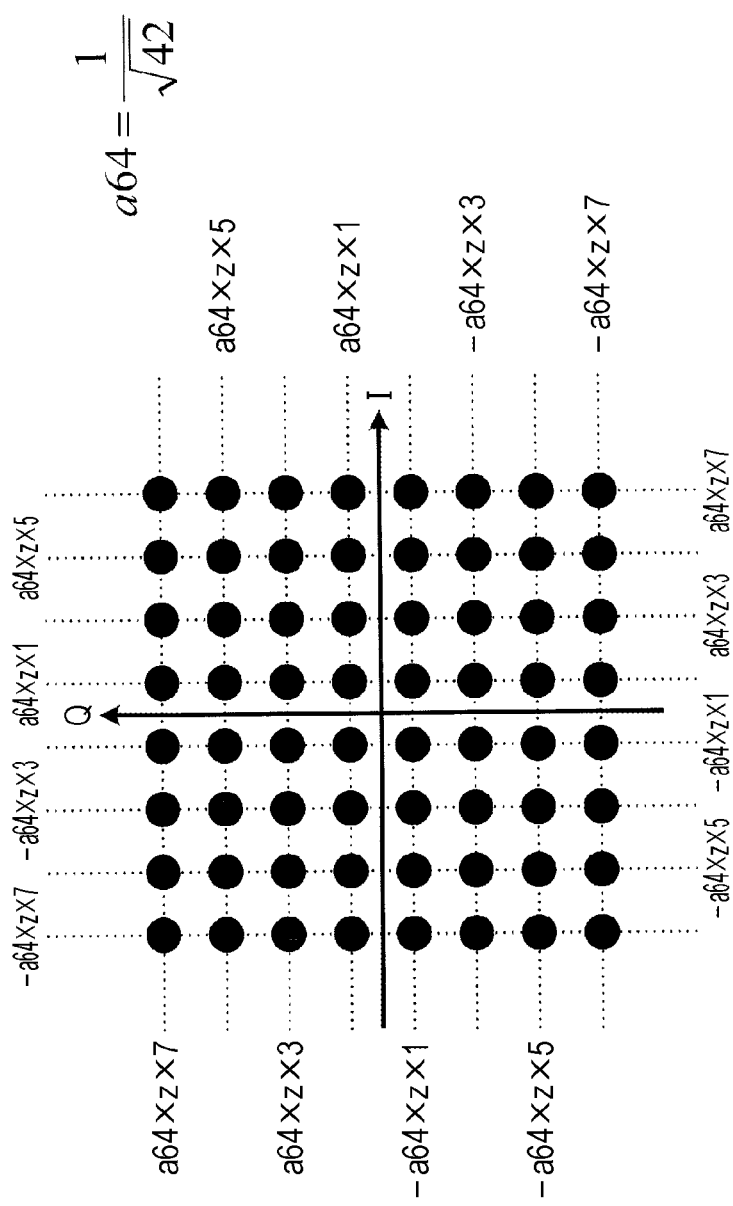
FIG. 13 is a diagram illustrating an example of constellation point layout in an I-Q plane for 64QAM.

FIG. 13 illustrates an example of signal point layout in the I-Q plane in 64QAM (64 Quadrature Amplitude Modulation). In the case of 64QAM, 64 signal points are placed in the I-Q plane. If the signal points are expressed as (I64, Q64), then (a64×z×7, a64×z×7), (a64×z×7, a64×z×5), (a64×z×7, a64×z×3), (a64×z×7, a64×z×1), (a64×z×7, −a64×z×1), (a64×z×7, −a64×z×3), (a64×z×7, −a64×z×5), (a64×z29×7, −a64×z×7), (a64×z×5, a64×z×7), (a64×z×5, a64×z×5), (a64×z×5, a64×z×3), (a64×z×5, a64×z×1), (a64×z×5, −a64×z×1), (a64×z×5, −a64×z×3), (a64×z×5, −a64×z×5), (a64×z×5, −a64×z×7), (a64×z×3, a64×z×7), (a64×z×3, a64×z×5), (a64×z×3, a64×z×3), (a64×z×3, a64×z×1), (a64×z×3, −a64×z×1), (a64×z×3, −a64×z×3), (a64×z×3, −a64×z×5), (a64×z×3, −a64×z×7), (a64×z×1, a64×z×7), (a64×z×1, a64×z×5), (a64×z×1, a64×z×3), (a64×z×1, a64×z×1), (a64×z×1, −a64×z×1), (a64×z×1, −a64×z×3), (a64×z×1, −a64×z×5), (a64×z×1, −a64×z×7), (−a64×z×1, a64×z×7), (−a64×z×1, a64×z×5), (−a64×z×1, a64×z×3), (−a64×z×1, a64×z×1), (−a64×z×1, −a64×z×1), (−a64×z×1, −a64×z×3), (−a64×z×1, −a64×z×5), (−a64×z×1, −a64×z×7), (−a64×z×3, a64×z×7), (−a64×z×3, a64×z×5), (−a64×z×3, a64×z×3), (−a64×z×3, a64×z×1), (−a64×z×3, −a64×z×1), (−a64×z×3, −a64×z×3), (−a64×z×3, −a64×z×5), (−a64×z×3, −a64×z×7), (−a64×z×5, a64×z×7), (−a64×z×5, a64×z×5), (−a64×z×5, a64×z×3), (−a64×z×5, a64×z×1), (−a64×z×5, −a64×z×1), (−a64×z×5, −a64×z×3), (−a64×z×5, −a64×z×5), (−a64×z×5, −a64×z×7), (−a64×z×7, a64×z×7), (−a64×z×7, a64×z×5), (−a64×z×7, a64×z×3), (−a64×z×7, a64×z×1), (−a64×z×7, −a64×z×1), (−a64×z×7, −a64×z×3), (−a64×z×7, −a64×z×5), and (−a64×z×7, −a64×z×7) exist for (I64, Q64). Note that coefficient a64 can be expressed in the following Expression (27).

[Math. 27]
$$a64 = \frac{1}{\sqrt{42}}$$ Expression (27)

Also, z is a real number that is greater than 0. At this time, the average transmission power is $z^2$. That is to say, by setting a64 as in Expression (27), the transmission level of BPSK and the transmission level of QPSK and the transmission level of 16QAM and the transmission level of 64QAM become equal.

Now, a case of carrying out the following modulation scheme and transmission level adjustment, in a case where the frame configuration of modulated signals transmitted by the base station 401 is the frame configuration illustrated in FIG. 7 and FIG. 8 will be described here as one example.

For example, the modulation scheme for the data symbols in the data transmission regions 502 and 602 for the user #1 is QPSK, and the adjustment coefficient for the transmission level is b1. Note that this b2 is equivalent to the post-change level α1 of the transmission level described above. In this case, the in-phase component ID1 of the data symbols in the data transmission regions 502 and 602 after transmission level adjustment is expressed by ID1=b1×I4, and the orthogonal component QD1 of the data symbols of the data transmission regions 502 and 602 after transmission level adjustment is expressed by QD1=b1×Q4.

Also, the modulation scheme for the data symbols in the data transmission regions 502 and 602 for the user #2 is 16QAM, and the adjustment coefficient for the transmission level is b2. Note that this b2 is equivalent to the post-change level α2 of the transmission level described above. In this case, the in-phase component ID2 of the data symbols in the data transmission regions 502 and 602 after transmission level adjustment is expressed by ID2=b2×I16, and the orthogonal component QD2 of the data symbols of the data transmission regions 502 and 602 after transmission level adjustment is expressed by QD2=b2×Q16.

Also, for example, the modulation scheme for the data symbols in the data transmission regions 502 and 602 for the user #3 is 64QAM, and the adjustment coefficient for the transmission level is b3. In this case, the in-phase component ID3 of the data symbols in the data transmission regions 502 and 602 after transmission level adjustment is expressed by ID3=b3×I64, and the orthogonal component QD3 of the data symbols of the data transmission regions 502 and 602 after transmission level adjustment is expressed by QD3=b3×Q64.

On the other hand, the modulation scheme for the PT-RS symbols in the PT-RS transmission regions 503 and 603 for the user #1 is BPSK, and the adjustment coefficient for the transmission level is c1, for example. Note that this c1 is equivalent to the post-change value β1 of the transmission level described above. In this case, the in-phase component IP1 of the PT-RS symbols in the PT-RS transmission region 503 and 603 after transmission level adjustment is expressed by IP1=c1×I2, and the orthogonal component QP1 of the PT-RS symbols of the PT-RS transmission regions 503 and 603 after transmission level adjustment is expressed by QP1=c1×Q2.

Also, the modulation scheme for the PT-RS symbols in the PT-RS transmission regions 503 and 603 for the user #2 is BPSK, and the adjustment coefficient for the transmission level is c2, for example. Note that this c2 is equivalent to the post-change value β2 of the transmission level described above. In this case, the in-phase component IP2 of the PT-RS symbols in the PT-RS transmission region 503 and 603 after transmission level adjustment is expressed by IP2=c2×I2, and the orthogonal component QP2 of the PT-RS symbols of the PT-RS transmission regions 503 and 603 after transmission level adjustment is expressed by QP2=c2×Q2.

Also, the modulation scheme for the PT-RS symbols in the PT-RS transmission regions 503 and 603 for the user #3 is BPSK, and the adjustment coefficient for the transmission level is c3, for example. In this case, the in-phase component IP3 of the PT-RS symbols in the PT-RS transmission region 503 and 603 after transmission level adjustment is expressed by IP3=c3×I2, and the orthogonal component QP3 of the PT-RS symbols of the PT-RS transmission regions 503 and 603 after transmission level adjustment is expressed by QP3=c3×Q2.

When performing the above transmission level adjustment, the base station 401 can make the following settings (conditions).

"set b1 and c1 where b1≠c1"
"set b2 and c2 where b2≠c2"
"set b3 and c3 where b3≠c3"

Although a case where user #1 through user #3 exist is described in the above example, the number of users is not restricted to three, and this can be carried out in the same way with n users (where n is an integer of 2 or greater). That is to say, the base station 401 can set bk and ck where bk≠ck (where k is an integer of 1 or greater but n or smaller).

Also, when performing the above transmission level adjustment, the base station 401 can make the following settings (conditions).

"time exists where one of b1≠c1, b2≠c2, and b3≠c3 hold"

Also, when the number of users is n, the following holds.

time exists where "k exists where bk≠ck, where k is an integer of 1 or greater but n or smaller"

Also, the modulation scheme (mapping method) of the PT-RS symbols in the PT-RS transmission regions is described as being BPSK in the above example, but this may be other modulation schemes. Also, BPSK, t/2-shift BPSK, QPSK, t/4-shift QPSK, PAM (Pulse Amplitude Modulation) and so forth enable phase estimation, and accordingly are suitable methods for the modulation scheme (mapping method) of the PT-RS symbols in the PT-RS transmission regions. Note however, that the mapping method is not restricted to these methods, and operations the same as those described above can be carried out even with mapping where the average transmission power $z^2$ for the PT-RS symbols in the PT-RS transmission regions before transmission level adjustment is not realized. Although the symbols are multiplied by the adjustment coefficients b1, b2, c1, and c2 in the above example, this is not restrictive, adjustment coefficients may be multiplied as in any of Expression (1) through Expression (21).

Also, the modulation scheme (mapping method) of the data symbols in the data transmission regions is not restricted to BPSK, QPSK, 16QAM, and 64QAM. For example, a non-uniform mapping method may be used as the mapping method of the data symbols in the data transmission regions, or t/2-shift BPSK or t/4-shift QPSK may be used. Note however, that coefficients corresponding to the above-described coefficients a2, a4, a16, and a64 need to be separately decided for each modulation scheme.

[Relation Between Transmission Level Adjustment Coefficients for Data Symbols and Transmission Level Adjustment Coefficients for PT-RS Symbols]

Next, the relation between transmission level adjustment coefficients for data symbols in the data transmission region and transmission level adjustment coefficients for PT-RS symbols in the PT-RS transmission region will be described.

The minimum value of transmission level adjustment coefficients for data symbols in the data transmission region is bmin, and the maximum value is bmax. Note that bmin is a real number greater than zero, bmax is a real number, and bmin<bmax holds.

The transmission level adjustment coefficients b1, b2, and b3 (bk in a case where the number of terminals is n (where k is an integer of 1 or greater but n or smaller)) described above is set to an appropriate value that is bmin or greater but bmax or smaller.

The minimum value of transmission level adjustment coefficients for PT-TS symbols in the PT-RS transmission region is cmin, and the maximum value is cmax. Note that cmin is a real number greater than zero, cmax is a real number, and cmin<cmax holds.

The transmission level adjustment coefficients c1, c2, and c3 (ck in a case where the number of terminals is n (where k is an integer of 1 or greater but n or smaller)) described above is set to an appropriate value that is cmin or greater but cmax or smaller.

At this time, cmin>bmin may hold. This enables the reception level of PT-RS symbols to be secured. Thus, the possibility of each terminal being able to estimate phase noise using PT-RS symbols in the PT-RS transmission regions for other terminals is increased, and the possibility that reception quality of data will improve is increased.

[Estimation Method of Transmission Level Correction Coefficients for PT-RS Symbols]

Next, an example of the estimation method of the transmission level correction coefficient β for PT-RS symbols at a terminal (reception apparatus illustrated in FIG. 9) will be described in detail.

Specifically, in the present embodiment, the transmission (power) level correction coefficient β for PT-RS symbols in the PT-RS transmission regions is associated with the pattern of the sequence used as PT-RS laid out in the PT-RS transmission regions. The base station 401 (transmission apparatus) and the terminals (reception apparatuses) share the correlation between the correction coefficient β and the PT-RS pattern.

Accordingly, by identifying the pattern of PT-RS laid out in the PT-RS transmission regions, the terminals can identify the transmission level correction coefficient β correlated with this PT-RS pattern, even if there is no explicit notification regarding the correction coefficient β from the base station 401.

That is to say, by transmitting the PT-RS, the base station 401 can implicitly make notification of the correction coefficient β (i.e., the transmission power information for PT-RS). Accordingly, the need for the base station 401 to add information regarding PT-RS symbol transmission level in the PT-RS transmission regions to the control information transmission regions 500 and 600, for example, can be done away with.

Also, by making the control method of transmission (power) level using the correction coefficient a in transmission regions excluding the PT-RS transmission regions, and the control method of transmission (power) level in the PT-RS transmission regions (correction coefficient β) using the correction coefficient β, to be different, the terminals can identify information relating to the PT-RS transmission (power) level (correction coefficient β), without seeing information relating to the data transmission regions of other terminals. Accordingly, the terminal can estimate phase noise with high precision using the PT-RS directed toward other terminals, in addition to PT-RS directed toward itself, while maintaining data protection of other terminals.

A specific method will be described below.

For example, assumption will be made that any one of a a plurality of count m of correction coefficients $\beta_n$ (where n=an integer of 1 to m) for the transmission level with regard to PT-RS is being used.

In this case, patterns of sequences used as PT-RS (hereinafter referred to as PT-RS patterns) are respectively associated with and set to the m correction coefficients β. Now, the PT-RS patterns are mutually orthogonal. For example, the PT-RS patterns may be mutually orthogonal as modulated signals, or may be mutually orthogonal as bit sequences in a case of using BPSK, QPSK, or the like.

Specifically, m types of PT-RS patterns are prepared, for example. At this time, the m types of PT-RS patterns is expressed as $u_n(k)$. There are m types of PT-RS patterns that exist, so n is an integer of 1 or greater but m or smaller (where m is an integer of two or greater). At this time, $u_n(k)$ may be defined as a complex number, or may be defined as a real number. Also, k is an integer of 0 or greater, as one example. Also, $u_n(k)$ is a sequence of a cycle T (where T is an integer of 2 or greater) (i.e., $u_n(k=i)=u_n(k=i+T)$ holds). At this time, in a case where PT-RS patterns ($u_n(0)$ through $u_n(T-1)$) are mutually orthogonal as modulated signals, the following Expression (28) holds where x is an integer of 1 or greater but m or smaller, y is an integer of 1 or greater but m or smaller, and x≠y holds.

[Math. 28]

$$\sum_{k=0}^{T-1} u_x(k) \times u_y(k) = 0 \quad \text{Expression (28)}$$

Alternatively, m types of PT-RS patterns are prepared. At this time, the m types of PT-RS patterns are expressed as bit sequence $b_n(k)$ made up of {0, 1}. There are m types of PT-RS patterns that exist, so n is an integer of 1 or greater but m or smaller (where m is an integer of two or greater). At this time, k is an integer of 0 or greater, as one example. Also, $b_n(k)$ is a bit sequence of a cycle T (where T is an integer of 2 or greater) (i.e., $b_n(k=i)=b_n(k=i+T)$ holds). At this time, in a case where PT-RS patterns ($b_n(0)$ through $b_n(T-1)$) are mutually orthogonal as bit sequences, the following Expression (29) holds where x is an integer of 1 or greater but m or smaller, y is an integer of 1 or greater but m or smaller, and x≠y holds.

[Math. 29]

$$\sum_{k=0}^{T-1} ((2 \times b_x(k) - 1) \times (2 \times b_y(k) - 1)) = 0 \quad \text{Expression (29)}$$

As one example, PT-RS patterns where the cycle of modulated signals in BPSK (i.e., in-phase I component is 1 or −1, and orthogonal component is 0 (zero)) T=4, and m=4, will be described.

For example, an m=4 count of PT-RS patterns $u_1$ through $u_4$ are expressed as below so as to satisfy the relation in Expression (28).

PT-RS pattern $u_1$ is as follows.
$u_1(0+z\times T)=(1, 0)$ i.e., in-phase component 1, orthogonal component 0
$u_1(1+z\times T)=(1, 0)$ i.e., in-phase component 1, orthogonal component 0
$u_1(2+z\times T)=(1, 0)$ i.e., in-phase component 1, orthogonal component 0
$u_1(3+z\times T)=(1, 0)$ i.e., in-phase component 1, orthogonal component 0
where z is an integer or 0 or greater.
PT-RS pattern $u_2$ is as follows.
$U_2(0+z\times T)=(1, 0)$ i.e., in-phase component 1, orthogonal component 0
$U_2(1+z\times T)=(-1, 0)$ i.e., in-phase component −1, orthogonal component 0
$U_2(2+z\times T)=(1, 0)$ i.e., in-phase component 1, orthogonal component 0
$U_2(3+z\times T)=(-1, 0)$ i.e., in-phase component −1, orthogonal component 0
where z is an integer or 0 or greater.
PT-RS pattern $u_3$ is as follows.
$U_3(0+z\times T)=(1, 0)$ i.e., in-phase component 1, orthogonal component 0
$U_3(1+z\times T)=(1, 0)$ i.e., in-phase component 1, orthogonal component 0
$U_3(2+z\times T)=(-1, 0)$ i.e., in-phase component −1, orthogonal component 0
$U_3(3+z\times T)=(-1, 0)$ i.e., in-phase component −1, orthogonal component 0
where z is an integer or 0 or greater.
PT-RS pattern $u_4$ is as follows.
$U_4(0+z\times T)=(1, 0)$ i.e., in-phase component 1, orthogonal component 0
$U_4(1+z\times T)=(-1, 0)$ i.e., in-phase component −1, orthogonal component 0
$U_4(2+z\times T)=(-1, 0)$ i.e., in-phase component −1, orthogonal component 0
$U_4(3+z\times T)=(1, 0)$ i.e., in-phase component 1, orthogonal component 0
where z is an integer or 0 or greater.

Also, the PT-RS patterns $u_1$ through $u_4$ are respectively correlated with correction coefficients $\beta_1$ through $\beta_4$ as follows.

When correction coefficient $\beta_1=1.0$ is set, the PT-RS pattern $u_1$ is used.
When correction coefficient $\beta_1=2.0$ is set, the PT-RS pattern $u_2$ is used.
When correction coefficient $\beta_1=4.0$ is set, the PT-RS pattern $u_3$ is used.
When correction coefficient $\beta_1=8.0$ is set, the PT-RS pattern $u_4$ is used.

First, the base station 401 (transmission apparatus) sets the transmission (power) level correction coefficient $\beta$ in the PT-RS transmission regions 503 and 603 within the transmission regions of each user. The base station 401 then uses the PT-RS pattern u associated with the set correction coefficient $\beta$ as the PT-RS symbol to be placed in these PT-RS transmission regions 503 and 603.

That is to say, at the PT-RS transmission regions 503 and 603 within the transmission regions for each user, a sequence (modulated signal sequence or but sequence) making up the PT-RS pattern associated with the correction coefficient $\beta$ set to these PT-RS transmission regions is transmitted. Note that the base station 401 sets the transmission level correction coefficient $\beta$ for each user transmission region, so the PT-RS patterns transmitted at the transmission regions 503 and 603 within the transmission regions for each user are each individually set.

On the other hand, the terminal (reception apparatus) identifies the correction coefficient $\beta$ associated with the PT-RS received at the PT-RS transmission regions 503 and 603, based on the correlation between PT-RS pattern u and correction coefficient $\beta$.

Specifically, the terminal calculates a correlation value between the PT-RS received at each PT-RS transmission region 503 and 603 and the PT-RS patterns $u_1$ through $u_4$, and identifies a PT-RS pattern $u_n$ where the correlation value is greatest. Note that the correlation value with regard to a PT-RS pattern u that is different from the PT-RS pattern received in the PT-RS transmission region is zero, from the relation illustrated in Expression (28). The terminal then identifies the correction coefficient $\beta_n$ associated with the PT-RS pattern $u_n$ where the correlation value is greatest.

For example, in the above-described example, in a case where the PT-RS symbol placed in the PT-RS transmission regions 503 and 603 within the transmission region directed toward itself is the PT-RS pattern $u_1$, the terminal determines that the correction coefficient $\beta_1=2.0$ with regard to this PT-RS symbol. In the same way, the terminal identifies the PT-RS pattern u of the PT-RS symbol placed in the PT-RS transmission regions 503 and 603 within the transmission region, and determines the correction coefficient $\beta$.

Thus, the terminals can each identify the correction coefficient $\beta$ at transmission regions for other users, in addition to the correction coefficient $\beta$ in the transmission region for itself. Accordingly, the terminal can estimate phase noise using PT-RS directed toward other user, in addition to its own PT-RS, by correcting the measurement value of the PT-RS received at each user transmission region based on the identified correction coefficient $\beta$.

Note that the example of the PT-RS pattern $u_n(k)$ is not restricted to the above-described example. Also, the PT-RS pattern $u_n(k)$ may be generated from $b_n(k)$.

Thus, according to the present embodiment, the base station (transmission apparatus in FIG. 3) generates modulated signals where PT-RS (reference signals for phase noise estimation) for a plurality of reception apparatuses are each placed in resources allocated to the a plurality of reception apparatuses, and transmits the modulated signals. The transmission power correction coefficient $\beta$ for the PT-RS is also associated with the sequence pattern used for the PT-RS.

Accordingly, even in a case where transmission power control of a plurality of users differ, the terminal (reception apparatus) can correctly estimate phase noise using the PT-RS directed to each user based on the transmission power control (correction coefficient $\beta$) for each user. Thus, according to the present embodiment, each terminal can improve estimation precision of phase noise using the PT-RS directed to a plurality of users, and can improve data transmission efficiency.

Also, each terminal can identify the correction coefficient $\beta$ of the PT-RS of other user transmission regions at each terminal by observing the PT-RS pattern at the PT-RS transmission regions, regardless of the data symbols (transmission level correction coefficient $\alpha$), i.e., without observing the data symbols of the other users. Accordingly, data protection of other users can be realized at the time of a terminal performing phase noise estimation.

Also, the correction coefficient $\beta$ for the PT-RS transmission level is associated with a PT-RS pattern being transmitted and implicitly notified to the terminal. This can suppress increase in control information for the correction coefficient.

First Modification

Although description has been made regarding the relation between PT-RS symbols in PT-RS transmission regions and data symbols in data transmission regions, with regard to transmission level adjustment, in the embodiment above, this is not restrictive. For example, the PT-RS transmission region data symbols can be replaced with DM-RS symbols in the DM-RS transmission regions. That is to say, transmission level adjustment the same as in the above embodiment may be performed regarding PT-RS symbols in PT-RS transmission regions and DM-RS symbols in DM-RS transmission regions.

Second Modification

A case has been described in the frame configuration illustrated in FIG. 7 and FIG. 8 where PT-RS transmission regions (PT-RS symbols) are placed (inserted) for each user in the above-described embodiment. However, a frame configuration may be made where PT-RS transmission regions (PT-RS symbols) are not placed, depending on the user. Also, frames for placement of PT-RS transmission regions (PT-RS symbols) may be changed, and the frequency of insertion of PT-RS transmission regions (PT-RS symbols) in resources in the frame, the number inserted, rules of insertion, insertion method, and so forth, may be changed.

For example, the base station 401 (transmission apparatus) may decide whether or not to place PT-RS transmission regions (PT-RS symbols) in resources allocated to the terminals in accordance with the modulation scheme (i.e., modulation order) set for the signals of each terminal (user).

Also, the base station 401 (transmission apparatus) may change the frame for placement of the PT-RS transmission regions (PT-RS symbols) in resources allocated to the terminal in accordance with the modulation scheme (i.e., modulation order) set for signals of each terminal (user), and may change the frequency of insertion of PT-RS transmission regions (PT-RS symbols) in resources in the frame, the number inserted, rules of insertion, insertion method, and so forth. For example, the base station 401 maps PT-RS transmission regions (PT-RS symbols) to resources allocated to the terminal in a case where the modulation order set to signals for the terminal is a threshold value (e.g., the threshold value is set to 16) or higher, and does not place PT-RS transmission regions (PT-RS symbols) in resources allocated to the terminal in a case where the modulation order is smaller than the threshold value. For example, the base station 401 transmits modulated signals directed to a certain terminal using 16QAM. At this time, the base station 401 transmits PT-RS transmission regions (PT-RS symbols). On the other hand, the base station 401 transmits modulated signals by QPSK to a certain terminal. At this time, the base station 401 does not transmit PT-RS transmission regions (PT-RS symbols). Note that the threshold value is not restricted to 16, and may be another value.

Specifically, an arrangement may be made as explained below. When the modulation scheme for data symbols to the terminal has few modulation orders, such as BPSK (or t/2-shift BPSK) or QPSK (or t/4-shift QPSK), the base station 401 does not allocate PT-RS transmission regions (PT-RS symbols) for this terminal. And the base station 401 allocates PT-RS transmission regions (PT-RS symbols) when there is a great number of modulation orders.

Figure 14:
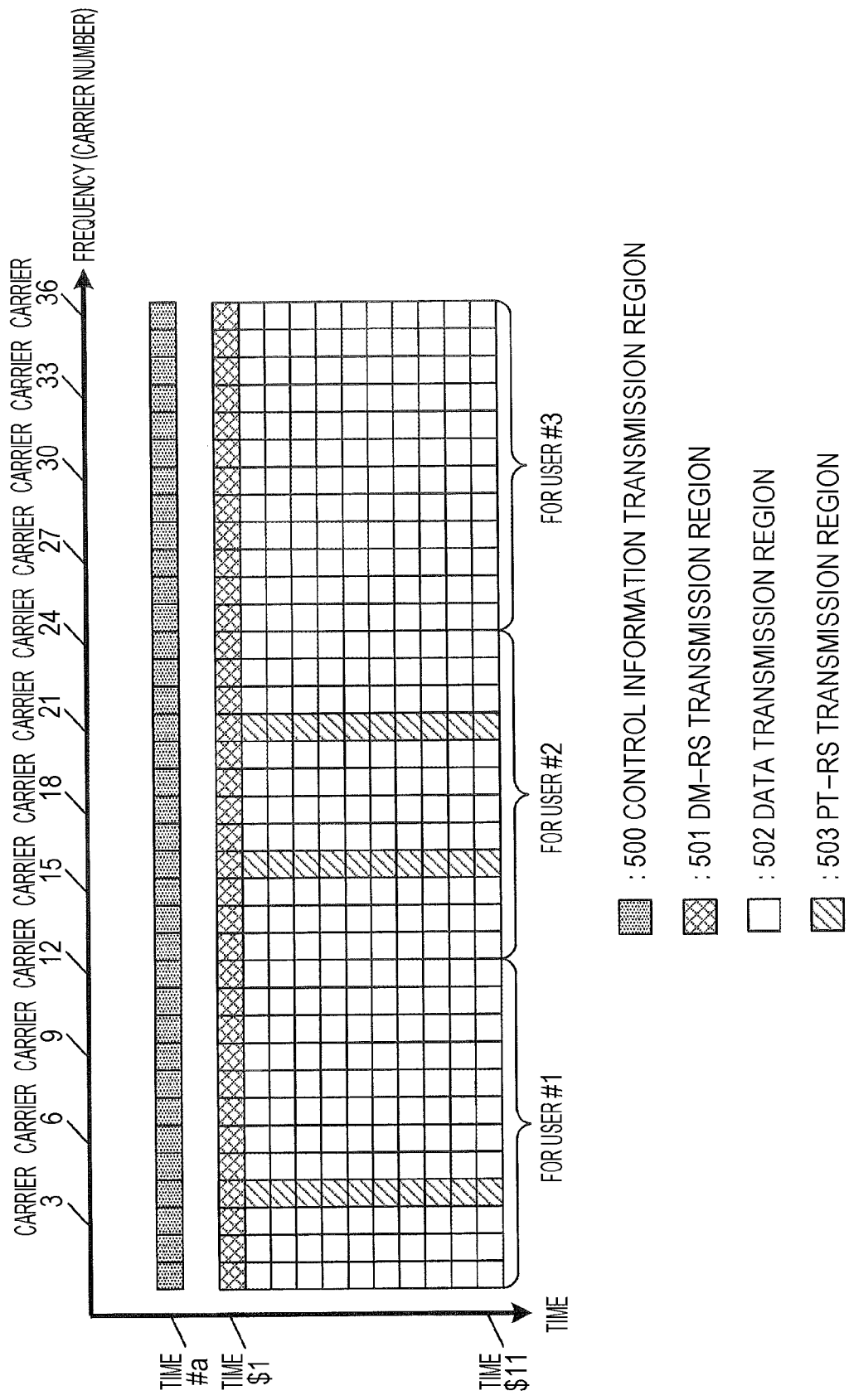
FIG. 14 is a diagram illustrating another example of the frame configuration of modulated signal 108_A according to the first embodiment.
Figure 15:
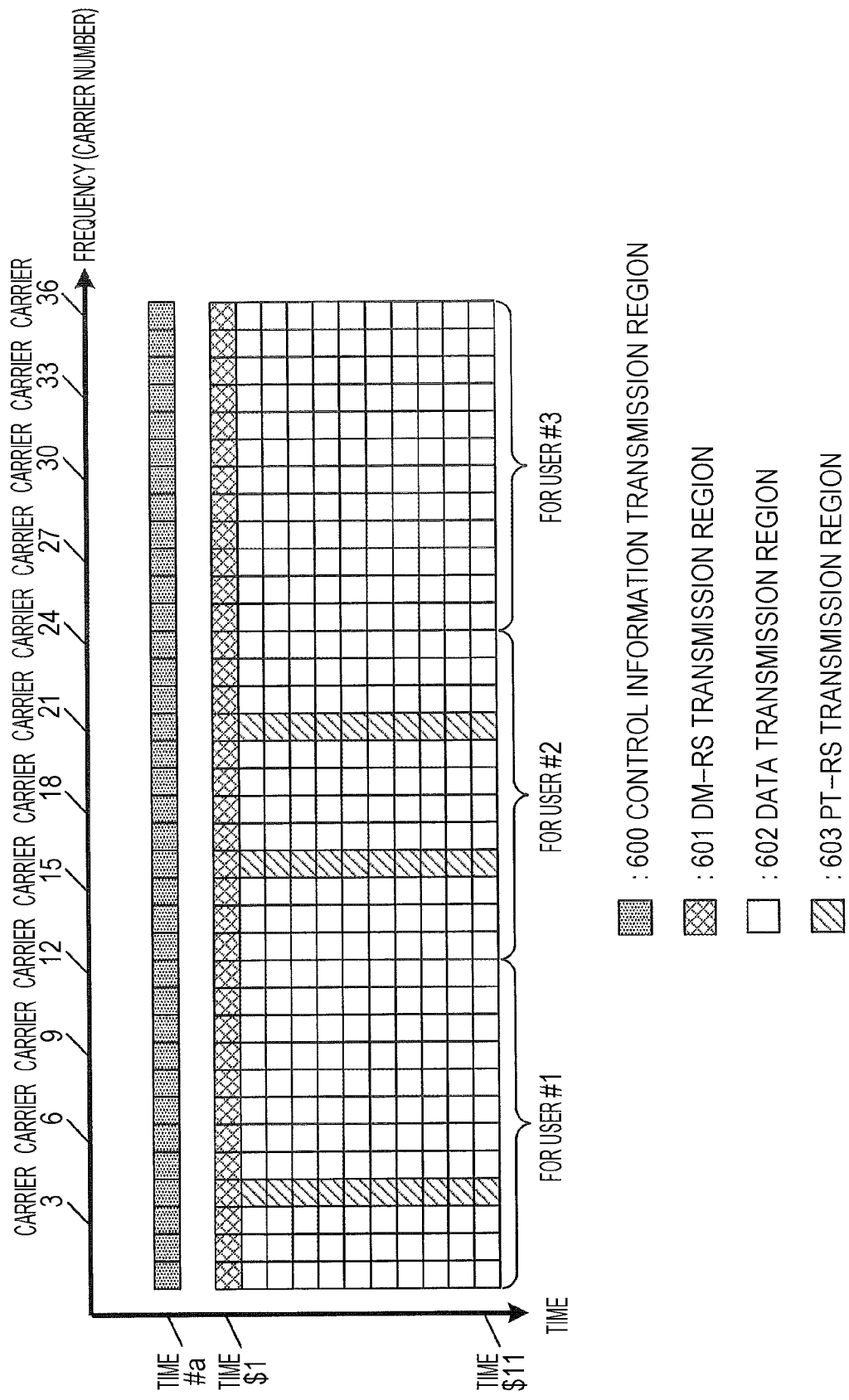
FIG. 15 is a diagram illustrating another example of the frame configuration of modulated signal 108_B according to the first embodiment.

Another example will be described with reference to FIG. 14 and FIG. 15. For example, the base station 401 transmits a modulated signal to a certain terminal (e.g., user #2) by 16 QAM. At this time, for example, PT-RS transmission regions (PT-RS symbols) are transmitted using two carriers out of the twelve carriers that are the transmission region for the user #2, as illustrated in FIG. 14 and FIG. 15. Also, the base station 401 transmits a modulated signal to a certain terminal (e.g., user #1) by QPSK. At this time, PT-RS transmission regions (PT-RS symbols) are transmitted by the base station 401 using just one carrier out of the twelve carriers that are the transmission region for the user #1 (when using carrier 1 through carrier 12, PT-RS transmission regions (PT-RS symbols) are placed only in carrier 4), as illustrated in FIG. 14 and FIG. 15. Also, the base station 401 transmits a modulated signal to a certain terminal (e.g., user #3) by BPSK. At this time, PT-RS transmission regions (PT-RS symbols) are not placed by the base station 401 in the twelve carriers that are in FIG. 14 and FIG. 15 (e.g., when carrier 25 through carrier 36 are used, PT-RS transmission regions (PT-RS symbols) do not exist in carrier 25 through carrier 36).

Note that while the number of PT-RS transmission regions (PT-RS symbols) present in twelve carriers is changed according to the modulation scheme in this example, methods of changing the frequency of insertion of PT-RS transmission regions (PT-RS symbols) is not restricted to this. For example, an example is illustrated in FIG. 7 and FIG. 8 where there is continuous placement of PT-RS transmission regions (PT-RS symbols) with regard to the temporal axis, the frequency of insertion of PT-TS transmission regions (PT-RS symbols) may be temporally switched.

Figure 16:
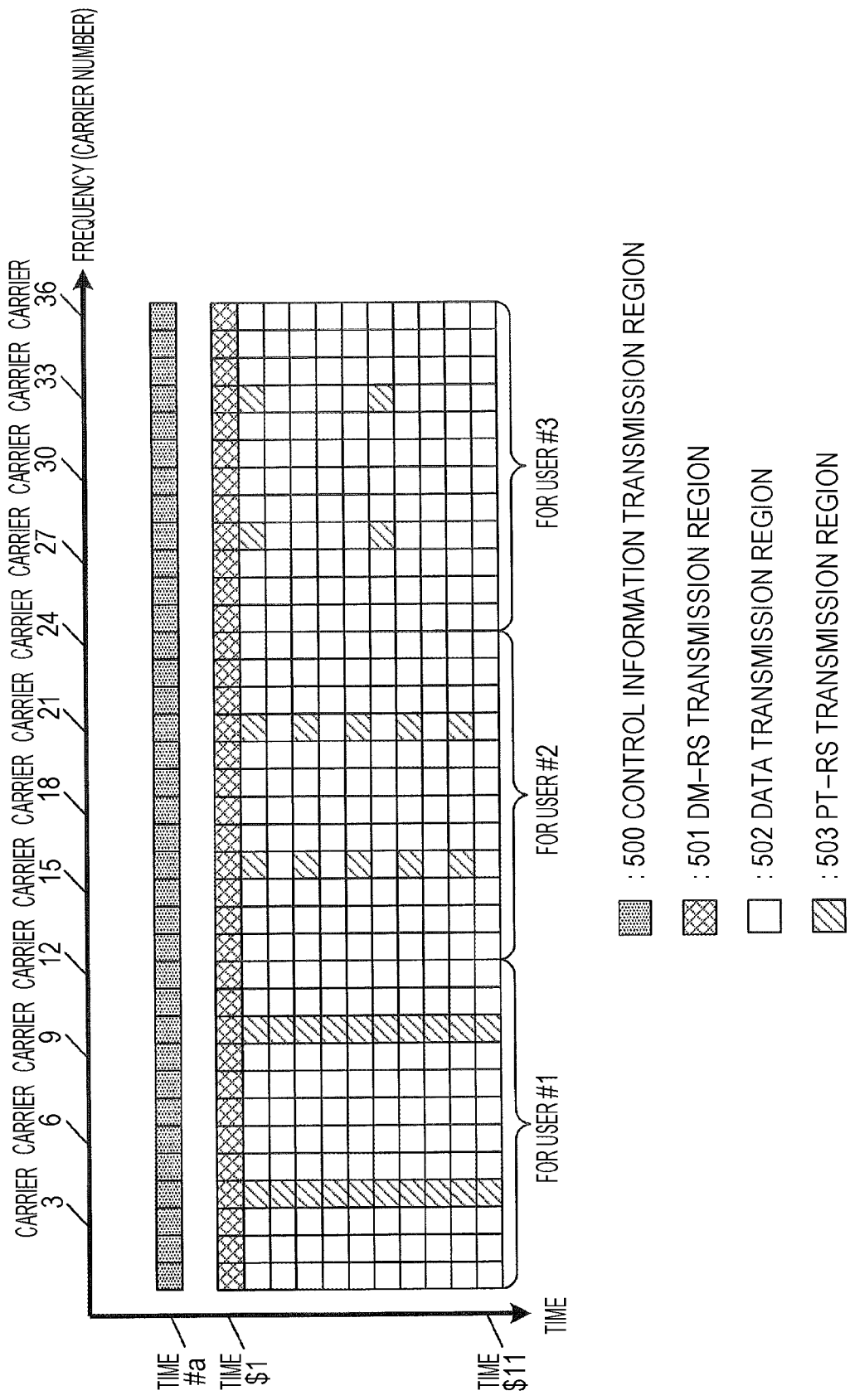
FIG. 16 is a diagram illustrating another example of the frame configuration of modulated signal 108_A according to the first embodiment.
Figure 17:
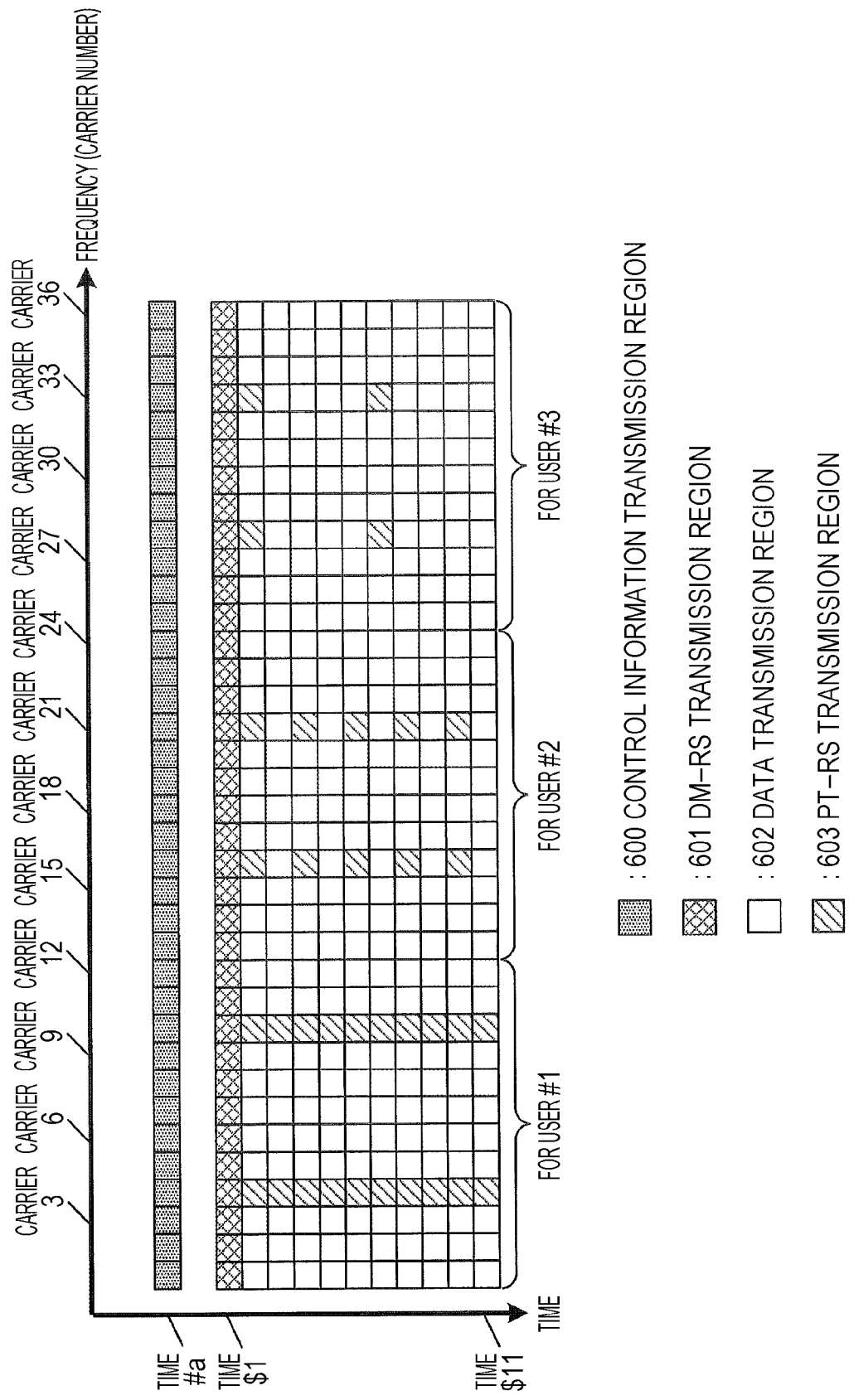
FIG. 17 is a diagram illustrating another example of the frame configuration of modulated signal 108_B according to the first embodiment.

For example, an arrangement may be made where, as illustrated in FIG. 16 and FIG. 17, PT-RS transmission regions (PT-RS symbols) are temporally continuously placed in a case where the modulation scheme of a modulated signal to be transmitted to a certain terminal (e.g., user #1) is 16QAM, a PT-RS transmission region (PT-RS symbol) is placed every two symbols based on time in a case where the modulation scheme of a modulated signal to be transmitted to a certain terminal (e.g., user #2) is QPSK, and a PT-RS transmission region (PT-RS symbol) is placed every five symbols based on time in a case where the modulation scheme of a modulated signal to be transmitted to a certain terminal (e.g., user #3) is BPSK. Also, an arrangement may be made where the frequency of insertion of PT-RS transmission regions (PT-RS symbols) is switched based on time and based on frequencies depending on the modulation scheme. Also, an arrangement may be made where the rules of insertion of PT-RS transmission regions (PT-RS symbols) is switched depending on the modulation scheme. Note that insertion rules may include a case of not inserting PT-RS transmission regions (PT-RS symbols).

Generally, the greater the number of modulation orders, the greater the influence of phase noise is. That is to say, when there is a great number of modulation orders, the influence of deterioration in reception performance due to phase noise at the terminal can be reduced by placing PT-RS transmission regions (PT-RS symbols). On the other hand, when the number of modulation orders is small, the influence of phase noise is small, so the influence of deterioration in reception performance due to phase noise is small even if there is no placement of PT-RS transmission regions (PT-RS symbols) or the insertion frequency of PT-RS transmission regions (PT-RS symbols) is low, and also this non-insertion or reduction of PT-RS transmission regions (PT-RS symbols) increases the data transmission regions (data symbols), so data transmission efficiency can be improved.

For example, in a communication system such as LTE (Long Term Evolution) or the like, the base station 401 transmits to a user (terminal) information of a MCS (Modulation and Coding Scheme) used by modulated signals that the base station 401 transmits. At this time, the base station 401 may read the modulation order (or modulation scheme) indicated in the MCS for the user (based on the modulation order (or modulation scheme) indicated in the MCS for the user) and decide whether or not to place (insert) PT-RS transmission regions (PT-RS symbols) for this user, or decide the insertion frequency or insertion rules of PT-RS transmission regions (PT-RS symbols) in the frame with regard to this user. In detail, the base station 401 decides not the MCS (i.e., combination of modulation order (or modulation scheme) and coding efficiency (transmission speed)) itself, but rather whether or not to include PT-RS transmission regions (PT-RS symbols) based on the modulation order (or modulation scheme) included in the MCS. Alternatively, the base station 401 decides not the MCS (i.e., combination of modulation order (or modulation scheme) and coding efficiency (transmission speed)) itself, but rather the insertion frequency or insertion rules of PT-RS transmission regions (PT-RS symbols) in the frame based on the modulation order (or modulation scheme) included in the MCS, for example. Note that "the insertion frequency or insertion rules in the frame" may include "case of not inserting PT-RS transmission regions (PT-RS symbols)".

Also, an arrangement may be made where the situation described below occurs. For example, assuming that 64QAM (Quadrature Amplitude Modulation) and 64APSK (Amplitude Phase Shift Keying) are selectable as modulation schemes for a modulated signal to be transmitted to a user (terminal) by the base station 401, the base station 401 decides the insertion frequency or insertion rules of PT-RS transmission regions (PT-RS symbols) to the frame, in accordance with information of the modulation scheme included in the MCS, for example. At this time, the insertion frequency (insertion rules) of PT-RS transmission regions (PT-RS symbols) to the frame in a case of the base station 401 having selected 64QAM, and the insertion frequency (insertion rules) of PT-RS transmission regions (PT-RS symbols) to the frame in a case of having selected 64APSK, may be different. Also, the insertion frequency (insertion rules) of PT-RS transmission regions (PT-RS symbols) to the frame in a case of the base station 401 having selected 64QAM, and the insertion frequency (insertion rules) of PT-RS transmission regions (PT-RS symbols) to the frame in a case of having selected 64APSK, may be different. Note that the insertion frequency or insertion rules may include a case of not inserting PT-RS transmission regions (PT-RS symbols).

Also, the base station 401 can select between (uniform) 64QAM and NU (Non-Uniform) 64QAM for the modulation scheme of a modulated signal transmitted to the user (terminal). At this time, the base station 401 decides the insertion frequency or insertion rules of PT-RS transmission regions (PT-RS symbols) to the frame, in accordance with information of the modulation scheme included in the MCS, for example, in which the insertion frequency (insertion rules) of PT-RS transmission regions (PT-RS symbols) to the frame in a case of the base station 401 having selected 64QAM, and the insertion frequency (insertion rules) of PT-RS transmission regions (PT-RS symbols) to the frame in a case of having selected NU-64QAM, may be different. Note that the insertion frequency or insertion rules may include a case of not inserting PT-RS transmission regions (PT-RS symbols). The above is an example, and can be expressed differently as follows. The base station 401 can select between a first modulation scheme and a second modulation scheme having N (wherein N is an integer of 2 or greater) signals in an in-phase I—orthogonal Q plane for the modulation scheme of a modulated signal transmitted to the user (terminal). Accordingly, the modulation order for the first modulation scheme is N, and the modulation order for the second modulation scheme is also N, but the signal point layout on the in-phase I—orthogonal Q plane in the first modulation scheme and the signal point layout on the in-phase I—orthogonal Q plane in the second modulation scheme differ. At this time, the base station 401 decides the insertion frequency or insertion rules of PT-RS transmission regions (PT-RS symbols) to the frame, in accordance with information of the modulation scheme included in the MCS, for example, in which the insertion frequency (insertion rules) of PT-RS transmission regions (PT-RS symbols) to the frame in a case of the base station 401 having selected the first modulation scheme, and the insertion frequency (insertion rules) of PT-RS transmission regions (PT-RS symbols) to the frame in a case of having selected the second modulation scheme, may be different. Note that the insertion frequency or insertion rules may include a case of not inserting PT-RS transmission regions (PT-RS symbols).

For example, in a case where the transmission speed is fast in accordance with the order of MCS indices, there are cases where an MCS index with a smaller modulation order is greater than an MCS index with a greater modulation order, depending on the combination of modulation order and coding efficiency in each MCS. Accordingly, if determination is made regarding whether or not to place PT-RS transmission regions (PT-RS symbols) is made in accordance with the MCS (index), a situation can occur where PT-RS transmission regions are placed with an MCS where the modulation order is great, and PT-RS transmission regions are not placed with an MCS where the modulation order is small. Accordingly, determining whether or not to place PT-RS transmission regions depending on the MCS may result in PT-RS transmission regions not being placed in a situation where there is need to improve the estimation precision of phase noise, and reception performance of the terminal may deteriorate.

Conversely, in the second modification, the base station 401 can appropriately judge whether or not to use PT-RS transmission regions, the insertion frequency, and insertion rules, taking into consideration the modulation order and/or signal point placement, or effects of phase noise that may be dependent on the modulation scheme, by determining whether or not to place PT-RS transmission regions or deciding the insertion frequency and insertion rules of PT-RS transmission regions, based on the modulation order included in the MCS and/or signal point placement. Accordingly, deterioration of reception performance at the terminal can be suppressed.

Third Modification

The base station 401 may switch whether or not to insert PT-RS transmission regions (PT-RS symbols), the frequency of insertion, and insertion rules, based on feedback information from the terminal.

For example, the oscillator that may be the primary cause of phase noise at conceivably is less expensive and lower in performance at the terminal as compared to the base station. Accordingly, there is a high possibility that occurrence of phase noise will be due to the oscillator of the terminal, rather than the oscillator of the base station.

Accordingly, the terminal may monitor the demodulation results of the data, and give feedback of information indicating whether or not there is a need to place PT-RS transmission regions (PT-RS symbols), the frequency of insertion, and insertion rules to the base station 401. The base station 401 then allocates PT-RS transmission regions (PT-RS symbols) to terminals where there is great influence of phase noise, and allocates no PT-RS transmission regions (PT-RS symbols) to terminals where there is little influence of phase noise. Alternatively, the base station 401 densely inserts PT-RS transmission regions (PT-RS symbols) with regard to terminals where there is great influence of phase noise, and sparsely inserts PT-RS transmission regions (PT-RS symbols) with regard to terminals where there is little influence of phase noise.

Accordingly, phase noise can be estimated using PT-RS transmission regions (PT-RS symbols) for terminals where there is great influence of phase noise, and reduce the effects of phase noise. On the other hand, PT-RS transmission regions (PT-RS symbols) are not inserted or inserted with a sparse frequency for terminals where there is little influence of phase noise, so data transmission efficiency can be improved due to the increase in PT-RS transmission regions (PT-RS symbols).

Fourth Modification

Precoding of DMRS, data, and PT-RS is set with regard to each terminal (reception apparatus). Accordingly, at the time of a certain terminal using the PT-RS of another terminal to estimate phase noise as described above, the difference in precoding among the terminals is problematic. That is to say, in a case where precoding differs from another terminal, there is a problem that the terminal cannot use the PR-RS of the other terminal as it is.

Accordingly, the PT-RS symbols for each terminal are made to be in adjacent frequency regions in a fourth modification to solve this problem.

Figure 18:
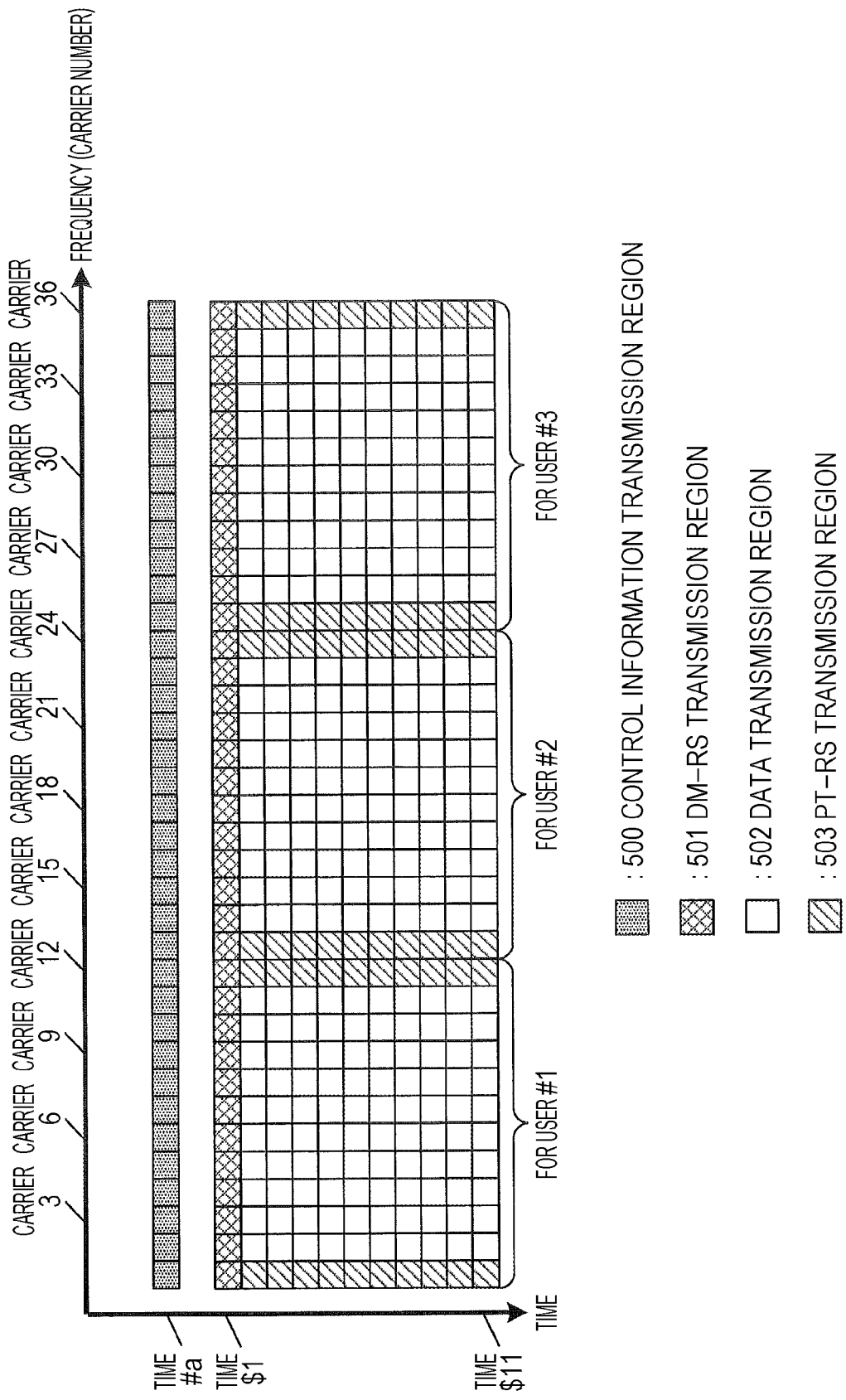
FIG. 18 is a diagram illustrating another example of the frame configuration of modulated signal 108_A according to the first embodiment.
Figure 19:
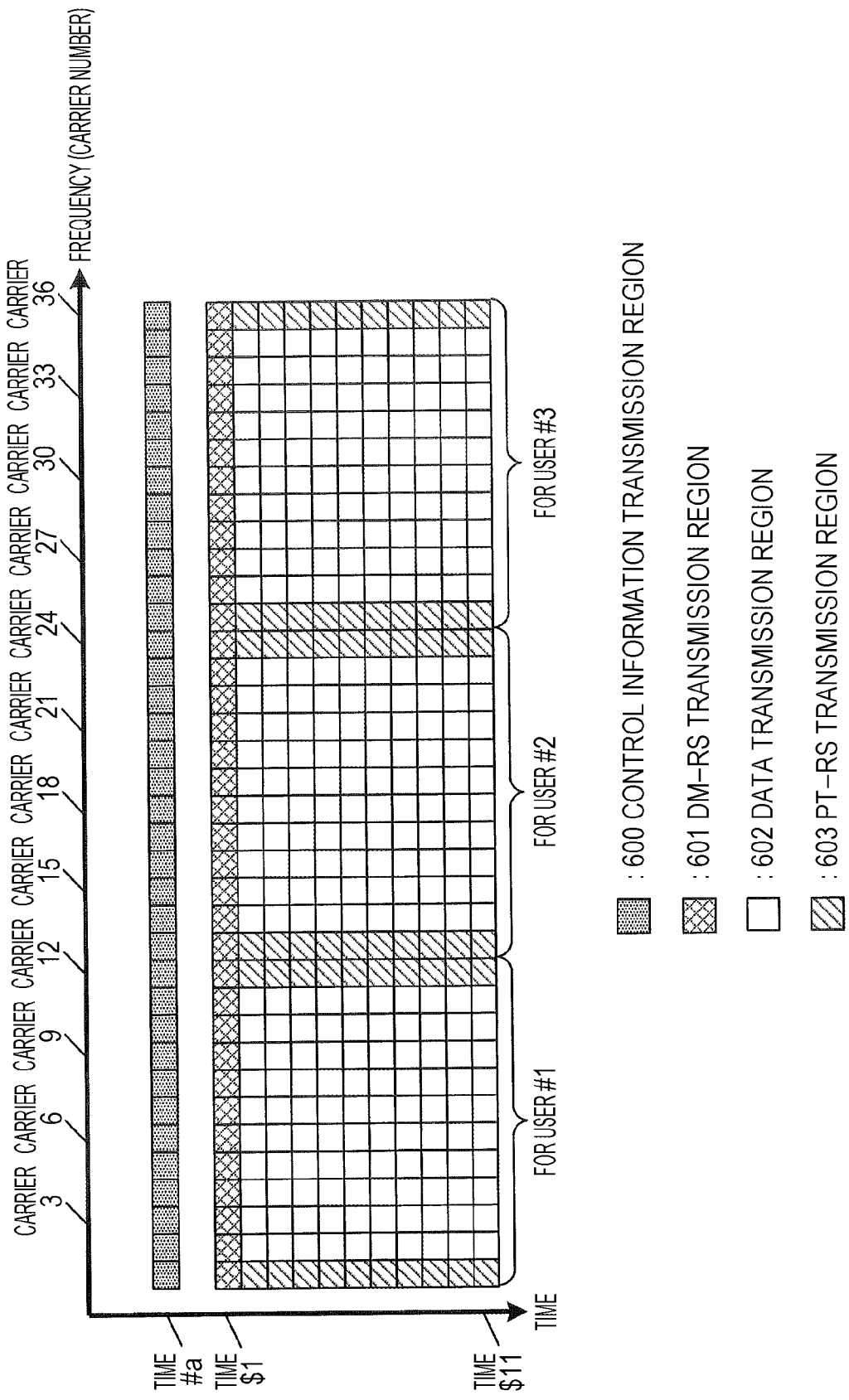
FIG. 19 is a diagram illustrating another example of the frame configuration of modulated signal 108_B according to the first embodiment.

FIG. 18 illustrates a modification of the frame configuration of a modulated signal 108_A in FIG. 7 described in the above embodiment, and FIG. 19 illustrates a modification of the frame configuration of a modulated signal 108_B in FIG. 8 described in the above embodiment.

The point where FIG. 18 and FIG. 19 differ from FIG. 7 and FIG. 8 is that the PT-RS symbols for each user in the PT-RS transmission regions 503 and 603 are placed at the highest frequency (carrier) and lowest frequency (carrier) of the transmission region (resources) that each user uses. That is to say, the base station 401 allocates the PT-RS transmission regions (PT-RS symbols) at the highest frequency and the lowest frequency of the resources allocated to the terminal.

Accordingly, depending on user appropriation, the PT-RS transmission regions 503 and 603 are placed in two consecutive carriers. For example, in FIG. 18 and FIG. 19, PT-RS symbols for different users are placed in adjacent frequencies (carriers), at (carrier 12 and carrier 13), and (carrier 24 and carrier 25).

Thus, when there are PT-RS transmission regions placed in consecutive carriers, the terminal (reception apparatus) can easily perform estimation of intercarrier interference (ICI: Inter-Carrier Interference). Note that at the time of a terminal estimating the ICI using PT-RS transmission regions placed in consecutive carriers, the precoding matrix used in the transmission region of the user #1, the precoding matrix used in the transmission region of the user #2, and the precoding matrix used in the transmission region of the user #3 may be the same, or may be different.

Further, even in a case where the precoding matrix used in the transmission region of the user #1, the precoding matrix used in the transmission region of the user #2, and the precoding matrix used in the transmission region of the user #3 are different, each terminal can estimate phase noise using DM-RS symbols in the DM-RS transmission regions of other users.

For example, in FIG. 18 and FIG. 19, the terminal (reception apparatus) of the user #2 can estimate phase noise using the DM-RS transmission regions in carrier 13 and carrier 24 within the transmission region of the user #2. Further, the terminal of the user #2 can estimate phase noise using the DM-RS transmission region in carrier 12 within the transmission region of the user #1 and the DM-RS transmission region in carrier 25 within the transmission region of the user #3, in order to estimate phase noise.

Now, the carrier 13 that is a transmission region of the user #2 and the carrier 12 that is a transmission region of the user #1 are adjacent, and channel fluctuations of the carrier 13 and carrier 12 can be deemed to be almost equal. Accordingly, the terminal of the user #2 can estimate the precoding matrix used in the transmission region for the user #1, using the DM-RS transmission region of the carrier 12 within the transmission region for the user #1 and the DM-RS transmission region of the carrier 13 within the transmission region for the user #2.

In detail, the reception signal level estimated at the terminal using the DM-RS transmission region is decided from channel characteristics of this DM-RS transmission region, and the precoding matrix used in this DM-RS transmission region. Accordingly, the terminal of the user #2 comprehends the precoding matrix used in the transmission region of the user #2, and thus can estimate the channel fluctuation (channel characteristics) of the carrier 13 from the reception signal level measured in the DM-RS transmission region in the carrier 13 within the transmission region of the user #2. The estimated channel characteristics of the carrier 13 and the channel characteristics of the carrier 12 can be deemed to be equal, so the terminal of the user #2 can estimate the precoding matrix used in the transmission region of the user #1 from the reception signal level measured in the DM-RS transmission region of the carrier 12.

Thus, the terminal of the user #2 can estimate the phase noise using the PT-RS transmission region of the carrier 12 within the transmission region of the user #1, by estimating the precoding matrix used in the transmission region of the user #1 by using the DM-RS transmission region of the carrier 12 that is a transmission region of the user #1. Accordingly, even in a case where the precoding used differs between the user #2 and the user #1, the terminal of the user #2 can perform phase estimation using the PT-RS of the user #1 in addition to the PT-RS of the user #2, and phase estimation precision can be improved.

Further, intercarrier interference can be easily estimated by the terminal, by using adjacent carriers as described above.

In the same way, the carrier 24 that is a transmission region of the user #2 and the carrier 25 that is a transmission region of the user #3 are adjacent, and channel fluctuations of the carrier 24 and carrier 25 can be deemed to be almost equal. Accordingly, the terminal of the user #2 can estimate the precoding matrix used in the transmission region for the user #3, using the DM-RS transmission region of the carrier 24 within the transmission region for the user #2 and the DM-RS transmission region of the carrier 25 within the transmission region for the user #3. Accordingly, even in a case where the precoding used differs between the user #2 and the user #3, the terminal of the user #2 can perform phase estimation using the PT-RS of the user #3 in addition to the PT-RS of the user #2, and phase estimation precision can be improved. Further, intercarrier interference can be easily estimated by the terminal, by using adjacent carriers, as described above.

Note that the carriers where PT-RS transmission regions are placed are not restricted to two carriers per user as illustrated in FIG. 7 and FIG. 8, and the same can be carried out if PT-RS transmission regions are disposed with one carrier or more for each user. There may be cases where no PT-RS transmission region is disposed for a certain user.

Fifth Modification

In a fifth modification, the base station 401 (transmission apparatus) allocates PT-RS transmission regions in a resource region (resource block) where there is no user appropriation. Each terminal (reception apparatus) that is a communication partner with the base station 401 can use the PT-RS transmission regions that exist in the region with no user appropriation for phase noise estimation. Accordingly, each terminal can improve the estimation precision for phase noise, and the reception quality of data can be improved.

A first example through a fourth example will be described as an example of the frame configuration in the fifth modification.

First Example

Figure 20:
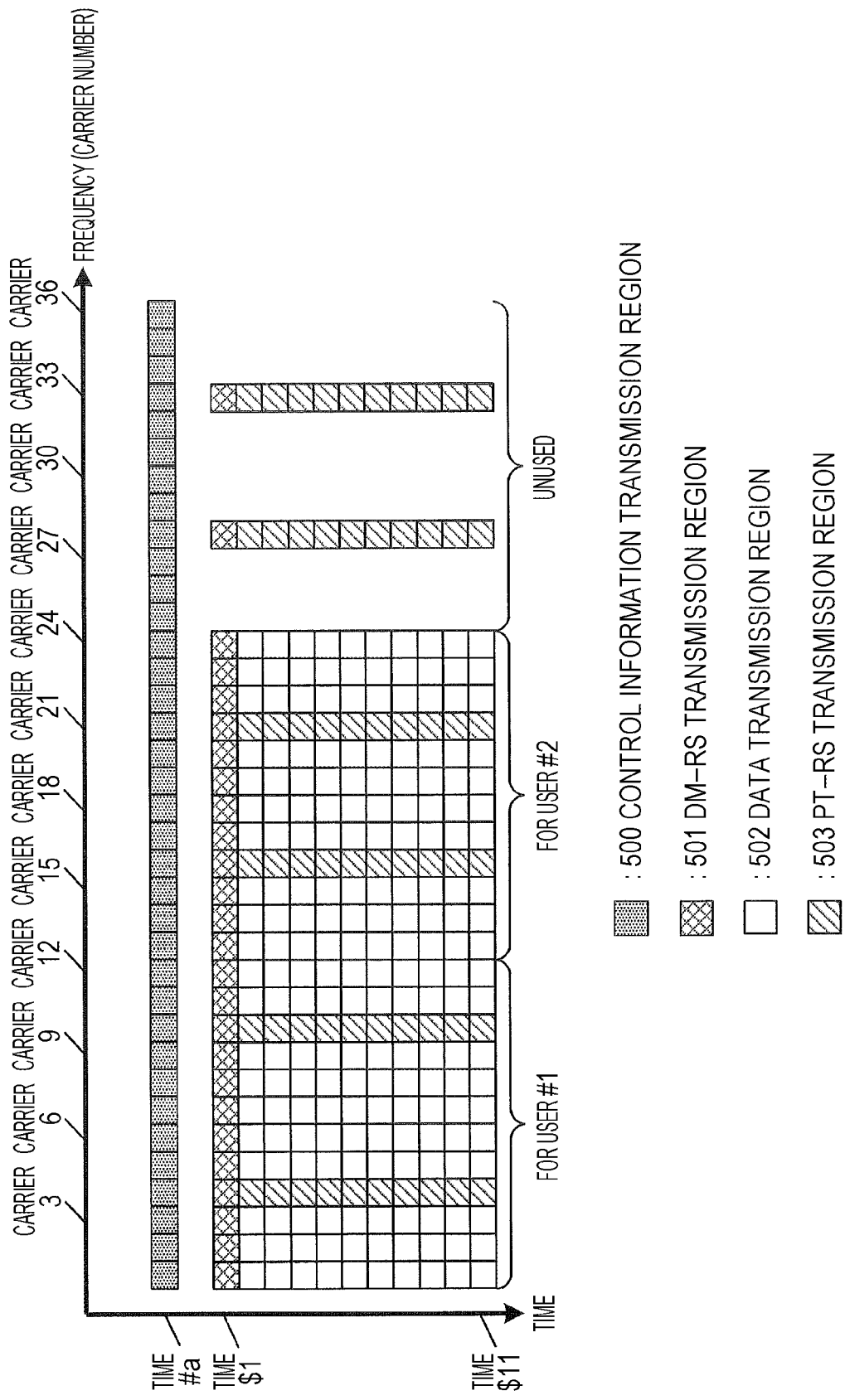
FIG. 20 is a diagram illustrating another example of the frame configuration of modulated signal 108_A according to the first embodiment.
Figure 21:
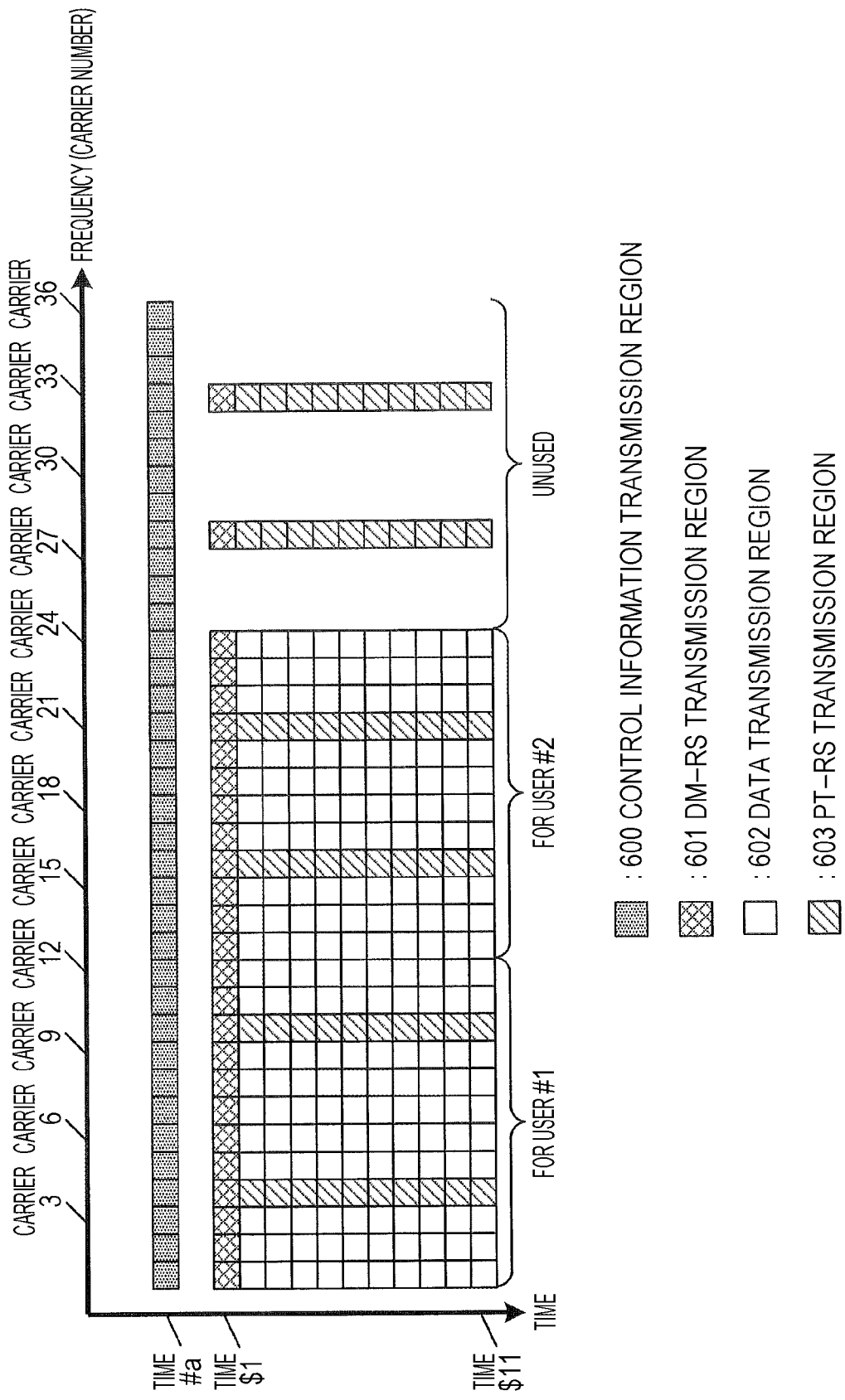
FIG. 21 is a diagram illustrating another example of the frame configuration of modulated signal 108_B according to the first embodiment.

FIG. 20 illustrates a modification of the frame configuration of the modulated signal 108_A in FIG. 7 described in the embodiment above, and FIG. 21 illustrates a modification of the frame configuration of the modulated signal 108_B in FIG. 8 described in the embodiment above.

FIG. 20 and FIG. 21 differ from FIG. 7 and FIG. 8 with regard to the point that there is an unused time-frequency region where no user data transmission region has been allocated, and that the PT-RS transmission regions 503 and 603 and DM-RS transmission regions 501 and 601 are placed in the unused time-frequency region.

For example, the terminal (reception apparatus) of the user #2 uses the PT-RS transmission region directed toward the user #2, i.e., the PT-RS transmission regions 503 and 603 in the carrier 16 and carrier 21 illustrated in FIG. 20 and FIG. 21, for phase noise estimation. Further, the terminal of the user #2 may use at least the PT-RS transmission region (DM-RS transmission region may be used) inserted to the unused time-frequency region, in addition to the PT-RS transmission regions directed toward itself, i.e., the PT-RS transmission regions 503 and 603 in the carrier 28 and carrier 33 illustrated in FIG. 20 and FIG. 21 (the DM-RS transmission regions 501 and 601 may be used), for phase noise estimation. Accordingly, the terminal of the user #2 can improve the estimation precision of phase noise, and can improve reception quality of data.

The DM-RS transmission regions 501 and 601 are placed at time $1 in the carrier 28 and carrier 33 illustrated in FIG. 20 and FIG. 21, in the same way as in the transmission region for the user #1 and the transmission region for the user #2. Thus, the terminal of the user #2 (or user #1) can perform channel estimation using the DM-RS transmission regions 501 and 601 in carrier 28 and carrier 33. Accordingly, the terminal of the user #2 (or user #1) can improve channel estimation precision, and can improve reception quality of data.

Note that the carriers where PT-RS transmission regions are placed are not restricted to two carriers per user as illustrated in FIG. 20 and FIG. 21, and the same can be carried out if PT-RS transmission regions are disposed in one or more carriers for each user. There may be cases where no PT-RS transmission region is disposed for a certain user.

Also, the PT-RS transmission regions placed in the unused time-frequency region where there is no user appropriation are not restricted to two carriers, and the same can be carried out if PT-RS transmission regions are placed in one or more carriers. The configuration of the DM-RS transmission regions placed in the unused time-frequency region where there is no user appropriation is not restricted to that illustrated in FIG. 20 and FIG. 21, and two or more may be placed at time $1.

Note that in FIG. 20 and FIG. 21, DM-RS transmission regions are placed in carrier 28 and carrier 33 where PT-RS transmission regions are placed. This is advantageous in that the terminals can easily use the PT-RS transmission regions for phase noise estimation.

For example, the precoding used at the transmission region for the user #1 and the precoding matrix used at the transmission region for the user #2 is the same, this precoding matrix being expressed as Fc.

At this time, using the precoding matrix Fc is one suitable method at the PT-RS transmission regions (and DM-RS transmission regions) in carrier 28 and carrier 33 in FIG. 20 and FIG. 21. For example, there is the advantage that the terminal of the user #2 can easily use the PT-RS transmission regions (and DM-RS transmission regions) in carrier 28 and carrier 33 for estimation of phase noise, since the precoding matrix used in the transmission region transmitted to itself and the precoding matrix used in carrier 28 and carrier 33 are the same.

As another suitable method, precoding is not performed, or a precoding matrix Fx is that in the following Expressions (30) or (31) in the PT-RS transmission regions (and DM-RS transmission regions) in carrier 28 and carrier 33 in FIG. 20 and FIG. 21.

[Math. 30]

$$Fx = \begin{pmatrix} 1 & 0 \\ 0 & 1 \end{pmatrix} \quad \text{Expression (30)}$$

Alternatively,

[Math. 31]

$$Fx = \begin{pmatrix} c & 0 \\ 0 & c \end{pmatrix} \quad \text{Expression (31)}$$

Note that c is a real number other than 0.

Accordingly, there is the advantage that the terminal of the user #2 can easily know the precoding matrix used at the carrier 28 and carrier 33, and can easily use the PT-RS transmission regions (and DM-RS transmission regions) in carrier 28 and carrier 33 for phase noise estimation. The base station 401 (transmission apparatus) does not have to perform complex arithmetic by precoding matrix in the carrier 28 and carrier 33, yielding an advantage in that the amount of computation can be reduced. Note however, that the precoding method (precoding matrix used) in the PT-RS transmission regions (and DM-RS transmission regions) in carrier 28 and carrier 33 in FIG. 20 and FIG. 21 is not restricted to the above example.

Next, a case where a precoding matrix is set for each user will be described with reference to FIG. 20 and FIG. 21. In this case, Expression (30) and Expression (31) can be listed as precoding matrices suitable for the PT-RS transmission regions (and DM-RS transmission regions) placed in the unused time-frequency region where there is no user appropriation in FIG. 20 and FIG. 21. Note however, that the precoding method (precoding matrix to be used) in the PT-RS transmission regions (and DM-RS transmission regions) is not restricted to the above example.

Accordingly, there is the advantage that the terminal of the user #2 can easily know the precoding matrix used at the carrier 28 and carrier 33, and can easily use the PT-RS transmission regions (and DM-RS transmission regions) in carrier 28 and carrier 33 for phase noise estimation. The base station 401 does not have to perform complex arithmetic by precoding matrix in the carrier 28 and carrier 33, yielding an advantage in that the amount of computation can be reduced.

Note however, that the precoding method to be used in the PT-RS transmission regions (and DM-RS transmission regions) in carrier 28 and carrier 33, for example, which is placed in the unused time-frequency region where there is no user appropriation, is not restricted to the above example.

Second Embodiment

Figure 22:
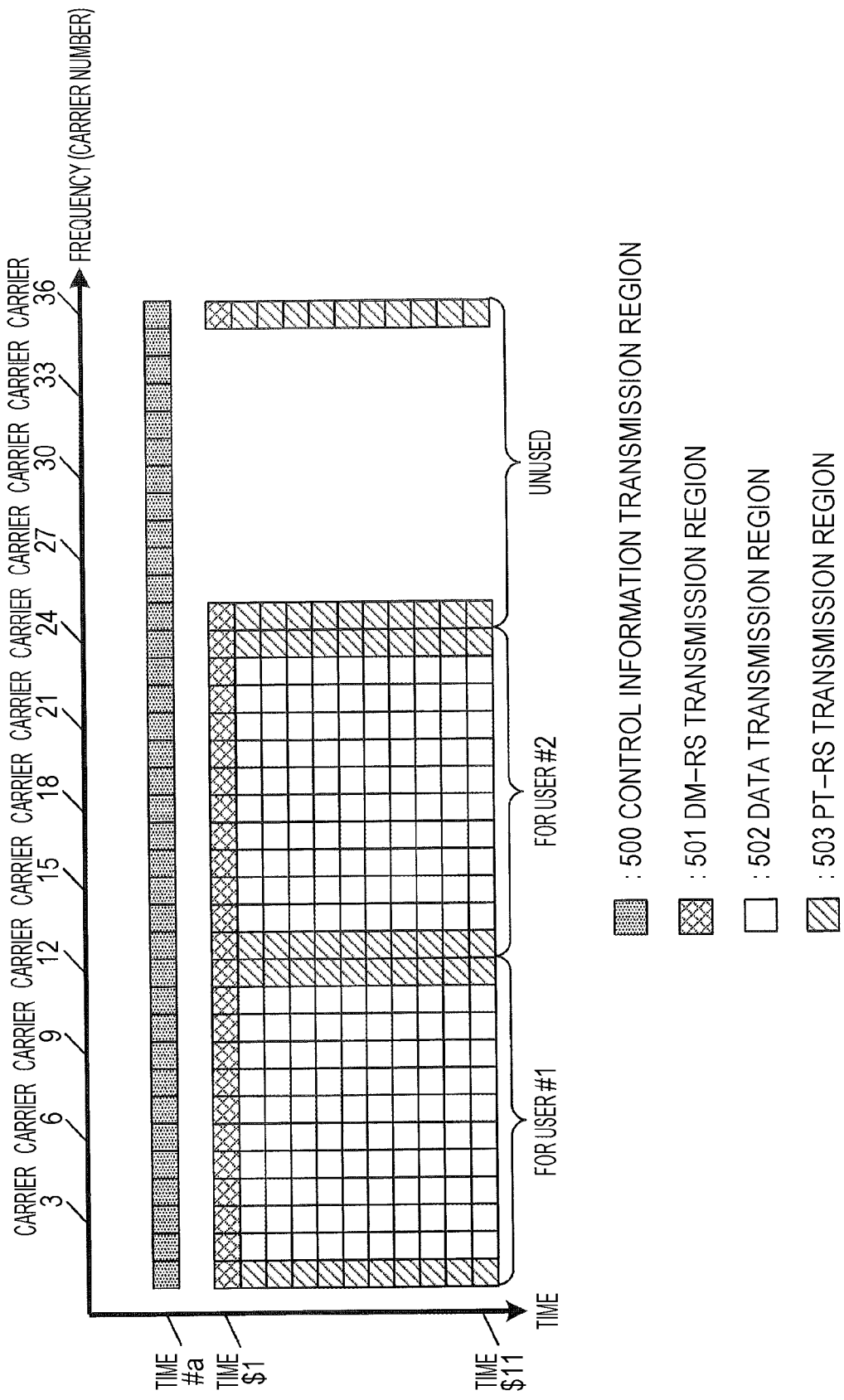
FIG. 22 is a diagram illustrating another example of the frame configuration of modulated signal 108_A according to the first embodiment.
Figure 23:
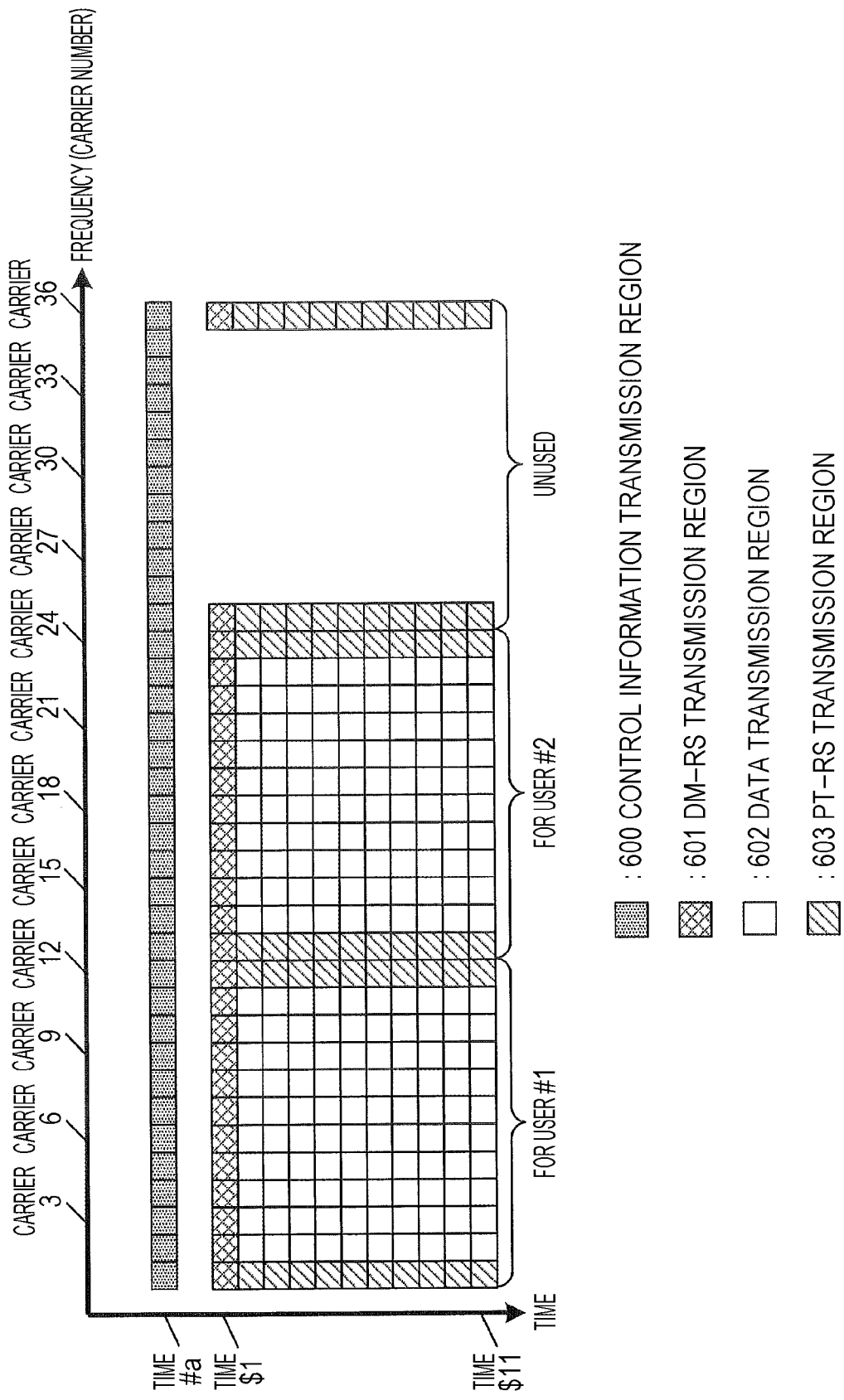
FIG. 23 is a diagram illustrating another example of the frame configuration of modulated signal 108_B according to the first embodiment.

FIG. 22 illustrates a modification of the frame configuration of the modulated signal 108_A in FIG. 7 described in the embodiment above, and FIG. 23 illustrates a modification of the frame configuration of the modulated signal 108_B in FIG. 8 described in the embodiment above.

FIG. 22 and FIG. 23 differ from FIG. 7 and FIG. 8 with regard to the point that there is an unused time-frequency region where no user data transmission region has been allocated, and that the PT-RS transmission regions 503 and 603, and DM-RS transmission regions 501 and 601, are placed in the unused time-frequency region, in the same way as in the first example (FIG. 20 and FIG. 21).

In FIG. 22 and FIG. 23, the PT-RS transmission regions (and DM-RS transmission regions) are placed at the lowest frequency and the highest frequency of the user transmission regions or unused region, and the PT-RS symbol are in adjacent frequency regions, as in the fourth modification (FIG. 18 and FIG. 19).

Accordingly, the phase estimation precision can be improved, and further, intercarrier interference can be readily estimated, in the same way as with the fourth modification.

The configuration method of PT-RS transmission regions and DM-RS transmission regions placed in the unused time-frequency region where there is no user appropriation, the configuration method of precoding matrices used on each transmission region, and advantages thereof, are the same as described in the first example, so description will be omitted.

Third Example

Figure 24:
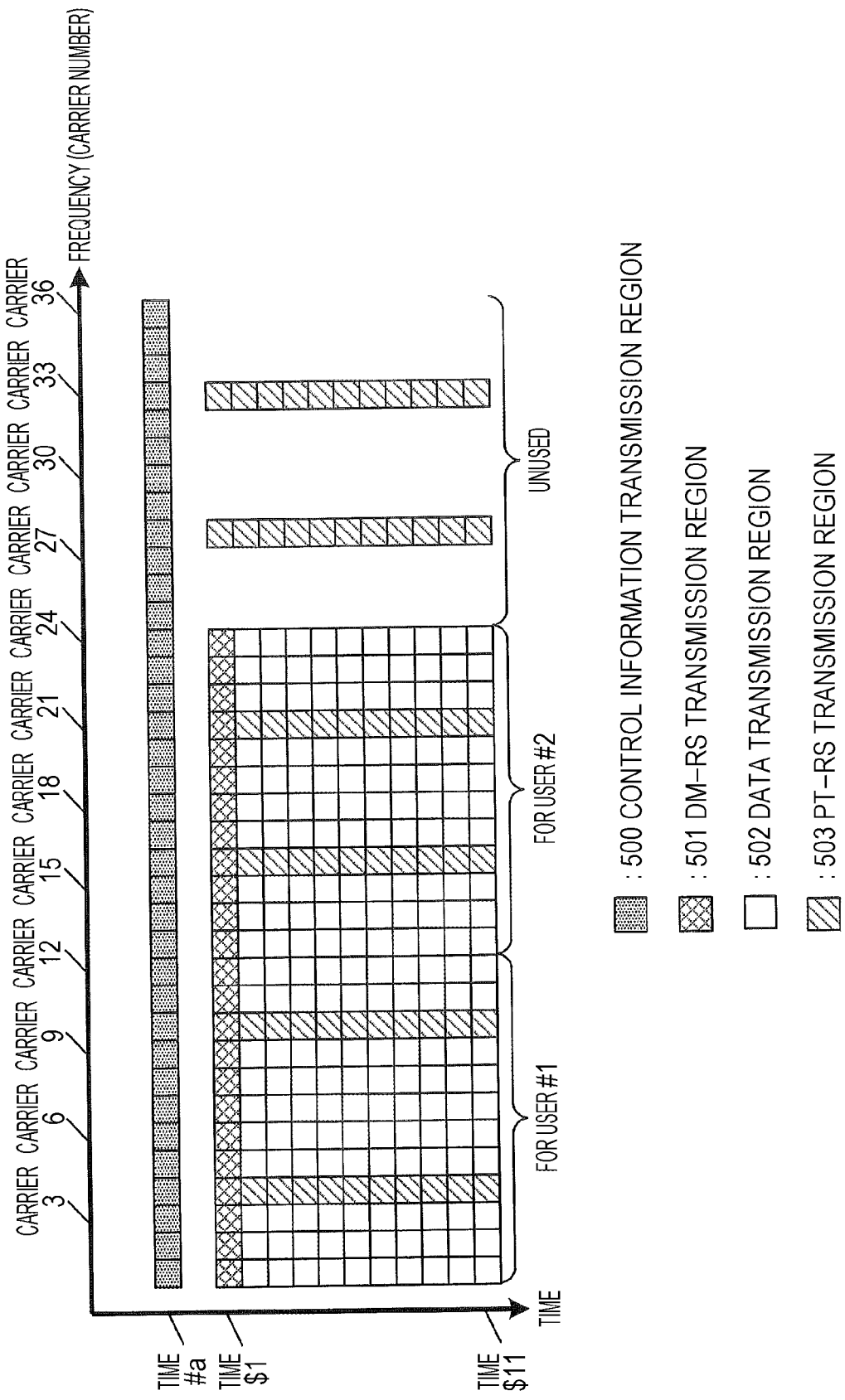
FIG. 24 is a diagram illustrating another example of the frame configuration of modulated signal 108_A according to the first embodiment.
Figure 25:
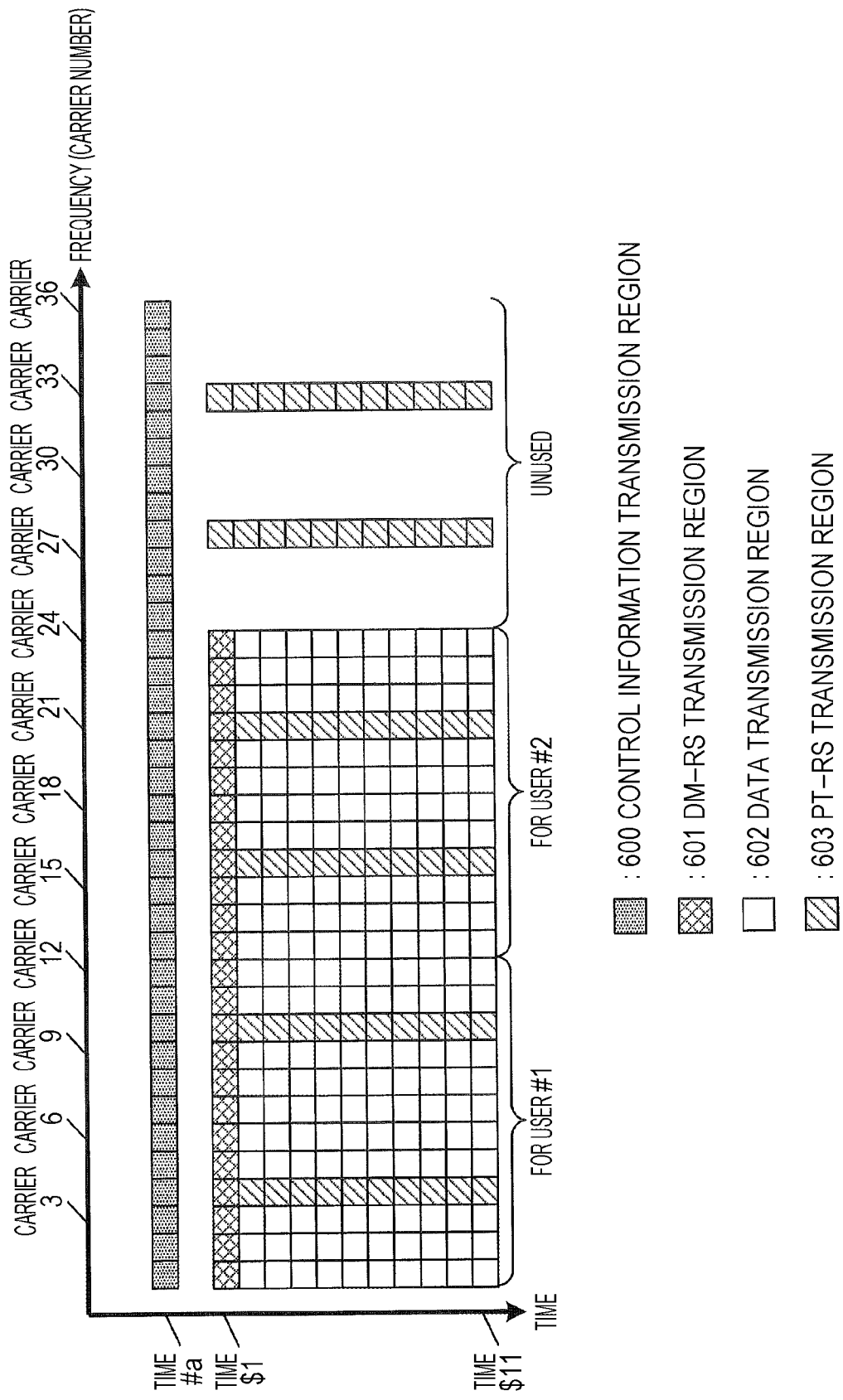
FIG. 25 is a diagram illustrating another example of the frame configuration of modulated signal 108_B according to the first embodiment.

FIG. 24 illustrates a modification of the frame configuration of the modulated signal 108_A in FIG. 7 described in the embodiment above, and FIG. 25 illustrates a modification of the frame configuration of the modulated signal 108_B in FIG. 8 described in the embodiment above.

In FIG. 24 and FIG. 25, there is an unused time-frequency region where no user data transmission region has been allocated, and the PT-RS transmission regions 503 and 603 are placed in the unused time-frequency region, in the same way as in the first example (FIG. 20 and FIG. 21). A characteristic point in FIG. 24 and FIG. 25 is that PT-RS transmission regions are placed in the unused time-frequency region where there is no user appropriation, at time $1 where the DM-RS transmission regions 501 and 601 are placed in the transmission region of the user #1 and the transmission region of the user #2.

For example, the terminal of the user #2 uses the PT-RS transmission regions for the user #2, i.e., the PT-RS transmission regions 503 and 603 in carrier 16 and carrier 21 illustrated in FIG. 24 and FIG. 25, for phase noise estimation. Further, the terminal of the user #2 may use at least the PT-RS transmission regions inserted into the unused time-frequency region, i.e., the PT-RS transmission regions 503 and 603 in the carrier 28 and carrier 33 illustrated in FIG. 24 and FIG. 25, for phase noise estimation, in addition to the PT-RS transmission region for itself. Accordingly, the terminal of the user #2 can improve estimation precision of phase noise, and improve reception quality of data.

Also, by the PT-RS transmission regions 503 and 603 being placed at time $1 in the carrier 28 and carrier 33 illustrated in FIG. 24 and FIG. 25, the terminal of the user #2 (and user #1) can perform channel estimation and/or phase noise estimation, using the PT-RS transmission regions in carrier 28 and carrier 33. Accordingly, the estimation precision of distortion (e.g., channel fluctuation, effects of phase noise) can be improved, and reception quality of data can be improved.

Also, no DM-RS transmission region is provided at time $1 in the carrier 28 and carrier 33 illustrated in FIG. 24 and FIG. 25, so the terminal of user #2 (and user #1) does not have to give thought to a precoding matrix for DM-RS transmission region. That is to say, the terminal of user #2 (and user #1) only needs to give consideration to precoding matrices for PT-RS transmission regions. Accordingly, this is advantageous in that estimation of distortion (e.g., channel fluctuation, effects of phase noise) can be simplified.

Note that the carriers where PT-RS transmission regions are placed are not restricted to two carriers per user as illustrated in FIG. 24 and FIG. 25, and the same can be carried out if PT-RS transmission regions are disposed in one or more carriers for each user. There may be cases where no PT-RS transmission region is disposed for a certain user.

Also, the PT-RS transmission regions placed in the unused time-frequency region where there is no user appropriation are not restricted to two carriers, and the same can be carried out if PT-RS transmission regions are placed in one or more carriers.

Here, for example, the precoding used at the transmission region for the user #1 and the precoding matrix used at the transmission region for the user #2 is the same, and this precoding matrix is expressed as Fc.

At this time, using the precoding matrix Fc is one suitable method at the PT-RS transmission regions in carrier 28 and carrier 33 in FIG. 24 and FIG. 25. For example, there is the advantage that the terminal of the user #2 can easily use the PT-RS transmission regions in carrier 28 and carrier 33 for estimation of phase noise, since the precoding matrix used in the transmission region transmitted to itself and the precoding matrix used in carrier 28 and carrier 33 are the same.

As another suitable method, precoding is not performed, or the precoding matrix Fx is that in the following Expressions (30) or (31) in the PT-RS transmission regions in carrier 28 and carrier 33 in FIG. 24 and FIG. 25.

Accordingly, there is the advantage that the terminal of the user #2 can easily know the precoding matrix used at the carrier 28 and carrier 33, and can easily use the PT-RS transmission regions in carrier 28 and carrier 33 for phase noise estimation (and channel estimation), for example. The base station 401 does not have to perform complex arithmetic by precoding matrix in the carrier 28 and carrier 33, yielding the advantage in that the amount of computation can be reduced.

Next, a case where a precoding matrix is set for each user will be described with reference to FIG. 24 and FIG. 25. In this case, Expression (30) and Expression (31) can be listed as precoding matrices suitable for the PT-RS transmission regions placed in the unused time-frequency region where there is no user appropriation in FIG. 24 and FIG. 24.

Accordingly, there is the advantage that the terminal of the user #2 can easily know the precoding matrix used at the carrier 28 and carrier 33, and can easily use the PT-RS transmission regions in carrier 28 and carrier 33 for phase noise estimation (and channel estimation), for example. The base station 401 does not have to perform complex arithmetic by precoding matrix in the carrier 28 and carrier 33, yielding an advantage in that the amount of computation can be reduced.

Note however, that the precoding matrix used in the PT-RS transmission regions in carrier 28 and carrier 33 for example, placed in the unused time-frequency region where there is no user data appropriation, is not restricted to the above example.

Fourth Example

Figure 26:
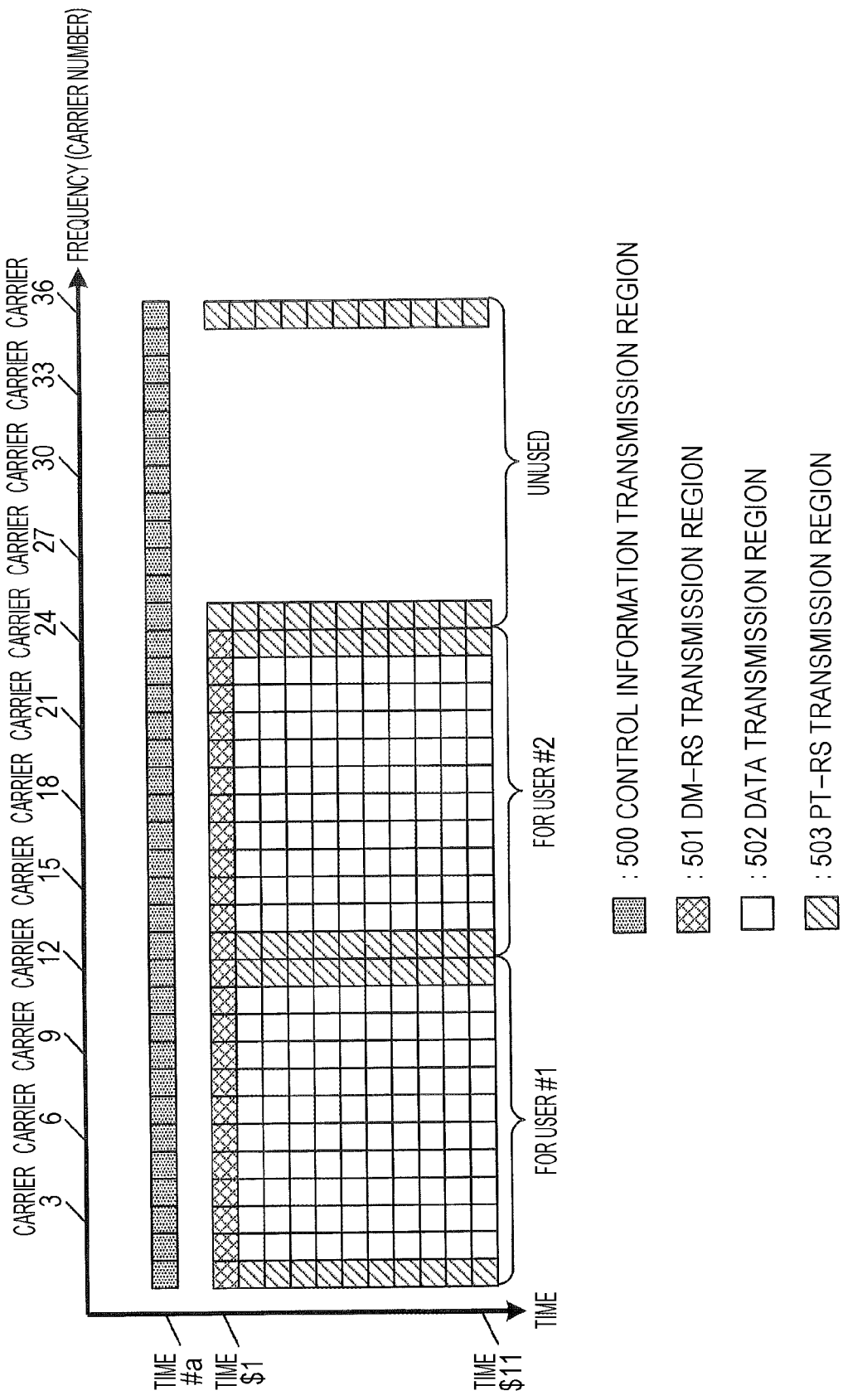
FIG. 26 is a diagram illustrating another example of the frame configuration of modulated signal 108_A according to the first embodiment.
Figure 27:
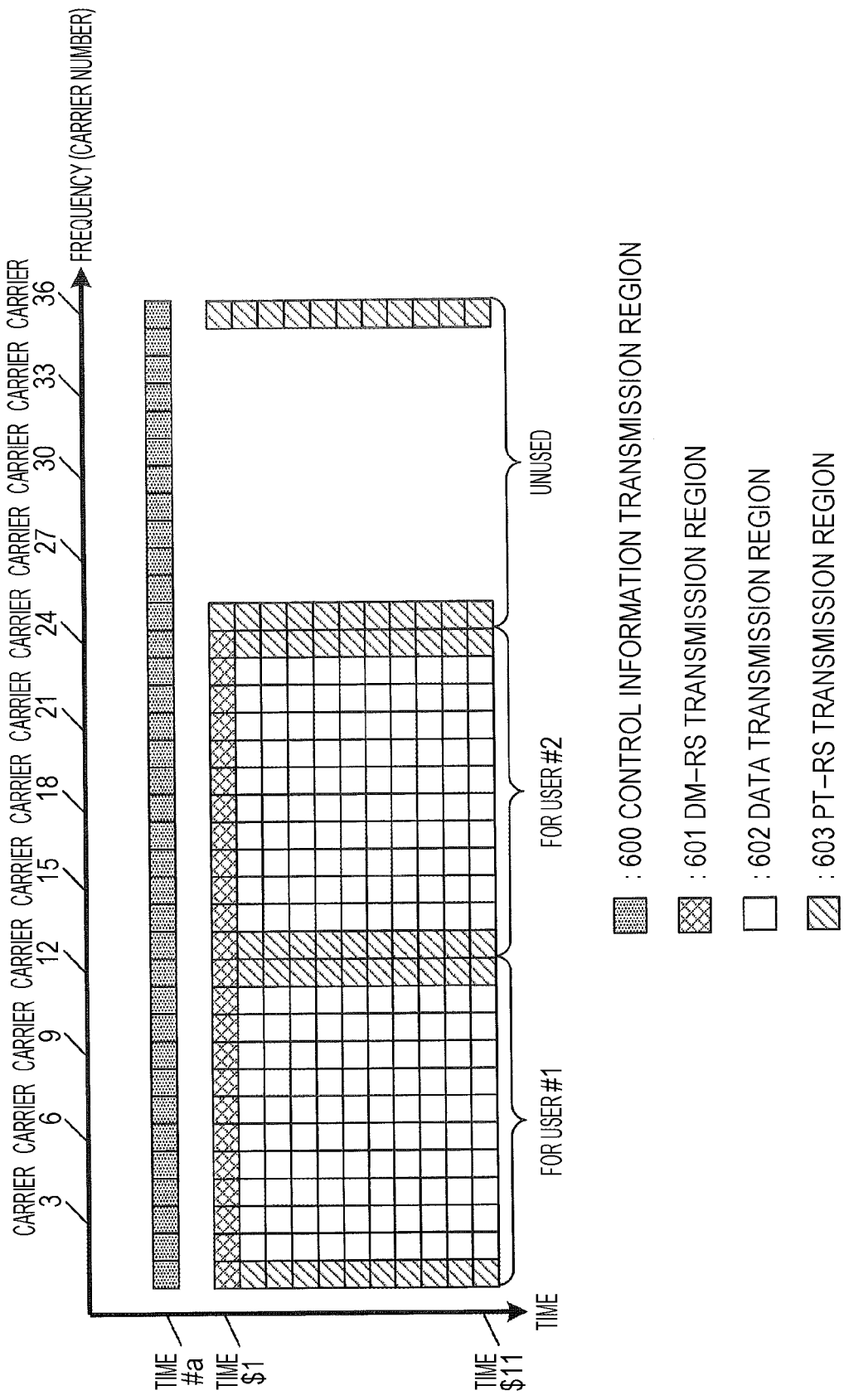
FIG. 27 is a diagram illustrating another example of the frame configuration of modulated signal 108_B according to the first embodiment.

FIG. 26 illustrates a modification of the frame configuration of the modulated signal 108_A in FIG. 7 described in the embodiment above, and FIG. 27 illustrates a modification of the frame configuration of the modulated signal 108_B in FIG. 8 described in the embodiment above.

In FIG. 26 and FIG. 27, there is an unused time-frequency region where no user data transmission region has been allocated, and the PT-RS transmission regions 503 and 603 are placed in the unused time-frequency region, in the same way as in the third example (FIG. 24 and FIG. 25). A characteristic point in FIG. 26 and FIG. 27 is that PT-RS transmission regions are placed in the unused time-frequency region where there is no user data appropriation, at time $1 where the DM-RS transmission regions 501 and 601 are placed in the transmission region of the user #1 and the transmission region of the user #2 in the same way as in the third example.

In FIG. 26 and FIG. 27, the PT-RS transmission regions (and DM-RS transmission regions) are placed at the lowest frequency and the highest frequency of the user transmission regions or unused region, and the PT-RS symbol are in adjacent frequency regions, as in the fourth modification (FIG. 18 and FIG. 19).

Accordingly, the phase estimation precision can be improved, and further, intercarrier interference can be readily estimated, in the same way as with the fourth modification.

The configuration method of PT-RS transmission regions and DM-RS transmission regions placed in the unused time-frequency region where there is no user data appropriation, the configuration method of precoding matrices used on each transmission region, and advantages thereof, are the same as described in the third example, so description will be omitted.

Sixth Modification

An arrangement may be made where one of the PT-RS symbols illustrated in FIG. 5A and the PT-RS symbols illustrated in FIG. 5B is a non-zero power symbol. That is to say, one of the PT-RS symbols illustrated in FIG. 5A and the PT-RS symbols illustrated in FIG. 5B does not exist (zero power). Also, an arrangement may be made where PT-RS symbols exist in FIG. 5A, and PT-RS symbols do not exist in FIG. 5B.

Specifically, zero power is set in FIG. 5B at the same time-frequency region as the time-frequency region where the PT-RS symbols are placed in FIG. 5A (i.e., non-zero power). Alternatively, zero power is set in FIG. 5A at the same time-frequency region as the time-frequency region where the PT-RS symbols are placed in FIG. 5B (i.e., non-zero power).

Also, PT-RS symbols and zero power symbols may exist in FIG. 5A and FIG. 5B. For example, an arrangement is made where PT-RS symbols exist at the carrier k, 4, and time $2 in FIG. 5A, zero power symbols exist at the carrier k, 4, and time $3, PT-RS symbols exist at the carrier k, 4, and time $4, zero power symbols exist at the carrier k, 4, and time $5, .... An arrangement is made where PT-RS symbols exist at the carrier k, 10, and time $2 in FIG. 5A, zero power symbols exist at the carrier k, 10, and time $3, PT-RS symbols exist at the carrier k, 10, and time $4, zero power symbols exist at the carrier k, 10, and time $5, ....

Also, an arrangement is made where zero symbols exist at the carrier k, 4, and time 2 in FIG. 5B, PT-RS symbols exist at the carrier k, 4, and time $3, zero power symbols exist at the carrier k, 4, and time $4, PT-RS symbols exist at the carrier k, 4, and time $5, .... An arrangement is made where zero power symbols exist at the carrier k, 10, and time $2 in FIG. 5B, PT-RS symbols exist at the carrier k, 10, and time $3, zero symbols exist at the carrier k, 10, and time $4, PT-RS symbols exist at the carrier k, 10, and time $5, ....

It should be noted that the above two examples are only examples, and the layout of PT-RS symbols and zero power symbols is not restricted to this.

An arrangement may be made as a modified method of the above, where one of the PT-RS transmission region illustrated in FIG. 7 and the PT-RS symbols illustrated in FIG. 8 is non-zero power. That is to say, one of the PT-RS transmission region illustrated in FIG. 7 and the PT-RS transmission region illustrated in FIG. 8 does not exist (zero power). An arrangement may be made where a PT-RS transmission region exists in FIG. 7 and no PT-RS transmission region exists in FIG. 8.

Specifically, non-zero power is set in FIG. 8 at the same time-frequency region as the time-frequency region where the PT-RS transmission region is placed in FIG. 7 (i.e., non-zero power). Alternatively, non-zero power is set in FIG. 7 at the same time-frequency region as the time-frequency region where the PT-RS transmission region is placed in FIG. 8 (i.e., non-zero power).

Also, PT-RS transmission regions and zero power symbols may exist in FIG. 7 and FIG. 8. For example, observing user #1, an arrangement is made where a PT-RS transmission region exists at the carrier 4, and time $2 in FIG. 7, a zero power transmission region exists at the carrier 4, and time $3, a PT-RS transmission region exists at the carrier 4, and time $4, a zero power transmission region exists at the carrier 4, and time $5, .... An arrangement is made where a PT-RS transmission region exists at the carrier 10, and time $2 in FIG. 7, a zero power transmission region exists at the carrier 10, and time $3, a PT-RS transmission region exists at the carrier 10, and time $4, a zero power transmission region exists at the carrier 10, and time $5, ....

Also, an arrangement is made where a zero power transmission region exists at the carrier 4, and time 2 in FIG. 8, a PT-RS transmission region exists at the carrier 4, and time $3, a zero power transmission region exists at the carrier 4, and time $4, a PT-RS transmission region exists at the carrier 4, and time $5, .... An arrangement is made where a zero power transmission region exists at the carrier 10, and time $2 in FIG. 8, a PT-RS transmission region exists at the carrier 10, and time $3, a zero power transmission region exists at the carrier 10, and time $4, a PT-RS transmission region exists at the carrier 10, and time $5, ....

It should be noted that the above two examples are only examples, and the layout of PT-RS transmission regions and zero power transmission regions is not restricted to this.

The terminals can estimate the effects of phase noise in a modulated signal by the above configuration as well, and the embodiments of the present specification can be carried out.

Seventh Modification

Although MIMO transmission (where a plurality of streams are transmitted using a plurality of antennas, for example) has been described in the above embodiment, the transmission format is not restricted to MIMO transmission.

For example, the base station 401 (transmission apparatus illustrated in FIG. 3) may apply a single-stream transmission method.

In this case, at the user #k modulated signal generator 104_k illustrated in FIG. 4, for example, the post-mapping baseband signal 206_1 (stream #X1) and post-mapping baseband signal 206_2 (stream #X2) that are the output of the mapping unit 205 are the same stream.

An example will be described regarding this point.

For example, the post-mapping baseband signal 206_1 and post-mapping baseband signal 206_2 may be the same modulated signal.

As another example, in a case where the base station 401 is transmitting a first bit sequence by the post-mapping baseband signal 206_1, the first bit sequence is transmitted at the post-mapping baseband signal 206_2 as well.

As another example, assumption will be made that a first symbol that transmits a first bit sequence exists in the post-mapping baseband signal 206_1. At this time, a symbol that transmits a first bit sequence exists in the post-mapping baseband signal 206_2.

The baseband signals 206_1 and 206_2 that are the same stream may be transmitted from the antenna unit #A (111_A) and antenna unit #B (111_B) that are different, or the baseband signals 206_1 and 206_2 may be transmitted from a plurality of antennas.

Alternatively, an arrangement may be made where, at the user #k modulated signal generator 104_k illustrated in FIG. 4, for example, only the baseband signal 206_1 (stream #X1) is output from the mapping unit 205, the modulated signal 208_A are output from the processing unit 207, and the modulated signal 208_A are transmitted from one antenna unit #A (111_A). That is to say, single antenna transmission of a single stream is executed by the mapping unit 205 and processing unit 207 outputting a modulated signal corresponding to the configuration of one antenna system (e.g., multiplexer 107, wireless unit 109, and antenna unit 111). Note that precoding is not performed at the processing unit 207 at this time.

Alternatively, an arrangement may be made where, at the user #k modulated signal generator 104_k illustrated in FIG. 4, for example, only the baseband signal 206_1 (stream #X1) is output from the mapping unit 205, modulated signals 208_A and 208_B subjected to signal processing at the processing unit 207 for CDD (Cyclic Delay Diversity) (or CSD: Cyclic Shift Diversity) are output, and the modulated signals 208_A and 208_B are transmitted from the two of the antenna unit #A (111_A) and antenna unit #B (111_B), respectively. That is to say, multi-antenna transmission of a single stream is executed by outputting a modulated signal corresponding to the configuration of two antenna systems (e.g., multiplexer 107, wireless unit 109, and antenna unit 111) with regard to one baseband signals output from the mapping unit 205.

Advantages the same as the examples described in the present embodiment can be obtained with regard to a case where the base station transmits single-stream modulated signals, as described above. For example, an arrangement may be made where, single-stream modulated signals are generated of the frame configuration in FIG. 5A out of the frame configurations in FIG. 5A and FIG. 5B, and the description of the present embodiment above is carried out.

The base station also may transmit single-stream modulated signals of the frame configuration in FIG. 7. The base station may transmit single-stream modulated signals of the frame configuration in FIG. 7 and FIG. 8 from the antennas. The method of generating the frame configuration in FIG. 7 and the frame configuration in FIG. 8 at this time is as described above. The embodiment described above may be carried out using FIG. 7 and/or FIG. 8.

The base station also may transmit single-stream modulated signals of the frame configuration in FIG. 18. The base station may transmit single-stream modulated signals of the frame configuration in FIG. 18 and FIG. 19 from the antennas. The method of generating the frame configuration in FIG. 18 and the frame configuration in FIG. 19 at this time is as described above. The embodiment described above may be carried out using FIG. 18 and/or FIG. 19.

The base station may transmit single-stream modulated signals of the frame configuration in FIG. 20. The base station may transmit single-stream modulated signals of the frame configuration in FIG. 20 and FIG. 21 from the antennas. The method of generating the frame configuration in FIG. 20 and the frame configuration in FIG. 21 at this time is as described above. The embodiment described above may be carried out using FIG. 20 and/or FIG. 21.

The base station may transmit single-stream modulated signals of the frame configuration in FIG. 22. The base station may transmit single-stream modulated signals of the frame configuration in FIG. 22 and FIG. 23 from the antennas. The method of generating the frame configuration in FIG. 22 and the frame configuration in FIG. 23 at this time is as described above. The embodiment described above may be carried out using FIG. 22 and/or FIG. 23.

The base station may transmit single-stream modulated signals of the frame configuration in FIG. 24. The base station may transmit single-stream modulated signals of the frame configuration in FIG. 24 and FIG. 25 from the antennas. The method of generating the frame configuration in FIG. 24 and the frame configuration in FIG. 25 at this time is as described above. The embodiment described above may be carried out using FIG. 24 and/or FIG. 25.

The base station may transmit single-stream modulated signals of the frame configuration in FIG. 26. The base station may transmit single-stream modulated signals of the frame configuration in FIG. 26 and FIG. 27 from the antennas. The method of generating the frame configuration in FIG. 26 and the frame configuration in FIG. 27 at this time is as described above. The embodiment described above may be carried out using FIG. 26 and/or FIG. 27.

Eighth Modification

The base station 401 may transmit different data by post-mapping baseband signal 206_1 (stream #X1) at symbol number i, and post-mapping baseband signal 206_2 (stream #X2) at symbol number i, or may transmit the same data.

For example, the base station 401 may transmit 1-bit data b0 in the post-mapping baseband signal 206_1 (stream #X1) at symbol number i, and transmit 1-bit data b0 in the post-mapping baseband signal 206_2 (stream #X2) at symbol number i.

Alternatively, the base station 401 may transmit 1-bit data b0 in the post-mapping baseband signal 206_1 (stream #X1) at symbol number i, and transmit 1-bit data b1 that is different from b0 in the post-mapping baseband signal 206_2 (stream #X2) at symbol number i.

Accordingly, the base station 401 may set, for each user, "transmit a plurality of modulated signals of a plurality of streams" and "transmit modulated signals of single stream". Thus, "transmit a plurality of modulated signals of a plurality of streams" and "transmit modulated signals of single stream" may coexist in a frame.

In realizing the above, the base station (transmission apparatus in FIG. 3) may have one or more error correction encoders 203, and may also have one or more mapping units 205.

Ninth Modification

Although description has been made in the present embodiment regarding a case where, in MIMO transmission (transmitting a plurality of streams using, for example, a plurality of antennas), the base station for example transmits PT-RS transmission regions (PT-RS symbols), DMRS transmission regions (DM-RS symbols), and data transmission regions (data symbols), in two modulated signals (two streams) from two antennas, a configuration may be made where two modulated signals are transmitted by one antenna, or three antennas. The terminal also can carry out the present embodiment in a case of receiving modulated signals using one antenna, two antennas, or three antennas.

Although description has been made in the present embodiment regarding a case where, in MIMO transmission (transmitting a plurality of streams using, for example, a plurality of antennas), the base station for example transmits PT-RS transmission regions (PT-RS symbols), DMRS transmission regions (DM-RS symbols), and data transmission regions (data symbols), in two modulated signals (two streams) from two antennas, an arrangement may be made where, even in a case where the base station transmits three or more modulated signals (three or more streams) from a plurality of antennas, the present embodiment can be carried out in the same way by preparing three or more frame configurations described in the present embodiment, and the base station generating and transmitting modulated signals. The terminal also can carry out the present embodiment by receiving modulated signals using one antenna, two antennas, or three antennas at this time.

Second Embodiment

In the present embodiment, PT-RS transmission in DFT-s-OFDM (Discrete Fourier Transform spread Orthogonal Frequency Division Multiplexing) transmission will be described.

[Configuration of Transmission Apparatus]

Figure 28:
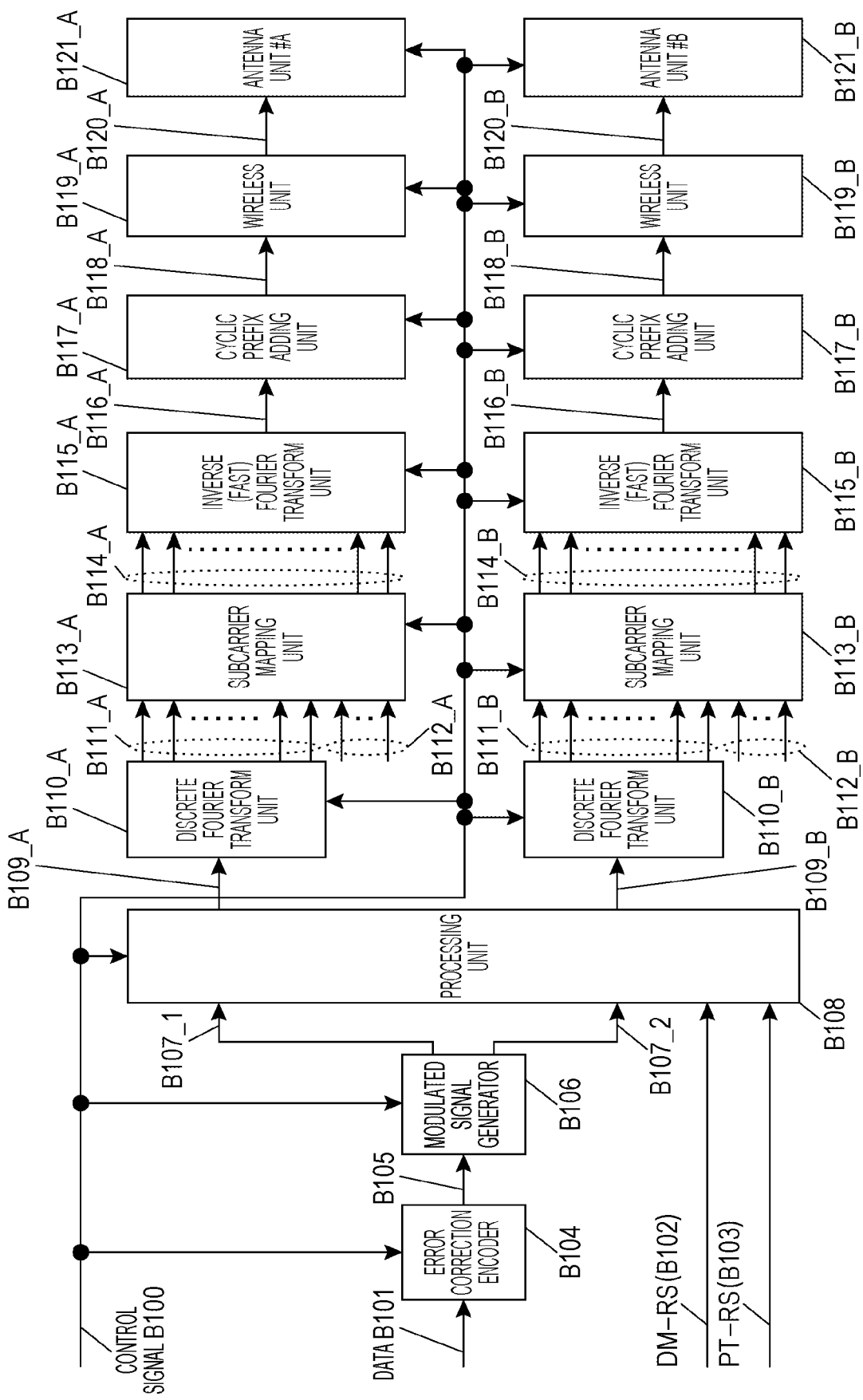
FIG. 28 is a block diagram illustrating a configuration example of a transmission apparatus according to a second embodiment.

FIG. 28 is a block diagram illustrating a configuration example of a transmission apparatus according to the present embodiment. The transmission apparatus illustrated in FIG. 28 is a terminal or the like, for example.

In FIG. 28, an error correction encoder B104 takes data B101 and control signal B100 as input. The error correction encoder B104 subjects the data B100 to error correction encoding based on information of the error correction encoding format (e.g., error correction encoding method, error correction encoding block size, coding efficiency of error correction encoding, etc.) included in the control signal B100, and generates and outputs post-error-correction-encoding data B105.

A modulated signal generator B106 takes the post-error-correction-encoding data B105 and control signal B100 as input. The modulated signal generator B106 performs mapping (modulation) on the post-error-correction-encoding data B105 based on information of the modulation scheme included in the control signal B100, and outputs stream #1 baseband signals B107_1 and stream #2 baseband signals B107_2.

A processing unit B108 takes as input the stream #1 baseband signals B107_1, stream #2 baseband signals B107_2, DM-RS (B102), PT-RS (B103), and control signal B100. The processing unit B108 performs predetermined processing (e.g., processing such as precoding, transmission power change, CDD (CSD), and so forth), based on information relating to the frame configuration, information relating to precoding, information relating to transmission power, information relating to CDD (CSD), and so forth, included in the control signal B100, and generates and outputs modulated signal A (B109_A) and modulated signal B (B109_B).

Note that at the time of precoding processing, the processing unit B108 may switch the precoding (matrix) used in the precoding processing in increments of a plurality of symbols, or may perform precoding cycling processing of switching the precoding (matrix) used in the precoding processing in increments of symbols.

A discrete Fourier transform unit B110_A takes the modulated signal A (B109_A) and control signal B100 as input. The discrete Fourier transform unit B110_A subjects the modulated signal A (B109_A) to discrete Fourier transform processing based on the control signal B100, and generates and outputs a post-discrete-Fourier-transform signal group B111_A.

In the same way, a discrete Fourier transform unit B110_B takes the modulated signal B (B109_B) and control signal B100 as input. The discrete Fourier transform unit B110_B subjects the modulated signal B (B109_B) to discrete Fourier transform processing based on the control signal B100, and generates and outputs a post-discrete-Fourier-transform signal group B111_B.

A subcarrier mapping unit B113_A takes as input the post-discrete-Fourier-transform signal group B111_A, a zero signal group B112_A, and control signal B100. The subcarrier mapping unit B113_A maps the post-discrete-Fourier-transform signal group B111_A and zero signal group B112_A to a subcarrier based on the control signals B100, and generates and outputs a post-subcarrier-mapping signal group B114_A.

In the same way, a subcarrier mapping unit B113_B takes as input the post-discrete-Fourier-transform signal group B111_B, a zero signal group B112_B, and control signal B100. The subcarrier mapping unit B113_B maps the post-discrete-Fourier-transform signal group B111_B and zero signal group B112_B to a subcarrier based on the control signal B100, and generates and outputs a post-subcarrier-mapping signal group B114_B.

An inverse (fast) Fourier transform unit (or inverse discrete Fourier transform unit B115_A) takes the post-subcarrier-mapping signal group B114_A and control signals B100 as input. The inverse (fast) Fourier transform unit B115_A subjects the post-subcarrier-mapping signal group B114_A to inverse (fast) Fourier transform (inverse discrete Fourier transform) based on the control signal B100, and generates and outputs post-inverse-Fourier-transform signals B116_A.

In the same way, an inverse (fast) Fourier transform unit (or inverse discrete Fourier transform unit B115_B) takes the post-subcarrier-mapping signal group B114_B and control signal B100 as input. The inverse (fast) Fourier transform unit B115_B subjects the post-subcarrier-mapping signal group B114_B to inverse (fast) Fourier transform (inverse discrete Fourier transform) based on the control signal B100, and generates and outputs post-inverse-Fourier-transform signals B116_B.

A cyclic prefix adding unit B117_A takes the post-inverse-Fourier-transform signal B116_A and control signal B100 as input. The cyclic prefix adding unit B117_A adds a cyclic prefix (CP: Cyclic Prefix) to the post-inverse-Fourier-transform signal B116_A based on the control signal B100, and generates and outputs post-cyclic-prefix-adding signals B118_A.

In the same way, a cyclic prefix adding unit B117_B takes the post-inverse-Fourier-transform signal B116_B and control signal B100 as input. The cyclic prefix adding unit B117_B adds a cyclic prefix (CP) to the post-inverse-Fourier-transform signals B116_B based on the control signal B100, and generates and outputs post-cyclic-prefix-adding signals B118_B.

A wireless unit B119_A takes as input the post-cyclic-prefix-adding signals B118_A and control signals B100. The wireless unit B119_A performs wireless-related processing on the post-cyclic-prefix-adding signal B118_A based on the control signal B100, and generates transmission signals A (B120_A). The transmission signals A (B120_A) are output from an antenna unit #A (B121_A) as radio waves.

In the same way, a wireless unit B119_B takes as input the post-cyclic-prefix-adding signal B118_B and control signal B100. The wireless unit B119_B performs wireless-related processing on the post-cyclic-prefix-adding signals B118_B based on the control signal B100, and generates transmission signals B (B120_B). The transmission signal B (B120_B) are output from an antenna unit #B (B121_B) as radio waves.

The antenna unit #A (B121_A) takes the control signal B100 as input. The antenna unit #A (B121_A) may perform transmission directionality control following the control signal B100. Also, the control signal B100 does not have to exist as input of the antenna unit #A (B121_A). In the same way, the antenna unit #B (B121_B) takes the control signal B100 as input. The antenna unit #B (B121_B) may perform transmission directionality control following the control signal B100. Also, the control signal B100 does not have to exist as input of the antenna unit #B (B121_B).

[Frame Configuration of Stream]

FIG. 29(A) and FIG. 29(B) illustrate a frame configuration example of the stream #1 baseband signals B107_1 A and stream #2 baseband signals B107_2 in FIG. 28. The horizontal axis is time in FIG. 29(A) and FIG. 29(B).

Also in FIG. 29(A) and FIG. 29(B), "DFT-s-OFDM symbol" indicates a DFT (discrete Fourier transform) spread OFDM symbol. A DFT-s-OFDM symbol is configured of a data symbol, DM-RS symbol, or PT-RS symbol.

FIG. 29(A) illustrates an example of the frame configuration of stream #1. DFT-s-OFDM symbol B201_1_1 in FIG. 29(A) is a DFT-s-OFDM symbol of stream #1 that the transmission apparatus (terminal) illustrated in FIG. 28 transmits during a first time. DFT-s-OFDM symbol B201_1_2 is a DFT-s-OFDM symbol of stream #1 that the transmission apparatus transmits during a second time. DFT-s-OFDM symbol B201_1_3 is a DFT-s-OFDM symbol of stream #1 that the transmission apparatus transmits during a third time.

One slot will be studied here. Accordingly, DFT-s-OFDM symbol B201_1_$k$ is a DFT-s-OFDM symbol of stream #1 that the transmission apparatus transmits during a k'th time within one slot. For example, k is an integer of 1 or greater but 7 or smaller.

The DFT-s-OFDM symbols B201_1_1, B201_1_2, B201_1_3, . . . , and B201_1_7, are configured of a data symbol of stream #1, DM-RS symbol of stream #1, or PT-RS symbol of stream #2. At this time, the data symbol of stream #1 is equivalent to the stream #1 baseband signals B107_1 of stream #1 in FIG. 28. Also, the DM-RS symbol of stream #1 and the PT-RS symbol of stream #1 are equivalent to the DM-RS symbol of stream #1 and PT-RS symbol of stream #1 to be added to the stream #1 baseband signals B107_1 (data symbol) of stream #1 in FIG. 28.

FIG. 29(B) illustrates an example of the frame configuration of stream #2. DFT-s-OFDM symbol B201_2_1 in FIG. 29(B) is a DFT-s-OFDM symbol of stream #2 that the transmission apparatus (terminal) illustrated in FIG. 28 transmits during a first time. DFT-s-OFDM symbol B201_2_2 is a DFT-s-OFDM symbol of stream #2 that the transmission apparatus transmits during a second time. DFT-s-OFDM symbol B201_2_3 is a DFT-s-OFDM symbol of stream #2 that the transmission apparatus transmits during a third time.

One slot will be studied here. Accordingly, DFT-s-OFDM symbol B201_2_$k$ is a DFT-s-OFDM symbol of stream #2 that the transmission apparatus transmits during a k'th time within one slot. For example, k is an integer of 1 or greater but 7 or smaller.

The DFT-s-OFDM symbols B201_2_1, B201_2_2, B201_2_3, . . . , and B201_2_7, are configured of a data symbol of stream #2, DM-RS symbol of stream #2, or PT-RS symbol of stream #2. At this time, the data symbol of stream #2 is equivalent to the stream #2 baseband signals B107_2 of stream #2 in FIG. 28. Also, the DM-RS symbol of stream #2 and the PT-RS symbol of stream #2 are equivalent to the DM-RS symbol of stream #2 and PT-TS symbol of stream #2 to be added to the stream #2 baseband signals B107_2 (data symbol) of stream #2 in FIG. 28.

Note that the DM-RS (B102) in FIG. 28 includes the DM-RS symbol of stream #1 and the DM-RS symbol of stream #2. Also, the PT-RS (B103) in FIG. 28 includes the PT-RS symbol of stream #1 and the PT-RS symbol of stream #2.

Also, the DFT-s-OFDM symbol B201_1_1 in FIG. 29(A) and the DFT-s-OFDM symbol B201_2_1 in FIG. 29(B) are transmitted from the transmission apparatus using a plurality of antennas (antenna unit #A and antenna unit #B), using the same frequency during the first time (same time). In the same way, the DFT-s-OFDM symbol B201_1_2 in FIG. 29(A) and the DFT-s-OFDM symbol B201_2_2 in FIG. 29(B) are transmitted from the transmission apparatus using a plurality of antennas (antenna unit #A and antenna unit #B), using the same frequency during the second time (same time). Also, the DFT-s-OFDM symbol B201_1_3 in FIG. 29(A) and the DFT-s-OFDM symbol B201_2_3 in FIG. 29(B) are transmitted from the transmission apparatus using a plurality of antennas (antenna unit #A and antenna unit #B), using the same frequency during the third time (same time). Thereafter, in the same way, the DFT-s-OFDM symbol B201_1_7 and the DFT-s-OFDM symbol B201_2_7 are transmitted (omitted from illustration) from the transmission apparatus using a plurality of antennas (antenna unit #A and antenna unit #B), using the same frequency during the seventh time (same time).

[Frame Configuration of a Modulated Signal]

Figure 30:
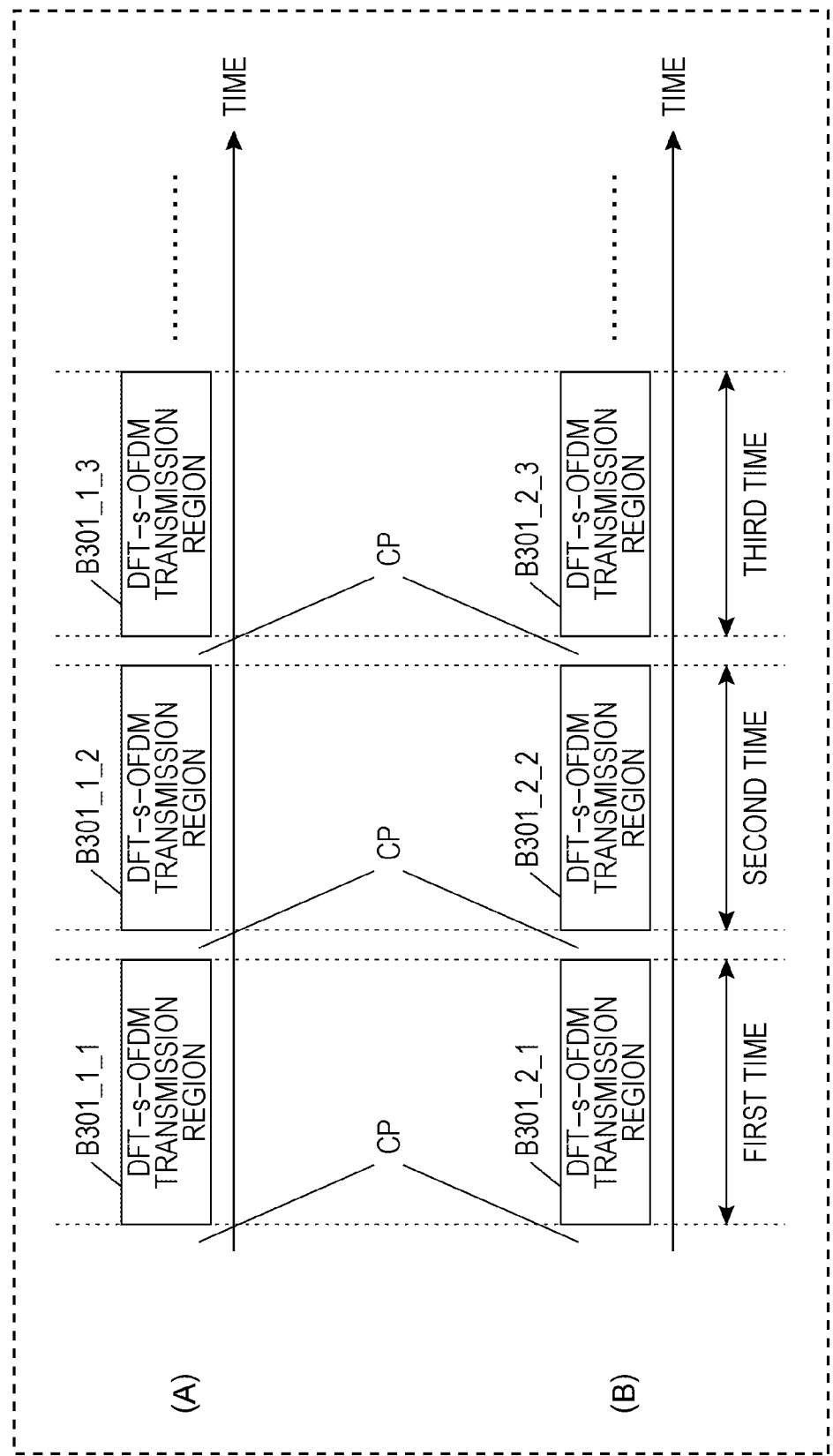
FIG. 30 is a diagram illustrating an example of the frame configuration of modulated signals according to the second embodiment.

FIG. 30(A) and FIG. 30(B) illustrate an example frame configuration of the modulated signal A (B109_A) and modulated signal B (B109_B). The horizontal axis in FIG. 30(A) and FIG. 30(B) is time.

In FIG. 30(A) and FIG. 30(B), "DFT-s-OFDM transmission region" is the transmission region of DFT spread OFDM.

The DFT-s-OFDM transmission region in FIG. 30(A) shows the modulated signal A (B109_A) in FIG. 28, and the DFT-s-OFDM transmission region in FIG. 30(B) shows the modulated signal B (B109_B) in FIG. 28.

The DFT-s-OFDM transmission region B301_1_1 in FIG. 30(A) is signals obtained by performing processing on the DFT-s-OFDM symbol B201_1_1 in FIG. 29(A) and the DFT-s-OFDM symbol B201_2_1 in FIG. 29(B) at the processing unit B108 in FIG. 28. The DFT-s-OFDM transmission region B301_1_1 is transmitted from the transmission apparatus (terminal) in FIG. 28 during the first time.

The DFT-s-OFDM transmission region B301_1_2 in FIG. 30(A) is signals obtained by performing processing on the DFT-s-OFDM symbol B201_1_2 in FIG. 29(A) and the DFT-s-OFDM symbol B201_2_2 in FIG. 29(B) at the processing unit B108 in FIG. 28. The DFT-s-OFDM transmission region B301_1_2 is transmitted from the transmission apparatus during the second time.

The DFT-s-OFDM transmission region B301_1_3 in FIG. 30(A) is signals obtained by performing processing on the DFT-s-OFDM symbol B201_1_3 in FIG. 29(A) and the DFT-s-OFDM symbol B201_2_3 in FIG. 29(B) at the processing unit B108 in FIG. 28. The DFT-s-OFDM transmission region B301_1_3 is transmitted from the transmission apparatus during the third time.

Thereafter, although omitted from illustration in FIG. 30(A), DFT-s-OFDM transmission region B301_1_7 is signals obtained by performing processing on the DFT-s-OFDM symbol B201_1_7 (omitted from illustration in FIG. 29(A)) and the DFT-s-OFDM symbol B201_2_7 (omitted from illustration in FIG. 29(B)) at the processing unit B108 in FIG. 28. The DFT-s-OFDM transmission region B301_1_7 is transmitted from the transmission apparatus during the seventh time.

In the same way, the DFT-s-OFDM transmission region B301_2_1 in FIG. 30(B) is signals obtained by performing processing on the DFT-s-OFDM symbol B201_1_1 in FIG. 29(A) and the DFT-s-OFDM symbol B201_2_1 in FIG. 29(B) at the processing unit B108 in FIG. 28. The DFT-s-OFDM transmission region B301_2_1 is transmitted from the transmission apparatus during the first time.

The DFT-s-OFDM transmission region B301_2_2 in FIG. 30(B) is signals obtained by performing processing on the DFT-s-OFDM symbol B201_1_2 in FIG. 29(A) and the DFT-s-OFDM symbol B201_2_2 in FIG. 29(B) at the processing unit B108 in FIG. 28. The DFT-s-OFDM transmission region B301_2_2 is transmitted from the transmission apparatus during the second time.

The DFT-s-OFDM transmission region B301_2_3 in FIG. 30(B) is signals obtained by performing processing on the DFT-s-OFDM symbol B201_1_3 in FIG. 29(A) and the DFT-s-OFDM symbol B201_2_3 in FIG. 29(B) at the processing unit B108 in FIG. 28. The DFT-s-OFDM transmission region B301_2_3 is transmitted from the transmission apparatus during the third time.

Figure 29:
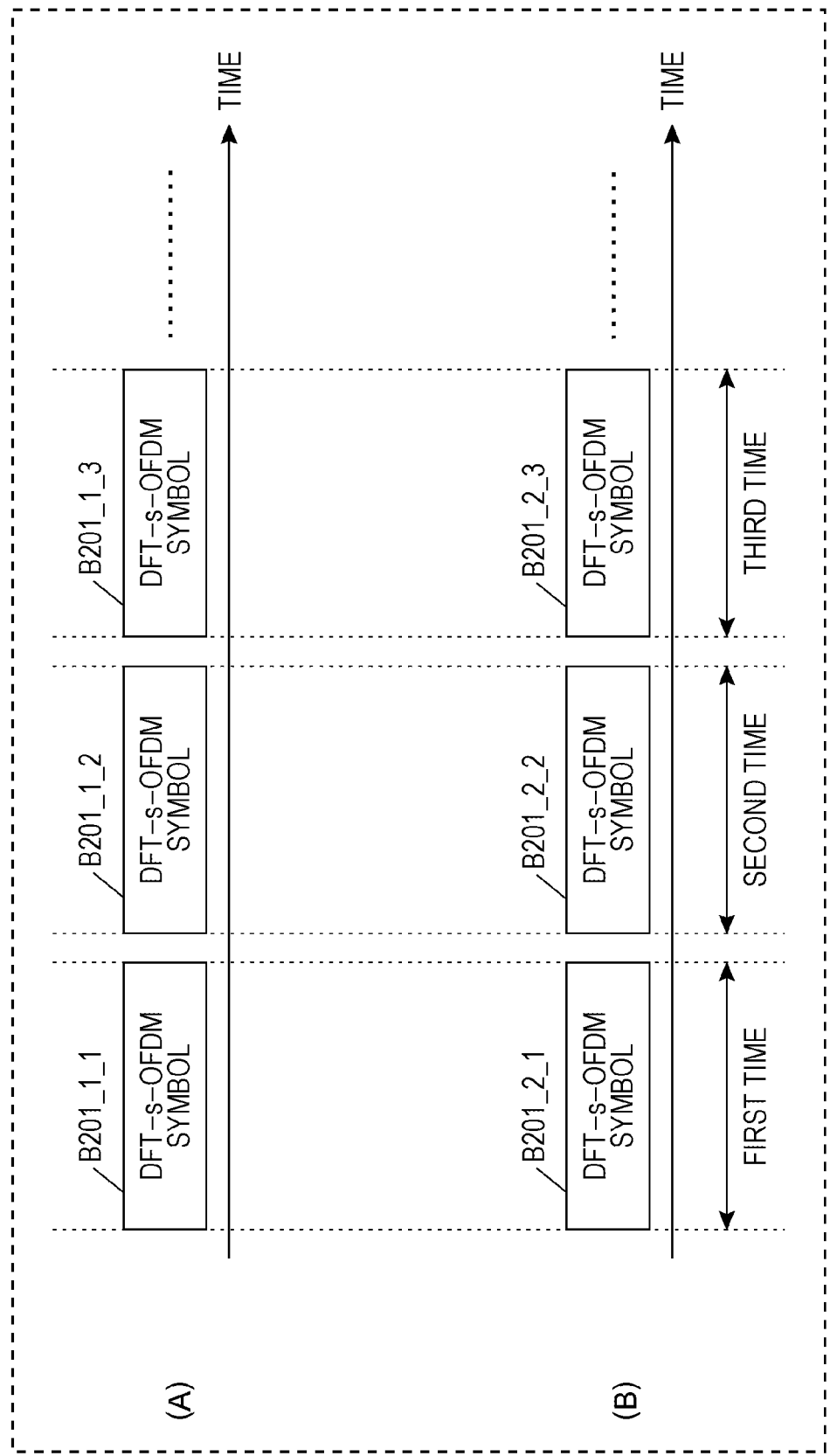
FIG. 29 is a diagram illustrating an example of the frame configuration of a stream according to the second embodiment.

Thereafter, although omitted from illustration in FIG. 30(B), DFT-s-OFDM transmission region B301_2_7 is signals obtained by performing processing on the DFT-s-OFDM symbol B201_1_7 (omitted from illustration in FIG. 29(A)) and the DFT-s-OFDM symbol B201_2_7 (omitted from illustration in FIG. 29) at the processing unit B108 in FIG. 28. The DFT-s-OFDM transmission region B301_2_7 is transmitted from the transmission apparatus during the seventh time.

Accordingly, the DFT-s-OFDM transmission regions in FIG. 30(A) and FIG. 30(B) include data transmission regions, DM-RS transmission regions, or PT-RS transmission regions.

The DFT-s-OFDM transmission region B301_1_1 in FIG. 30(A) and the DFT-s-OFDM transmission region B301_2_1 in FIG. 30(B) are transmitted from the transmission apparatus using a plurality of antennas (antenna unit #A and antenna unit #B), using the same frequency during the first time (same time). In the same way, the DFT-s-OFDM transmission region B301_1_2 in FIG. 30(A) and the DFT-s-OFDM transmission region B301_2_2 in FIG. 30(B) are transmitted from the transmission apparatus using a plurality of antennas (antenna unit #A and antenna unit #B), using the same frequency during the second time (same time). Also, the DFT-s-OFDM transmission region B301_1_3 in FIG. 30(A) and the DFT-s-OFDM transmission region B301_2_3 in FIG. 30(B) are transmitted from the transmission apparatus using a plurality of antennas (antenna unit #A and antenna unit #B), using the same frequency during the third time (same time). Thereafter, in the same way, the DFT-s-OFDM transmission region B301_1_7 in FIG. 30(A) and the DFT-s-OFDM transmission region B301_2_7 in FIG. 30(B) are transmitted from the transmission apparatus using a plurality of antennas (antenna unit #A and antenna unit #B), using the same frequency during the seventh time (same time).

Also, "CP" is added in FIG. 30(A) and FIG. 30(B). The cyclic prefix adding unit B117_A illustrated in FIG. 28 adds "CP" before the DFT-s-OFDM transmission region B301_1_1, as illustrated in FIG. 30(A). Thereafter, in the same way, the cyclic prefix adding unit B117_A adds "CP" before the DFT-s-OFDM transmission region B301_1_2, adds "CP" before the DFT-s-OFDM transmission region B301_1_3, ..., and adds "CP" before the DFT-s-OFDM transmission region B301_1_7.

In the same way, the cyclic prefix adding unit B117_B illustrated in FIG. 28 adds "CP" before the DFT-s-OFDM transmission region B301_2_1, as illustrated in FIG. 30(B). Thereafter, in the same way, the cyclic prefix adding unit B117_B adds "CP" before the DFT-s-OFDM transmission region B301_2_2, adds "CP" before the DFT-s-OFDM transmission region B301_2_3, ..., and adds "CP" before the DFT-s-OFDM transmission region B301_2_7.

Note that the relation between "symbol" and "transmission region" in the DFT-s-OFDM symbols in FIG. 29(A) and FIG. 29B, and the DFT-s-OFDM transmission regions in FIGS. 30(A) and 30(B) is the same as that described using "symbol" in FIG. 5A and FIG. 5B and "transmission region" in FIG. 7 and FIG. 8. That is to say, the DFT-s-OFDM transmission region B301_1_k in FIG. 30(A) and the DFT-s-OFDM transmission region B301_2_k in FIG. 30(B) are generated from the DFT-s-OFDM symbol B201_1_k during the k'th time in FIG. 29(A) and the DFT-s-OFDM symbol B201_2_k during the k'th time in FIG. 29(B). Examples of the method of generating include Expression (1) through Expression (21) and so forth, but changing of transmission level using α1, α2, β1, and β2 does not have to be performed.

[Frame Configuration of DM-RS]

Figure 31:
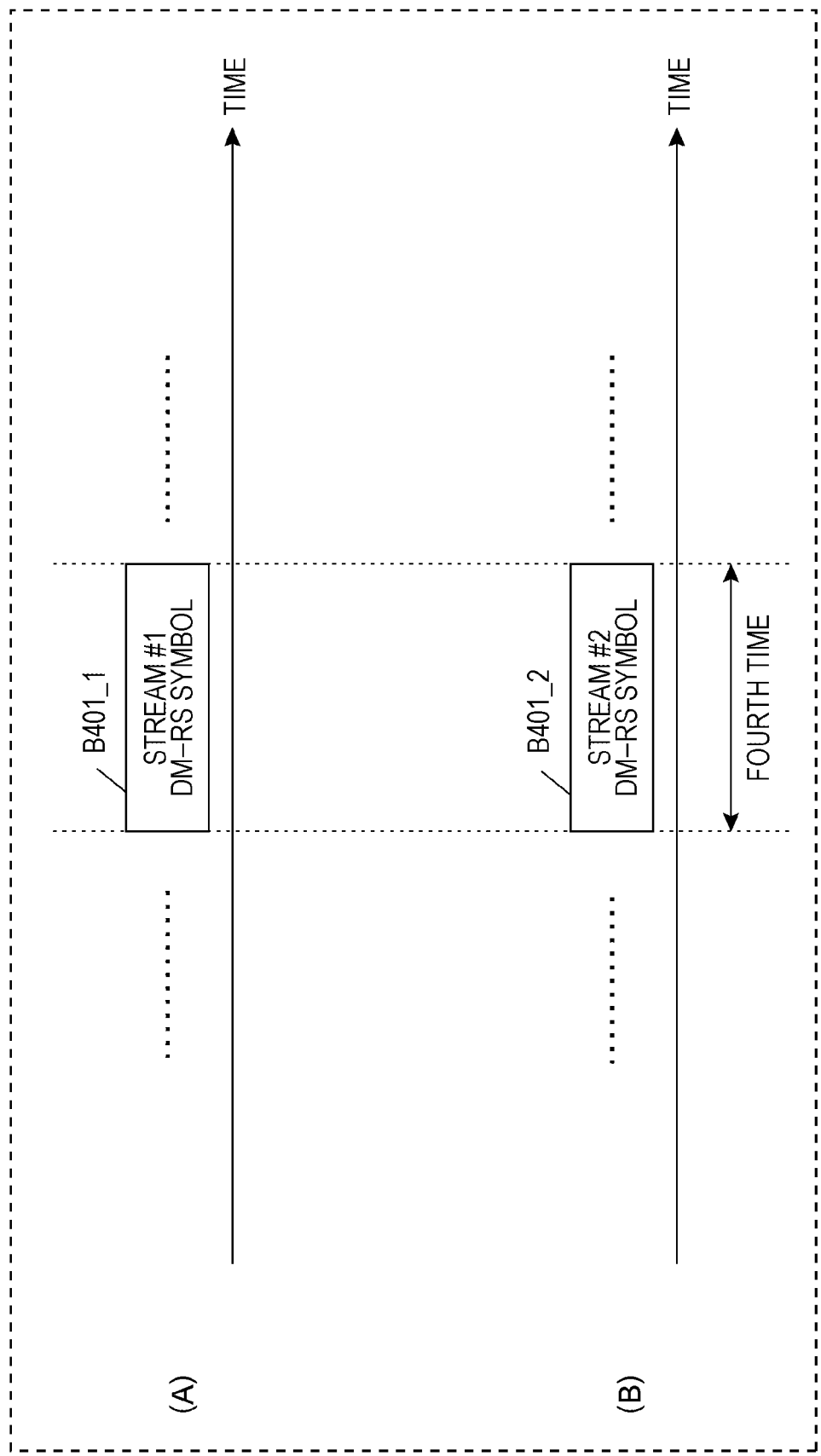
FIG. 31 is a diagram illustrating an example of the frame configuration of DM-RS symbols according to the second embodiment.

FIG. 31(A) and FIG. 31(B) illustrate a frame configuration example of DM-RS symbols. In FIG. 31(A) and FIG. 31(B), the horizontal axis is time.

For example, a DM-RS symbol is transmitted in the DFT-s-OFDM symbol B201_1_4 transmitted by the transmission apparatus (terminal) illustrated in FIG. 28, at the fourth time in FIG. 29(A). FIG. 31(A) illustrates the state at that time, where a stream #1 DM-RS symbol B401_1 is the DFT-s-OFDM symbol B201_1_4 that the transmission apparatus transmits at the fourth time.

In the same way, a DM-RS symbol is transmitted in the DFT-s-OFDM symbol B201_2_4 transmitted by the transmission apparatus, at the fourth time in FIG. 29(B). FIG. 31(B) illustrates the state at that time, where a stream #2 DM-RS symbol B401_2 is the DFT-s-OFDM symbol B201_2_4 that the transmission apparatus transmits at the fourth time.

Figure 32:
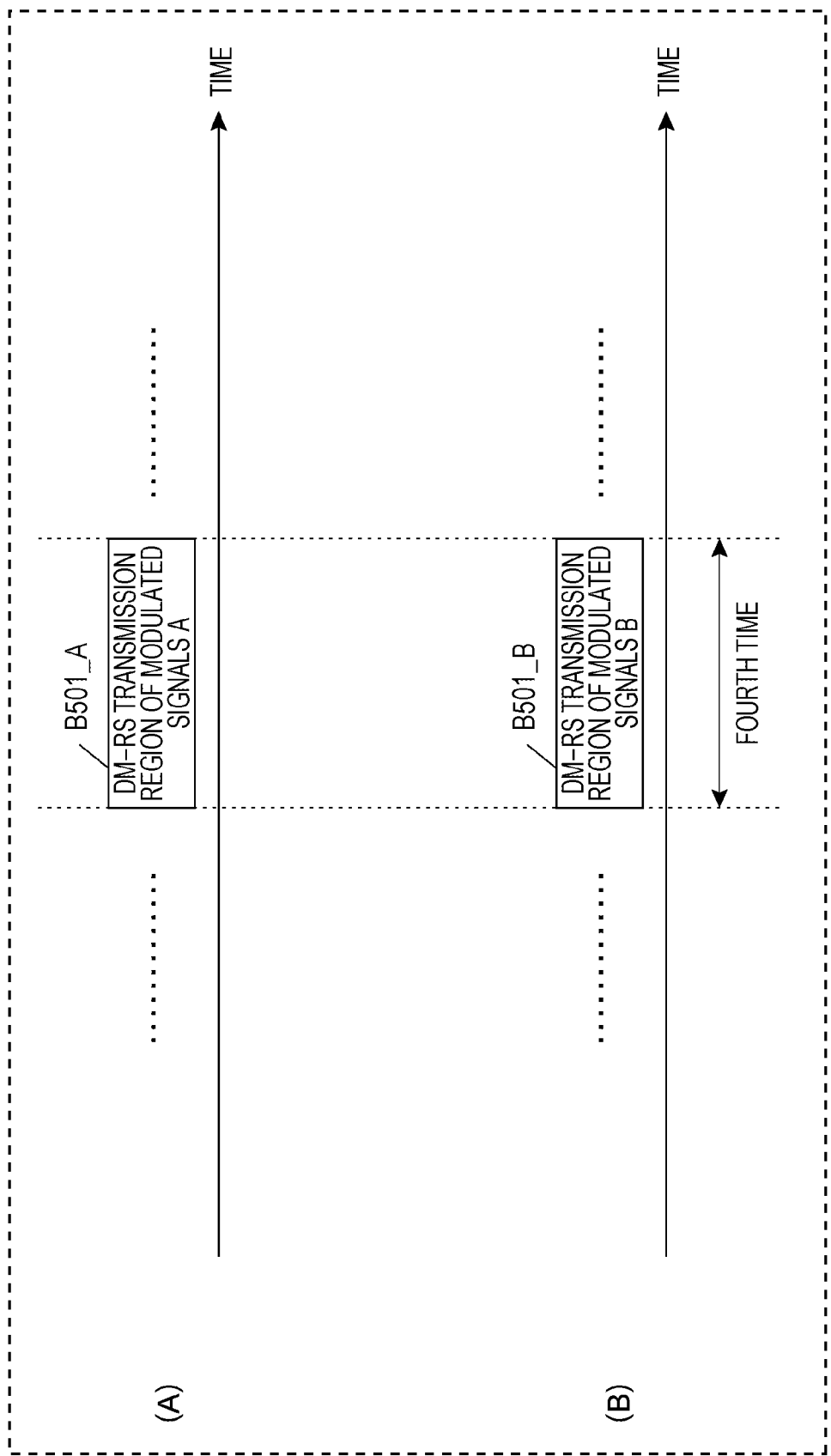
FIG. 32 is a diagram illustrating an example of the frame configuration of DM-RS transmission region to the second embodiment.

FIG. 32(A) and FIG. 32(B) illustrate a frame configuration example of DM-RS transmission regions. In FIG. 32(A) and FIG. 32(B), the horizontal axis is time.

From the description above, the DFT-s-OFDM transmission region B301_1_4 that the transmission apparatus transmits during the fourth time in FIG. 30(A) is a DM-RS transmission region. FIG. 32(A) illustrates the state at that time, where a DM-RS transmission region B501_A of modulated signal A is the DFT-s-OFDM transmission region B301_1_4 that the transmission apparatus transmits during the fourth time.

In the same way, the DFT-s-OFDM transmission region B301_2_4 that the transmission apparatus transmits during the fourth time in FIG. 30(B) is a DM-RS transmission region. FIG. 32(B) illustrates the state at that time, where a DM-RS transmission region B501_B of modulated signal B is the DFT-s-OFDM transmission region B301_2_4 that the transmission apparatus transmits during the fourth time.

Note that the relation between "symbol" and "transmission region" in the stream #1 DM-RS symbols and stream #2 DM-RS symbols in FIG. 31(A) and FIG. 31(B), and the DM-RS transmission regions of modulated signal A and the DM-RS transmission regions of modulated signal B in FIGS. 32(A) and 32(B) is the same as the relation described using "symbol" in FIG. 5A and FIG. 5B and "transmission region" in FIG. 7 and FIG. 8. That is to say, the DM-RS transmission regions of modulated signal A in FIG. 32(A) and the DM-RS transmission regions of modulated signal B in 32(B) are generated from the stream #1 DM-RS symbols in FIG. 31(A) and stream #2 DM-RS symbols in FIG. 31B. Examples of the method of generating include Expression (1) through Expression (21) and so forth, but changing of transmission level using α1, α2, β1, and β2 does not have to be performed.

[Configuration Example of DFT-s-OFDM Symbol and DFT-s-OFMD Transmission Region]

Figure 33:
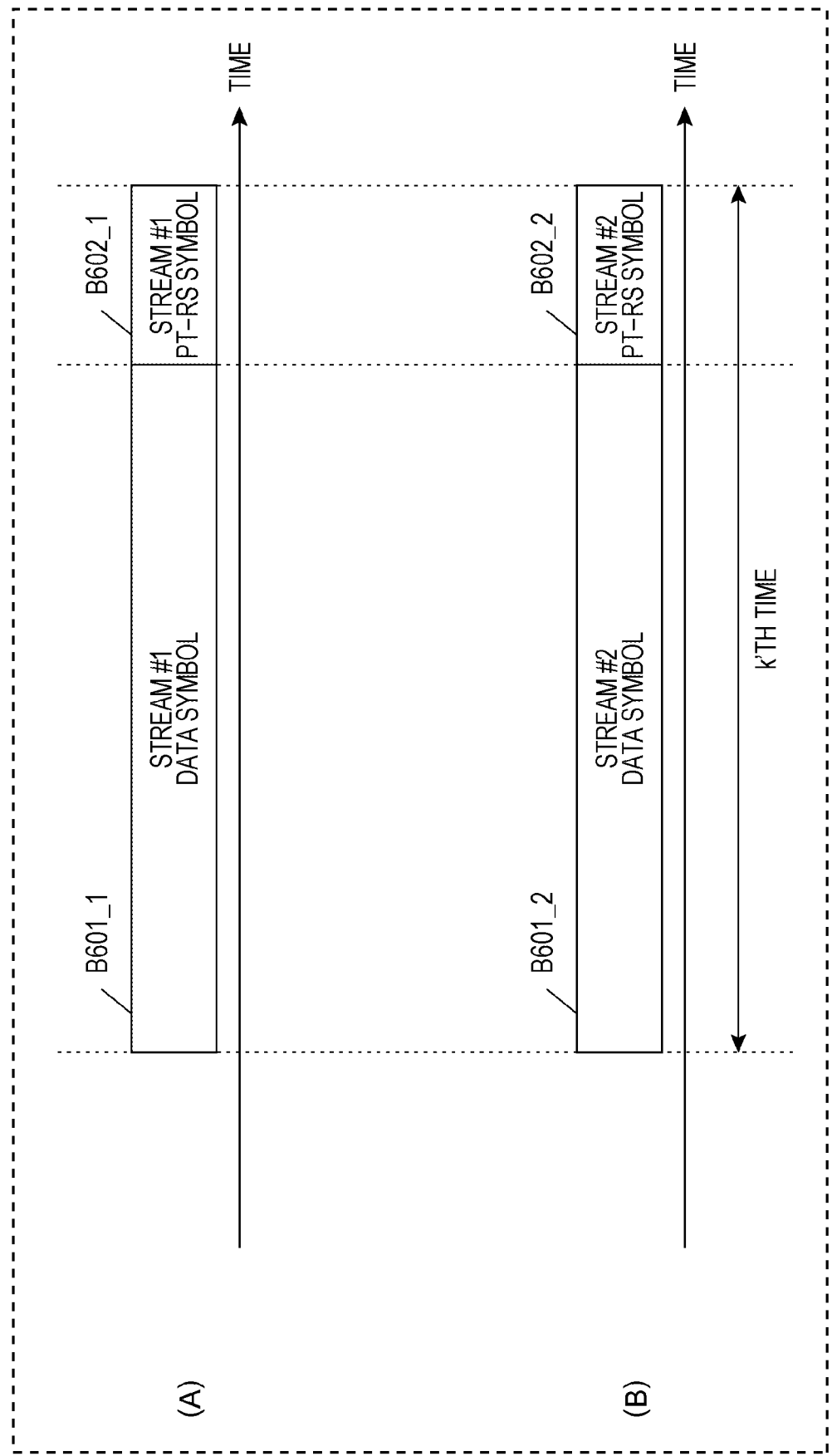
FIG. 33 is a diagram illustrating an example of the configuration of DFT-s-OFDM symbols according to the second embodiment.

FIG. 33(A) and FIG. 33(B) illustrate a frame configuration example of DFT-s-OFMD symbols during a k'th time (where k=1 through 3 and 5 through 7). In FIG. 33(A) and FIG. 33(B), the horizontal axis is time.

For example, at least data symbols and PT-RS symbols are transmitted in the DFT-s-OFDM symbols B201_1_1, B201_1_2, B201_1_3, B201_1_5, B201_1_6, and B201_1_7 where the transmission apparatus (terminal) transmits during the first time, second time, third time, fifth time, sixth time, and seventh time (i.e., times excluding the fourth time) in FIG. 29(A). FIG. 33(A) illustrates the state at that time, where the DFT-s-OFDM symbol is configured of at least a stream #1 data symbol B601_1 and a stream #1 PT-RS symbol B602_1. Note that symbols other than the stream #1 data symbol B601_1 and stream #1 PT-RS symbol B602_1 may be included in the DFT-s-OFDM symbols. The stream #1 data symbol B601_1 is equivalent to the stream #1 baseband signals B107_1 in FIG. 28, and stream #1 PT-RS symbol B602_1 is included in the PT-RS (B103) in FIG. 28.

In the same way, at least data symbols and PT-RS symbols are transmitted in the DFT-s-OFDM symbols B201_2_1, B201_2_2, B201_2_3, B201_2_5, B201_2_6, and B201_2_7 where the transmission apparatus (terminal) transmits during the first time, second time, third time, fifth time, sixth time, and seventh time (i.e., times excluding the fourth time) in FIG. 29(B). FIG. 33(B) illustrates the state at that time, where the DFT-s-OFDM symbol is configured of at least a stream #2 data symbol B601_2 and a stream #2 PT-RS symbol 602_2. Note that symbols other than the stream #2 data symbol B601_2 and stream #2 PT-RS symbol B602_2 may be included in the DFT-s-OFDM symbols. The stream #2 data symbol B601_2 is equivalent to the stream #2 baseband signals B107_2 in FIG. 28, and stream #2 PT-RS symbol B602_2 is included in the PT-RS signals B103 in FIG. 28.

Figure 34:
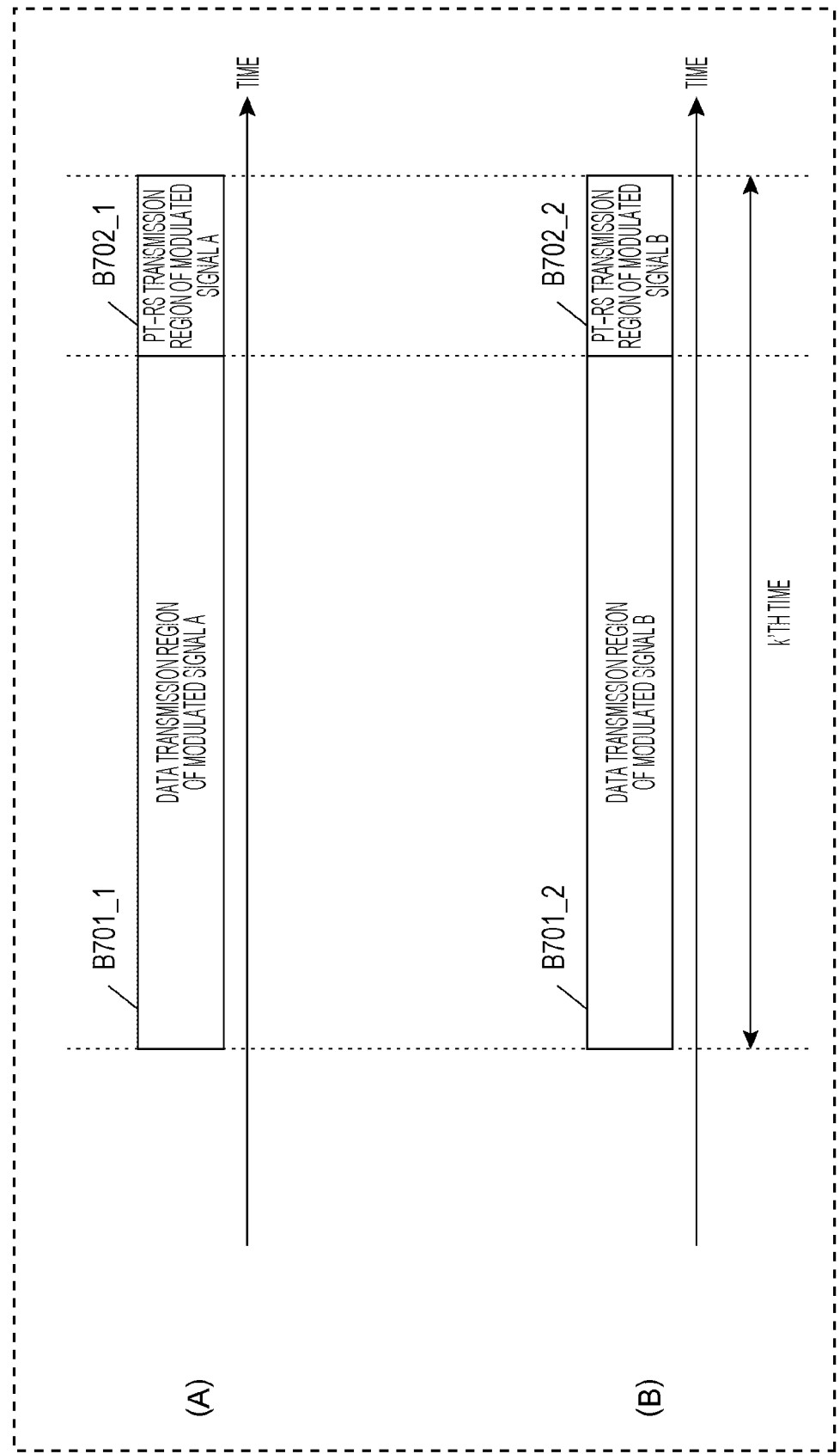
FIG. 34 is a diagram illustrating an example of the configuration of DFT-s-OFDM transmission region according to the second embodiment.

FIG. 34(A) and FIG. 34(B) illustrate a configuration example of DFT-s-OFMD transmission regions during a k'th time (where k=1 through 3 and 5 through 7). In FIG. 34(A) and FIG. 34(B), the horizontal axis is time.

From the above description, the DFT-s-OFDM transmission regions B301_1_1, B301_1_2, B301_1_3, B301_1_5, B301_1_6, and B301_1_7 which the transmission apparatus transmits during the first time, second time, third time, fifth time, sixth time, and seventh time (i.e., times excluding the fourth time) in FIG. 30(A) are at least data transmission regions of modulated signal A and PT-RS transmission regions of modulated signal A. FIG. 34(A) illustrates the state at that time, where at least data transmission region B701_1 of modulated signal A and PT-RS transmission region B702_1 of modulated signal A are included in the DFT-s-OFDM transmission region B301_1_k that the transmission apparatus transmits during the k'th time (k=1, 2, 3, 5, 6, 7).

From the above description, the DFT-s-OFDM transmission regions B301_2_1, B301_2_2, B301_2_3, B301_2_5, B301_2_6, and B301_2_7 which the transmission apparatus transmits during the first time, second time, third time, fifth time, sixth time, and seventh time (i.e., times excluding the fourth time) in FIG. 30(B) are at least data transmission regions of modulated signal B and PT-RS transmission regions of modulated signal B. FIG. 34(B) illustrates the state at that time, where at least data transmission region B701_2 of modulated signal B and PT-RS transmission region B702_2 of modulated signal B are included in the DFT-s-OFDM transmission region B301_2_k that the transmission apparatus transmits during the k'th time (k=1, 2, 3, 5, 6, 7).

Note that the relation between "symbol" and "transmission region" in the stream #1 data symbols B601_1 and stream #2 data symbols B601_2 in FIG. 33(A) and FIG. 33(B), and the data transmission region B701_1 of modulated signal A and the data transmission region B701_2 of modulated signal B in FIGS. 34(A) and 34(B) is the same as that described using "symbol" in FIG. 5A and FIG. 5B and "transmission region" in FIG. 7 and FIG. 8. That is to say, the data transmission region B701_1 of modulated signal A in FIG. 34(A) and the data transmission regions B701_2 of modulated signal B in 34(B) are generated from the stream #1 data symbol B601_1 at the k'th time in FIG. 33(A) and the stream #2 data symbol B601_2 at the k'th time in FIG. 33(B). Examples of the method of generating include Expression (1) through Expression (21) and so forth, but changing of transmission level using α1, α2, β1, and β2 does not have to be performed.

Also, the relation between "symbol" and "transmission region" in the stream #1 PT-RS symbol B602_1 and stream #2 data PT-RS symbol B602_2 in FIG. 33(A) and FIG. 33(B), and the PT-RS transmission region B702_1 of modulated signal A and the PT-RS transmission region B702_2 of modulated signal B in FIGS. 34(A) and 34(B) is the same as that described using "symbol" in FIG. 5A and FIG. 5B and "transmission region" in FIG. 7 and FIG. 8. That is to say, the PT-RS transmission region B702_1 in FIG. 34(A) and the PT-RS transmission region B702_2 of modulated signal B in 34(B) are generated from the stream #1 PT-RS symbol B602_1 at the k'th time in FIG. 33(A) and the stream #2 PT-RS symbol B602_2 at the k'th time in FIG. 33(B). Examples of the method of generating include Expression (1) through Expression (21) and so forth, but changing of transmission level using α1, α2, β1, and β2 does not have to be performed.

[Signal Configuration Example After Adding Cyclic Prefix]

Figure 35:
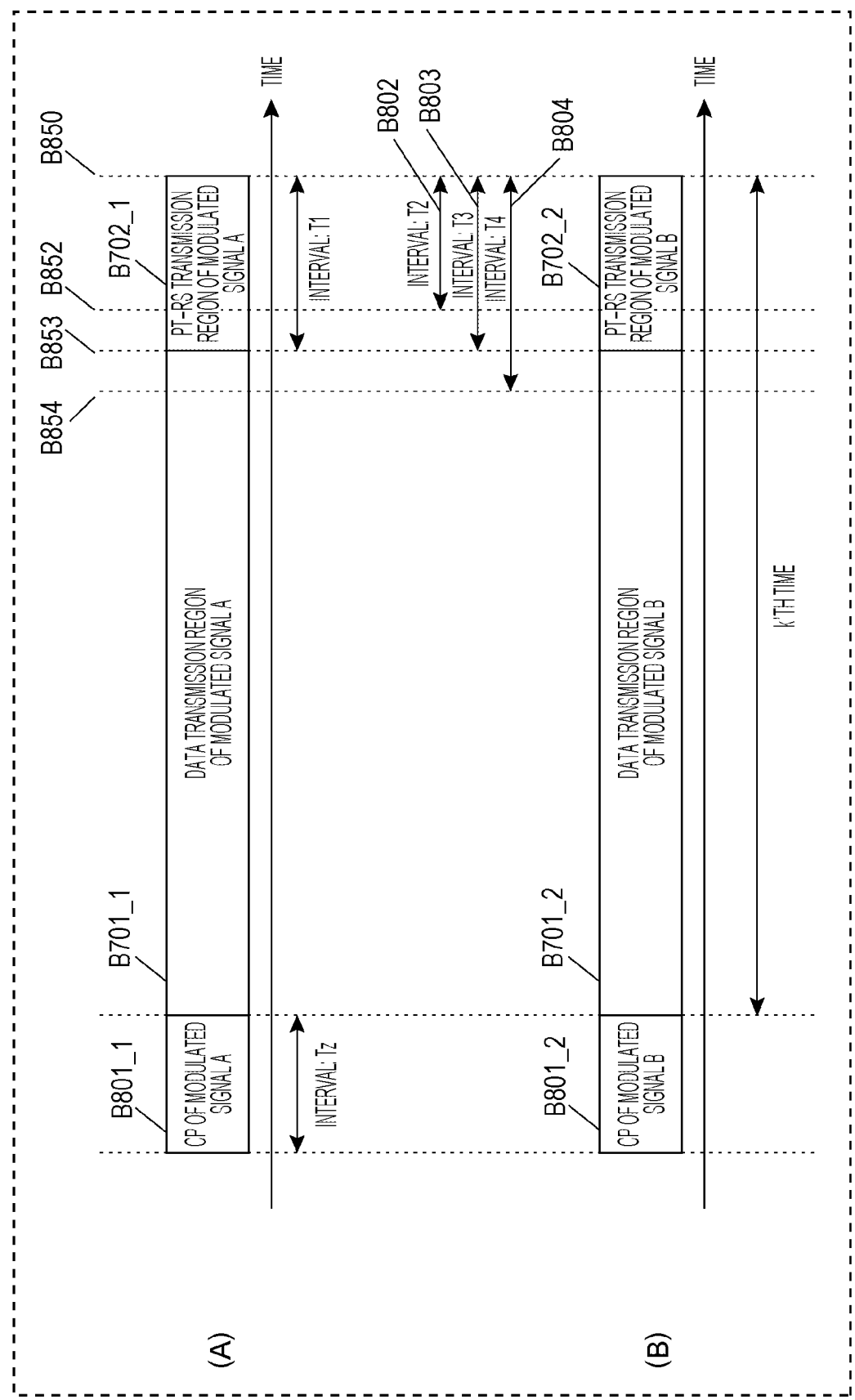
FIG. 35 is a diagram illustrating an example of the signal configuration after addition of a cyclic prefix according to the second embodiment.

FIG. 35(A) and FIG. 35(B) illustrate a configuration example of post-cyclic-prefix-adding signals B118_A and B118_A that are the output from the cyclic prefix adding units B117_A and B117_B in FIG. 28. In FIG. 35(A) and FIG. 35(B), the horizontal axis is time.

Note that configurations in FIG. 35(A) and FIG. 35(B) that are the same as in FIG. 34(A) and FIG. 34(B) are denoted by the same reference numerals, and description thereof will be omitted.

Now, FIG. 34(A) illustrates the DFT-s-OFDM transmission region equivalent to the post-inverse-Fourier-transform signals B116_A in FIG. 28, and FIG. 35(A) illustrates a configuration equivalent to the post-cyclic-prefix-adding signals B118_A that are the output of the cyclic prefix adding unit B117_A in FIG. 28. Accordingly, the signals illustrated in FIG. 35(A) are the signals illustrated in FIG. 34(A) to which a cyclic prefix (i.e., CP (B801_1) of modulated signal A) has been added to the start.

In the same way, FIG. 34(B) illustrates the DFT-s-OFDM transmission region equivalent to the post-inverse-Fourier-transform signal B116_B in FIG. 28, and FIG. 35(B) illustrates a configuration equivalent to the post-cyclic-prefix-adding signals B118_B that are the output of the cyclic prefix adding unit B117_B in FIG. 28. Accordingly, the signals illustrated in FIG. 35(B) are the signals illustrated in FIG. 34(B) to which a cyclic prefix (i.e., CP (B801_2) of modulated signal B) has been added to the start.

Now, taking into consideration the advantage of reduced computation scale at the transmission apparatus (terminal) in FIG. 28, i.e., reduction in circuit scale, it is desirable that the inverse (fast) Fourier transform units (inverse discrete Fourier transform units) B115_A and B115_B perform inverse fast Fourier transform (IFFT: Inverse Fast Fourier Transform) rather than inverse discrete Fourier transform.

Taking this point into consideration, in FIG. 33(A), the sum of the symbol count of stream #1 data symbols and the symbol count of stream #1 PT-RS symbols preferably is 2n symbols (where n is an integer of 1 or greater), such as 4, 8, 16, 32, 64, 128, 256, 512, 1024, 2048, 4096, 8192, 16384, 32768, 65536, and so on. Note that while "symbol" is used here, terms of "chip" and "sample" may be used for expression.

Accordingly, in FIG. 33(A), the sum of the chip count of stream #1 data symbols (data chips) and the chip count of stream #1 PT-RS symbols (PT-RS chips) preferably is 2n chips (where n is an integer of 1 or greater), such as 4, 8, 16, 32, 64, 128, 256, 512, 1024, 2048, 4096, 8192, 16384, 32768, 65536, and so on.

To rephrase this, in FIG. 33(A), the sum of the sample count of stream #1 data symbols (data samples) and the sample count of stream #1 PT-RS symbols (PT-RS samples) preferably is 2n samples (where n is an integer of 1 or greater), such as 4, 8, 16, 32, 64, 128, 256, 512, 1024, 2048, 4096, 8192, 16384, 32768, 65536, and so on.

In the same way, in FIG. 33(B), the sum of the symbol count of stream #2 data symbols and the symbol count of stream #2 PT-RS symbols preferably is 2n symbols (where n is an integer of 1 or greater), such as 4, 8, 16, 32, 64, 128, 256, 512, 1024, 2048, 4096, 8192, 16384, 32768, 65536, and so on.

Accordingly, to rephrase this, in FIG. 33(B), the sum of the chip count of stream #2 data symbols (data chips) and the chip count of stream #2 PT-RS symbols (PT-RS chips) preferably is $2^n$ chips (where n is an integer of 1 or greater), such as 4, 8, 16, 32, 64, 128, 256, 512, 1024, 2048, 4096, 8192, 16384, 32768, 65536, and so on.

To rephrase this further, in FIG. 33(B), the sum of the sample count of stream #2 data symbols (data samples) and the sample count of stream #2 PT-RS symbols (PT-RS samples) preferably is $2^n$ samples (where n is an integer of 1 or greater), such as 4, 8, 16, 32, 64, 128, 256, 512, 1024, 2048, 4096, 8192, 16384, 32768, 65536, and so on.

Accordingly, in FIG. 34(A), the sum of the chip count of data transmission regions of modulated signal A and the chip count of PT-RS transmission regions of modulated signal A preferably is $2^n$ chips (where n is an integer of 1 or greater), such as 4, 8, 16, 32, 64, 128, 256, 512, 1024, 2048, 4096, 8192, 16384, 32768, 65536, and so on.

To rephrase this, in FIG. 34(A), the sum of the sample count of data transmission regions of modulated signal A and the sample count of PT-RS transmission regions of modulated signal A preferably is $2^n$ samples (where n is an integer of 1 or greater), such as 4, 8, 16, 32, 64, 128, 256, 512, 1024, 2048, 4096, 8192, 16384, 32768, 65536, and so on.

In the same way, in FIG. 34(B), the sum of the chip count of data transmission regions of modulated signal B and the chip count of PT-RS transmission regions of modulated signal B preferably is $2^n$ chips (where n is an integer of 1 or greater), such as 4, 8, 16, 32, 64, 128, 256, 512, 1024, 2048, 4096, 8192, 16384, 32768, 65536, and so on.

To rephrase this, in FIG. 34(B), the sum of the sample count of data transmission regions of modulated signal B and the sample count of PT-RS transmission regions of modulated signal B preferably is $2^n$ samples (where n is an integer of 1 or greater), such as 4, 8, 16, 32, 64, 128, 256, 512, 1024, 2048, 4096, 8192, 16384, 32768, 65536, and so on.

[Method of Placing PT-RS Transmission Region in DFT-s-OFMD Transmission Region]

Next, a method of placing PT-RS transmission regions in the DFT-s-OFMD transmission regions illustrated in FIG. 34(A) and FIG. 34(B) will be described with reference to FIG. 35(A) and FIG. 35(B).

Now, the time intervals of the CP (B801_1) of modulated signal A in FIG. 35(A) and the CP (B801_2) of modulated signal B in FIG. 35(B) will be expressed as "Tz".

Also, the time interval of the PT-RS transmission region B702_1 of modulated signal A and the PT-RS transmission region B702_2 of modulated signal B will be expressed as "T1", as illustrated in FIG. 35(A) and FIG. 35(B).

Also, the time interval from a temporally last timing B850 of the PT-RS transmission region B702_1 of modulated signal A and the PT-RS transmission region B702_2 of modulated signal B, to a timing B852, will be expressed as "T2" (B802). T2<T1 holds here.

Also, the time interval from the temporally last timing B850 of the PT-RS transmission region B702_1 of modulated signal A and the PT-RS transmission region B702_2 of modulated signal B, to a timing B853, will be expressed as "T3" (B803). T3=T1 holds here.

Also, the time interval from the temporally last timing B850 of the PT-RS transmission region B702_1 of modulated signal A and the PT-RS transmission region B702_2 of modulated signal B, to a timing B854, will be expressed as "T4" (B804). T4>T1 holds here.

That is to say, the time interval T2 is shorter than the time interval T1 of the PT-RS transmission region, the time interval T3 is equal to the time interval T1 of the PT-RS transmission region, and the time interval T4 is longer than the time interval T1 of the PT-RS transmission region.

Cases where the time interval Tz of the CP (B801_1) of the modulated signal A and the CP (B801_2) of the modulated signal B is time interval T2, T3, and T4, will each be described.

<Case where Tx=T2>

In a case where the time interval Tz=T2 for the CP (B801_1) of the modulated signal A, the cyclic prefix adding unit B117_A copies the temporal waveform of the time interval T2 in FIG. 35(A), and takes this as the temporal waveform of the CP (B801_1) of the modulated signal A. In the same way, the time interval Tz is T2 for the CP (B801_2) of the modulated signal B as well, so the cyclic prefix adding unit B117_B copies the temporal waveform of the time interval T2 in FIG. 35(B), and takes this as the temporal waveform of the CP (B801_2) of the modulated signal B.

In this case, the CP (B801_1) of the modulated signal A is configured of part of the PT-RS transmission region B702_1 of modulated signal A. In the same way, the CP (B801_2) of the modulated signal B is configured of part of the PT-RS transmission region B702_2 of modulated signal B.

Accordingly, the reception apparatus (base station) (omitted from illustration) that is the communication partner of the transmission apparatus (terminal) in FIG. 28 can handle both the CP (B801_1) of the modulated signal A and CP (B801_2) of the modulated signal B in the same way as PT-RS transmission regions. Thus, the advantage of improved phase noise estimation precision can be obtained from the reception apparatus (base station). Also, the reception apparatus will be able to use both of the CP (B801_1) of the modulated signal A and CP (B801_2) of the modulated signal B for time synchronization, frequency synchronization, frequency offset estimation, signal detection, and so forth. This is particularly advantageous in a case where PT-RS symbols are known signals to the transmission apparatus and reception apparatus.

<Case where Tx=T3>

In a case where the time interval Tz=T3 for the CP (B801_1) of the modulated signal A, the cyclic prefix adding unit B117_A copies the temporal waveform of the time interval T3 in FIG. 35(A), and takes this as the temporal waveform of the CP (B801_1) of the modulated signal A. In the same way, the time interval Tz is T3 for the CP (B801_2) of the modulated signal B as well, so the cyclic prefix adding unit B117_B copies the temporal waveform of the time interval T3 in FIG. 35(B), and takes this as the temporal waveform of the CP (B801_2) of the modulated signal B.

In this case, the CP (B801_1) of the modulated signal A is configured of the same temporal waveform as the PT-RS transmission region B702_1 of modulated signal A. In the same way, the CP (B801_2) of the modulated signal B is configured of the same temporal waveform as the PT-RS transmission region B702_2 of modulated signal B.

Accordingly, the reception apparatus (base station) (omitted from illustration) that is the communication partner of the transmission apparatus (terminal) in FIG. 28 can handle both the CP (B801_1) of the modulated signal A and CP (B801_2) of the modulated signal B in the same way as PT-RS transmission regions. Thus, the advantage of improved phase noise estimation precision can be obtained from the reception apparatus (base station). Also, the reception apparatus will be able to use both of the CP (B801_1) of the modulated signal A and CP (B801_2) of the modulated signal B for time synchronization, frequency synchronization, frequency offset estimation, signal detection, and so forth. This is particularly advantageous in a case where PT-RS symbols are known signals to the transmission apparatus and reception apparatus.

<Case where Tx=T4>

In a case where the time interval Tz=T4 for the CP (B801_1) of the modulated signal A, the cyclic prefix adding unit B117_A copies the temporal waveform of the time interval T4 in FIG. 35(A), and takes this as the temporal waveform of the CP (B801_1) of the modulated signal A. In the same way, the time interval Tz is T3 for the CP (B801_2) of the modulated signal B as well, so the cyclic prefix adding unit B117_B copies the temporal waveform of the time interval T4 in FIG. 35(B), and takes this as the temporal waveform of the CP (B801_2) of the modulated signal B.

In this case, the CP (B801_1) of the modulated signal A is configured of the PT-RS transmission region of modulated signal A and part of the data transmission region B701_1 of the modulated signal A. In the same way, the CP (B801_2) of the modulated signal B is configured of the PT-RS transmission region of modulated signal B702_2 and part of the data transmission region B701_2 of the modulated signal B.

Accordingly, the reception apparatus (base station) (omitted from illustration) that is the communication partner of the transmission apparatus (terminal) in FIG. 28 can handle part of the CP (B801_1) of the modulated signal A and CP (B801_2) of the modulated signal B in the same way as PT-RS transmission regions. Thus, the advantage of improved phase noise estimation precision can be obtained from the reception apparatus (base station). Also, the reception apparatus will be able to use part of the CP (B801_1) of the modulated signal A and part of the CP (B801_2) of the modulated signal B for time synchronization, frequency synchronization, frequency offset estimation, signal detection, and so forth. This is particularly advantageous in a case where PT-RS symbols are known signals to the transmission apparatus and reception apparatus.

Thus, in the transmission apparatus, placing the PT-RS transmission regions (PT-RS symbols) at the last portion of the DFT-s-OFMD transmission regions (DFT-s-OFMD symbols) of the modulated signals enables the CPs to be configured of the PT-RS transmission regions (PT-RS symbols). Accordingly, the reception apparatus can use the CPs in phase noise estimation in addition to the PT-RS transmission regions (PT-RS symbols) included in the DFT-s-OFMD transmission regions (DFT-s-OFMD symbols), So precision of estimating phase noise can be improved, and data transmission efficiency can be improved.

[Frame Configuration of Signals After Adding Cyclic Prefix]

Figure 36:
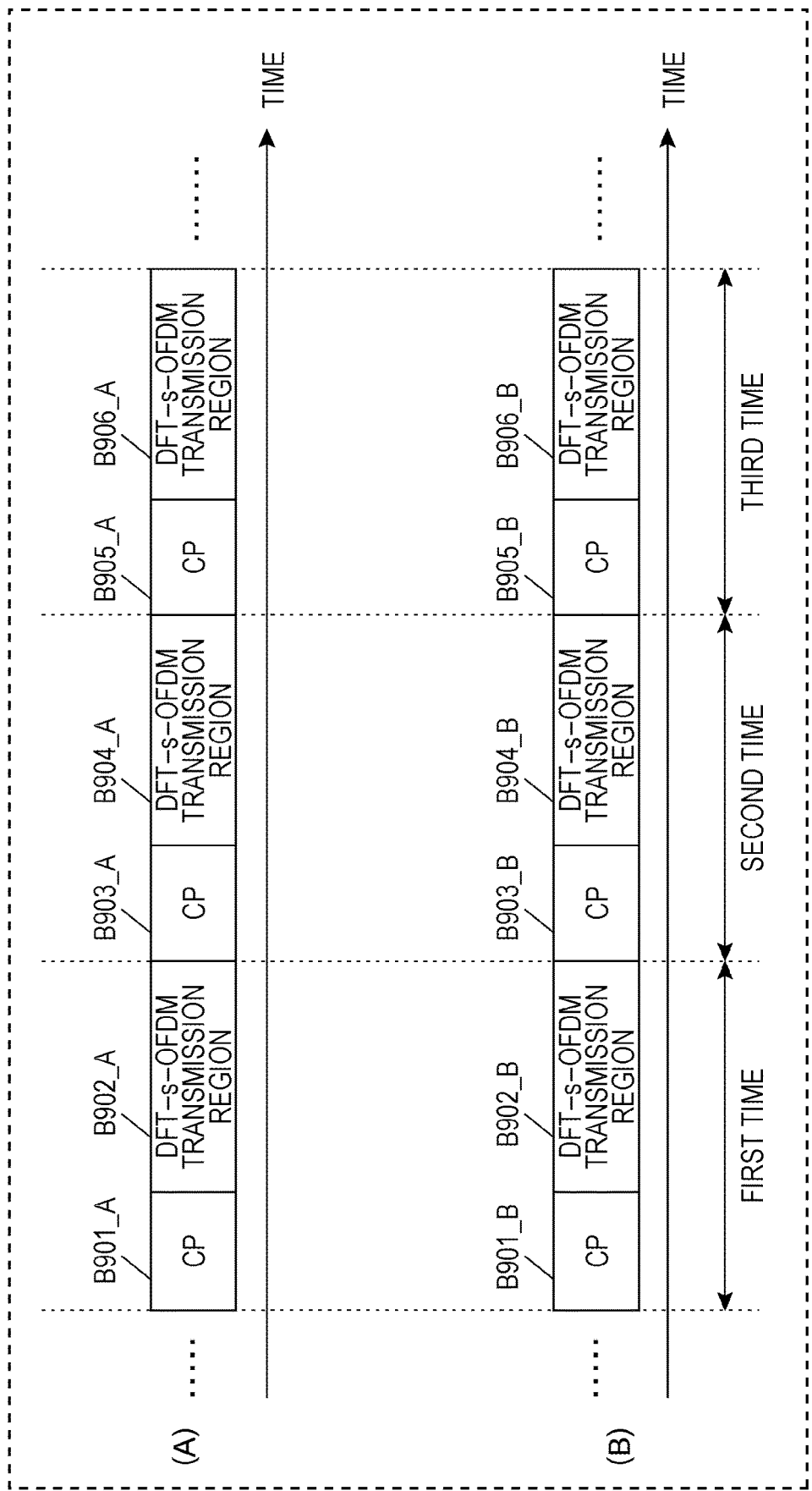
FIG. 36 is a diagram illustrating an example of the frame configuration of signals after addition of a cyclic prefix according to the second embodiment.

FIG. 36(A) and FIG. 36(B) illustrate an example of the frame configuration of signals after adding the cyclic prefix described in FIG. 35(A) and FIG. 35(B). The horizontal axis is time in FIG. 36(A) and FIG. 36(B).

That is to say, FIG. 36(A) illustrates an example of the frame configuration of the post-cyclic-prefix-adding signals B118_A in FIG. 28, and FIG. 36(B) illustrates an example of the frame configuration of the post-cyclic-prefix-adding signals B118_B in FIG. 28.

CPs (B901_A and B901_B) and DFT-s-OFDM transmission regions B902_A and B902_B are signals transmitted by the transmission apparatus (terminal) in FIG. 28 during the first time. CPs (B903_A and B903_B) and DFT-s-OFDM transmission regions B904_A and B904_B are signals transmitted by the transmission apparatus during the second time. CPs (B905_A and B905_B) and DFT-s-OFDM transmission regions B906_A and B906_B are signals transmitted by the transmission apparatus during the third time.

The DFT-s-OFDM transmission regions B902_A, B904_A, and B906_A are configured of the data transmission region B701_1 of the modulated signal A and the PT-RS transmission region B702_1 of the modulated signal A in FIG. 35(A), for example. The CPs (B901_A, B903_A, and B905_A) are configured like the CP (B801_1) of the modulated signal A in FIG. 35(A).

In the same way, the DFT-s-OFDM transmission regions B902_B, B904_B, and B906_B are configured of the data transmission region B701_2 of the modulated signal B and the PT-RS transmission region B702_2 of the modulated signal B in FIG. 35(B), for example. The CPs (B901_B, B903_B, and B905_B) are configured like the CP (B801_2) of the modulated signal B in FIG. 35(B).

Hereinafter, the time intervals of the CPs (B901_A, B901_B, B903_A, B903_B, B905_A, and B905_B) in FIG. 36(A) and FIG. 36(B) will be expressed as "Tz0".

Cases where the time interval Tz0 of the CPs (B901_A, B901_B, B903_A, B903_B, B905_A, and B905_B) is time interval T2, T3, and T4, will each be described here, as described in FIG. 35(A) and FIG. 35(B).

<Case where Tz0=T2>

In this case, the CPs (B901_A, B901_B, B903_A, B903_B, B905_A, and B905_B) are configured of part of the PT-RS transmission regions of the modulated signal, as described in FIG. 35(A) and FIG. 35(B).

Accordingly, looking at the DFT-s-OFDM transmission region B902_A and CP (B903_A), for example, in FIG. 36(A), "PT-RS transmission region of modulated signal A included in DFT-s-OFDM transmission region B902_A (last part) (e.g., see FIG. 35(A))" and "CP (B903_A) configured only of PT-RS transmission region of modulated signal A" are consecutive. Accordingly, the temporally-consecutive PT-RS transmission region is expanded. This point is the same regarding the consecutive region made up of the DFT-s-OFDM transmission region B904_A and CP (B905_A), and so forth.

In the same way, looking at the DFT-s-OFDM transmission region B902_B and CP (B903_B), for example, in FIG. 36(B), "PT-RS transmission region of modulated signal B included in DFT-s-OFDM transmission region B902_B (last part) (e.g., see FIG. 35(B))" and "CP (B903_B) configured only of PT-RS transmission region of modulated signal B" are consecutive. Accordingly, the temporally-consecutive PT-RS transmission region is expanded. This point is the same regarding the consecutive region made up of the DFT-s-OFDM transmission region B904_B and CP (B905_B), and so forth.

Accordingly, an advantage can be obtained in that the reception apparatus (base station) that is the communication partner of the transmission apparatus (terminal) in FIG. 28 can estimate phase noise with high precision using the temporally-consecutive PT-RS transmission regions and CPs (configured of PT-RS transmission regions), and can also perform highly precise channel estimation, time synchronization, frequency synchronization, frequency offset estimation, and signal detection.

<Case where Tz0=T3>

In this case, the CPs (B901_A, B901_B, B903_A, B903_B, B905_A, and B905_B) are configured of the same temporal waveform as the PT-RS transmission regions of the modulated signal, as described in FIG. 35(A) and FIG. 35(B).

Accordingly, looking at the DFT-s-OFDM transmission region B902_A and CP (B903_A), for example, in FIG. 36(A), "PT-RS transmission region of modulated signal A included in DFT-s-OFDM transmission region B902_A (last part) (e.g., see FIG. 35(A))" and "CP (B903_A) configured only of PT-RS transmission region of modulated signal A" are consecutive. Accordingly, the temporally-consecutive PT-RS transmission region is expanded. This point is the same regarding the consecutive region made up of the DFT-s-OFDM transmission region B904_A and CP (B905_A), and so forth.

In the same way, looking at the DFT-s-OFDM transmission region B902_B and CP (B903_B), for example, in FIG. 36(B), "PT-RS transmission region of modulated signal B included in DFT-s-OFDM transmission region B902_B (last part) (e.g., see FIG. 35(B))" and "CP (B903_A) configured only of PT-RS transmission region of modulated signal B" are consecutive. Accordingly, the temporally-consecutive PT-RS transmission region is expanded. This point is the same regarding the consecutive region made up of the DFT-s-OFDM transmission region B904_B and CP (B905_B), and so forth.

Accordingly, an advantage can be obtained in that the reception apparatus (base station) can estimate phase noise with high precision using the temporally-consecutive PT-RS transmission regions and CPs (configured of PT-RS transmission regions), and can also perform highly precise channel estimation, time synchronization, frequency synchronization, frequency offset estimation, and signal detection.

<Case where Tz0=T4>

In this case, the CPs (B901_A, B901_B, B903_A, B903_B, B905_A, and B905_B) are configured of the PT-RS transmission regions of the modulated signal and part of the data transmission regions of the modulated signal, as described in FIG. 35(A) and FIG. 35(B).

Accordingly, looking at the DFT-s-OFDM transmission region B902_A and CP (B903_A), for example, in FIG. 36(A), "PT-RS transmission region of modulated signal A included in DFT-s-OFDM transmission region B902_A" and "CP (B903_A) configured of PT-RS transmission region and data transmission region of modulated signal A" are consecutive. At this time, this temporally-consecutive region has "PT-RS transmission region", "data transmission region", and "PT-RS transmission region" arrayed in that order. Thus, there is a feature in that "PT-RS transmission regions" are non-consecutive.

In the same way, looking at the DFT-s-OFDM transmission region B902_B and CP (B903_B), for example, in FIG. 36(B), "PT-RS transmission region of modulated signal B included in DFT-s-OFDM transmission region B902_B" and "CP (B903_B) configured of PT-RS transmission region and data transmission region of modulated signal B" are consecutive. At this time, this temporally-consecutive region has "PT-RS transmission region", "data transmission region", and "PT-RS transmission region" arrayed in that order. Thus, there is a feature in that "PT-RS transmission regions" are non-consecutive.

Note however, that in the case where Tz0=T4, the reception apparatus (base station) can use CPs in estimation of phase noise, in addition to the PT-RS transmission regions (PT-RS symbols), as described with reference to FIG. 35(A) and FIG. 35(B), so an advantage can be obtained in that phase noise can be estimated with high precision, and highly precise channel estimation, time synchronization, frequency synchronization, frequency offset estimation, and signal detection can also be performed.

Description has been made above regarding each case where the time interval Tz0 of the CPs (B901_A, B901_B, B903_A, B903_B, B905_A, and B905_B) is T2, T3, and T4.

Figure 37:
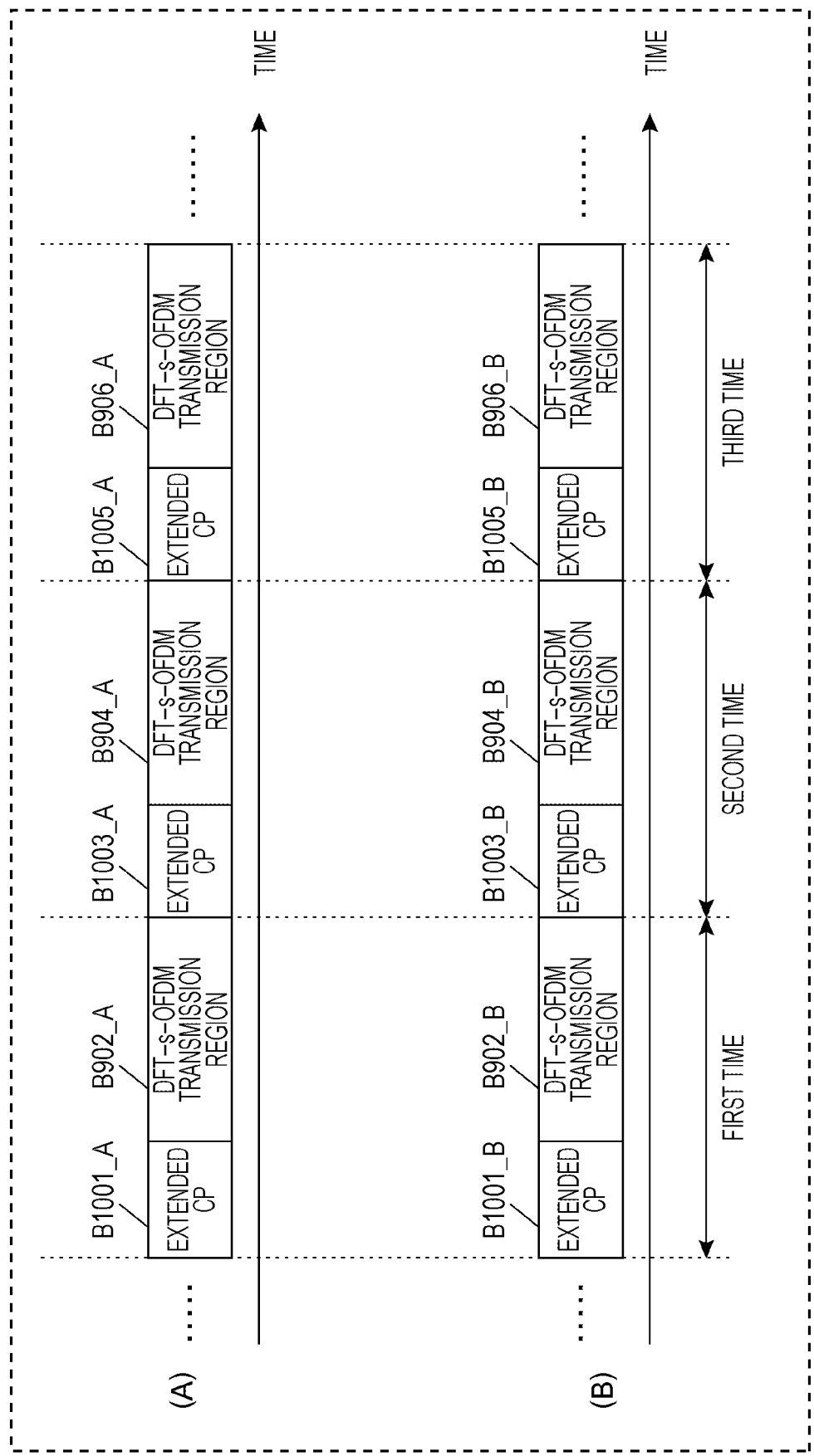
FIG. 37 is a diagram illustrating an example of the frame configuration of signals after addition of an extended cyclic prefix according to the second embodiment.

For example, the transmission apparatus (terminal) in FIG. 28 can select between the transmission in FIG. 36(A) and FIG. 36(B), and the transmission in FIG. 37(A) and FIG. 37(B).

Note that configurations in FIG. 37(A) and FIG. 37(B) that are the same as in FIG. 36(A) and FIG. 36(B) are denoted by the same reference numerals, and description thereof will be omitted. FIG. 37(A) differs from FIG. 36(A) with regard to the point that extended CPs (B1001_A, B1003_A, and B1005_A) have been added instead of the CPs (B901_A, B903_A, and B905_A) in FIG. 36(A). In the same way, FIG. 37(B) differs from FIG. 36(B) with regard to the point that extended CPs (B1001_B, B1003_B, and B1005_B) have been added instead of the CPs (B901_B, B903_B, and B905_B) in FIG. 36(B).

The method of adding extended CPs is the same as the method described with reference to FIG. 35(A) and FIG. 35(B).

In FIG. 37(A) and FIG. 37(B), the time interval of the CPs (B1001_A, B1001_B, B1003_A, B1003_B, B1005_A, and B1005_B) is "Tz1". Tz1>Tz0 holds here.

The benefits and advantages in a case of setting the CP time interval Tz0 in FIG. 36(A) and FIG. 36(B) to T2 (see FIG. 35) and to T3 (se FIG. 35) here is as described above. In the same way, in a case of setting the extended CP time interval Tz1 in FIG. 37(A) and FIG. 37(B) to T2, the temporally-consecutive PT-RS transmission regions can be extended in the same way as where Tz0=T2, so the above described benefits and advantages can be obtained. Also, in a case of setting the extended CP time interval Tz1 in FIG. 37(A) and FIG. 37(B) to T3, the temporally-consecutive PT-RS transmission regions can be extended in the same way as where Tz0=T3, so the above described benefits and advantages can be obtained.

Accordingly, in a case where the transmission apparatus (terminal) illustrated in FIG. 28 is capable of selecting between transmission in FIG. 36(A) and FIG. 36(B), and transmission in FIG. 37(A) and FIG. 37(B), Tz1>Tz0 holds, so the transmission apparatus can obtain the above-described benefits and advantages by satisfying one of Tz1=T2 or Tz1=T3, regardless of whether performing the transmission in FIG. 37(A) and FIG. 37(B) or the transmission in FIG. 36(A) and FIG. 36(B).

The following will be further studied.

An arrangement is made where the transmission apparatus can select one of n methods, from a method where the CP time width (time interval) has a first time width to a method where the CP time width has an n'th time width, and transmit a modulated signal. Note that n is an integer of 2 or greater. Also, a k'th time width is represented by "Tzk". Note that k is an integer of 1 or greater but n or smaller. Of all ks, the greatest value of Tzk is represented by "Tzmax".

In a case where one of Tzmax=T2 or Tzmax=T3 is satisfied, the temporally-consecutive PT-RS transmission regions can be extended, regardless of which of the method where the CP time width has a first time width through the method where the CP time width has an n'th time width the transmission apparatus selects, so the above-described benefits and advantages can be obtained.

Next, a case where the transmission apparatus (terminal) in FIG. 28 transmits modulated signals in FIG. 38(A) and FIG. 38(B) will be described.

Figure 38:
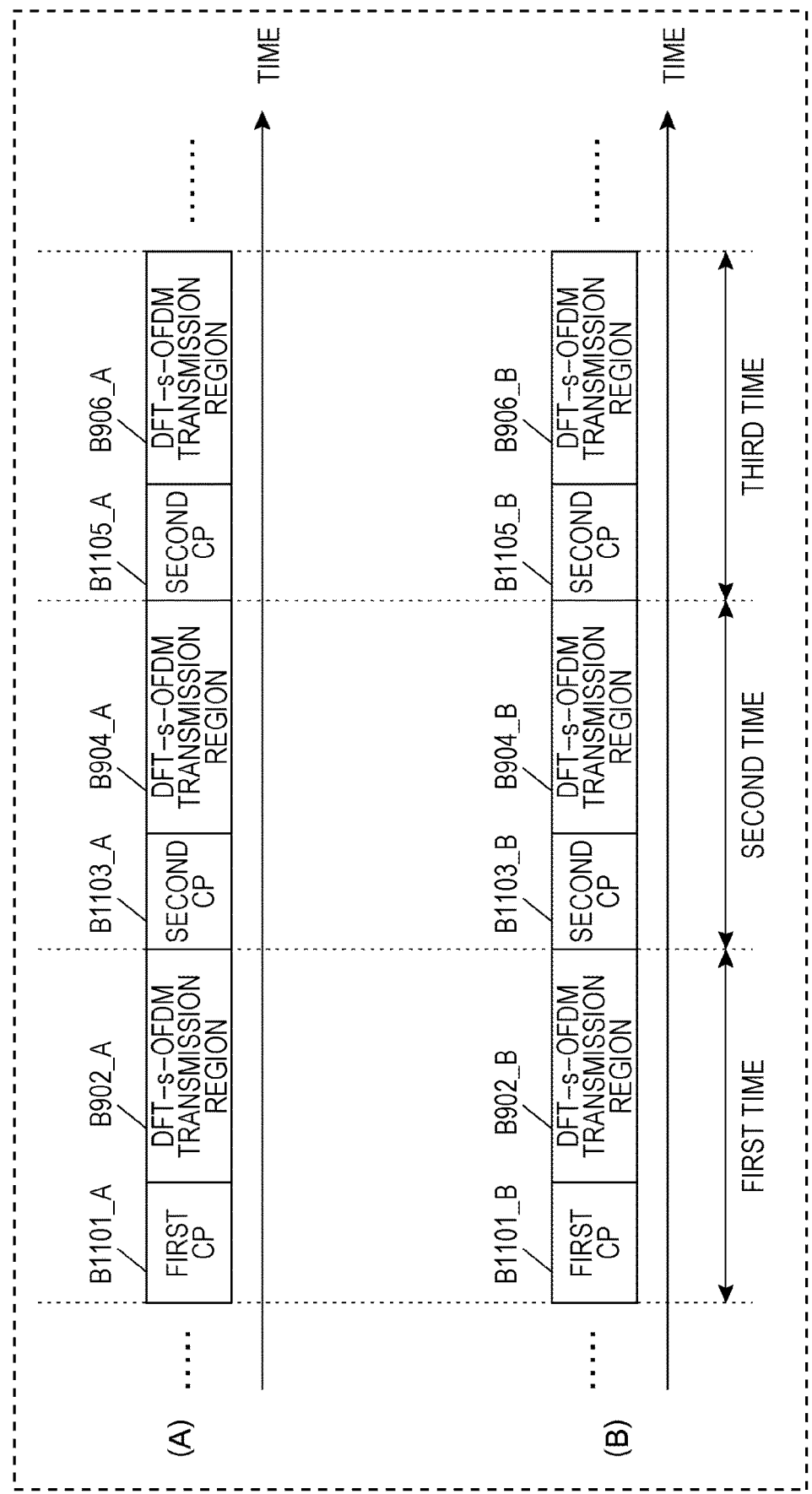
FIG. 38 is a diagram illustrating an example of the frame configuration of signals after addition of a cyclic prefix according to the second embodiment.

Note that configurations in FIG. 38(A) and FIG. 38(B) that are the same as in FIG. 36(A) and FIG. 36(B) are denoted by the same reference numerals, and description thereof will be omitted.

FIG. 38(A) differs from FIG. 36(A) with regard to the point that a first CP (B1101_A), and second CPs (B1103_A and B1105_A), have been added instead of the CPs (B901_A, B903_A, and B905_A) in FIG. 36(A). In the same way, FIG. 38(B) differs from FIG. 36(B) with regard to the point that a first CP (B1101_B), and second CPs (B1103_B and B1105_B), have been added instead of the CPs (B901_B, B903_B, and B905_B) in FIG. 36(B).

The method of adding first CPs and second CPs is the same as the method described with reference to FIG. 35(A) and FIG. 35(B).

In FIG. 38(A) and FIG. 38(B), the time interval of the first CPs (B1101_A, B1101_B) is represented by "Ty1", and the time interval of the second CPs (B1103_A, B1105_A, B1103_B, and B1105_B) is represented by "Ty2". Ty1>Ty2 holds here.

At this time, by setting Ty1=T2 or Ty1=T3 for the first CP time interval in FIG. 38(A) and FIG. 38(B), the temporally-consecutive PT-RS transmission regions can be extended at either boundary of "DFT-s-OFMD transmission regions" and "CPs (first CP and second CP)" due to the relation of Ty1>Ty2, and the above-described benefits and advantages can be obtained.

A DFT-s-OFDM transmission region is present temporally before the first CP (B1101_A). This DFT-s-OFDM transmission region is configured of a DM-RS transmission region, or a data transmission region and PT-RS transmission region. Accordingly, the above-described benefits and advantages can be obtained.

Also, by setting Ty2=T2 or Ty2=T3 for the second CP time interval in FIG. 38(A) and FIG. 38(B), the temporally-consecutive PT-RS transmission regions can be extended at either boundary of "DFT-s-OFMD transmission regions" and "second CPs", and the above-described benefits and advantages can be obtained.

The following will be further studied.

An arrangement is made where the transmission apparatus transmits CPs of n methods, from a method where the CP time width has a first time width to a method where the CP time width has an n'th time width. Note that n is an integer of 2 or greater. Also, a k'th time width is represented by "Tyk". Note that k is an integer of 1 or greater but n or smaller. Of all ks, the greatest value of Tyk is represented by "Tymax".

In a case where one of Tymax=T2 or Tymax=T3 is satisfied, the temporally-consecutive PT-RS transmission regions can be extended with any CP of a CP having the first time width through a CP having an n'th time width, so the above-described benefits and advantages can be obtained.

Thus, in the present embodiment, the transmission apparatus (terminal) maps PT-RS transmission regions at the end of DFT-s-OFMD transmission regions transmitted each transmission time (k'th time). Accordingly, the transmission apparatus can copy the temporal waveforms of the PT-RS transmission region in each transmission time, and add a CP.

Accordingly, in each transmission time (symbol), a reception apparatus (e.g., base station) can use CPs for estimation of phase noise, in addition to the PT-RS transmission regions included in the DFT-s-OFMD transmission regions, so the precision of estimating phase noise can be improved.

Also, the reception apparatus can extend PT-RS transmission regions regarding time region by the PT-RS transmission regions included in DFT-s-OFMD transmission regions and the subsequent CPs, in frames where DFT-s-OFMD transmission regions have been placed, so the precision of estimating phase noise can be improved.

Thus, according to the present embodiment, the reception apparatus can improve the precision of estimating phase noise, and data transmission efficiency can be improved.

First Modification

Although the example illustrated in FIG. 33(A) has been described as a configuration example of the "DFT-s-OFDM symbol" in FIG. 29(A), the configuration of the "DFT-s-OFDM symbol" is not restricted to this. For example, the "DFT-s-OFDM symbol" may include a symbol other than the "stream #1 data symbol" and "stream #1 PT-TS symbol" illustrated in FIG. 33(A). Note however, that the "stream #1 PT-TS symbol" preferably is placed at the end portion of the "DFT-s-OFDM symbol", as described above. Appropriate configuration method and configuration requisites (e.g., time width) for the "stream #1 PT-TS symbol" are as described above.

In the same way, although the example illustrated in FIG. 33(B) has been described as a configuration example of the "DFT-s-OFDM symbol" in FIG. 29(B), the configuration of the "DFT-s-OFDM symbol" is not restricted to this. For example, the "DFT-s-OFDM symbol" may include a symbol other than the "stream #2 data symbol" and "stream #2 PT-TS symbol" illustrated in FIG. B6B. Note however, that the "stream #2 PT-TS symbol" preferably is placed at the end portion of the "DFT-s-OFDM symbol", as described above. Appropriate configuration method and configuration requisites (e.g., time width) for the "stream 21 PT-TS symbol" are as described above.

Figure 39:
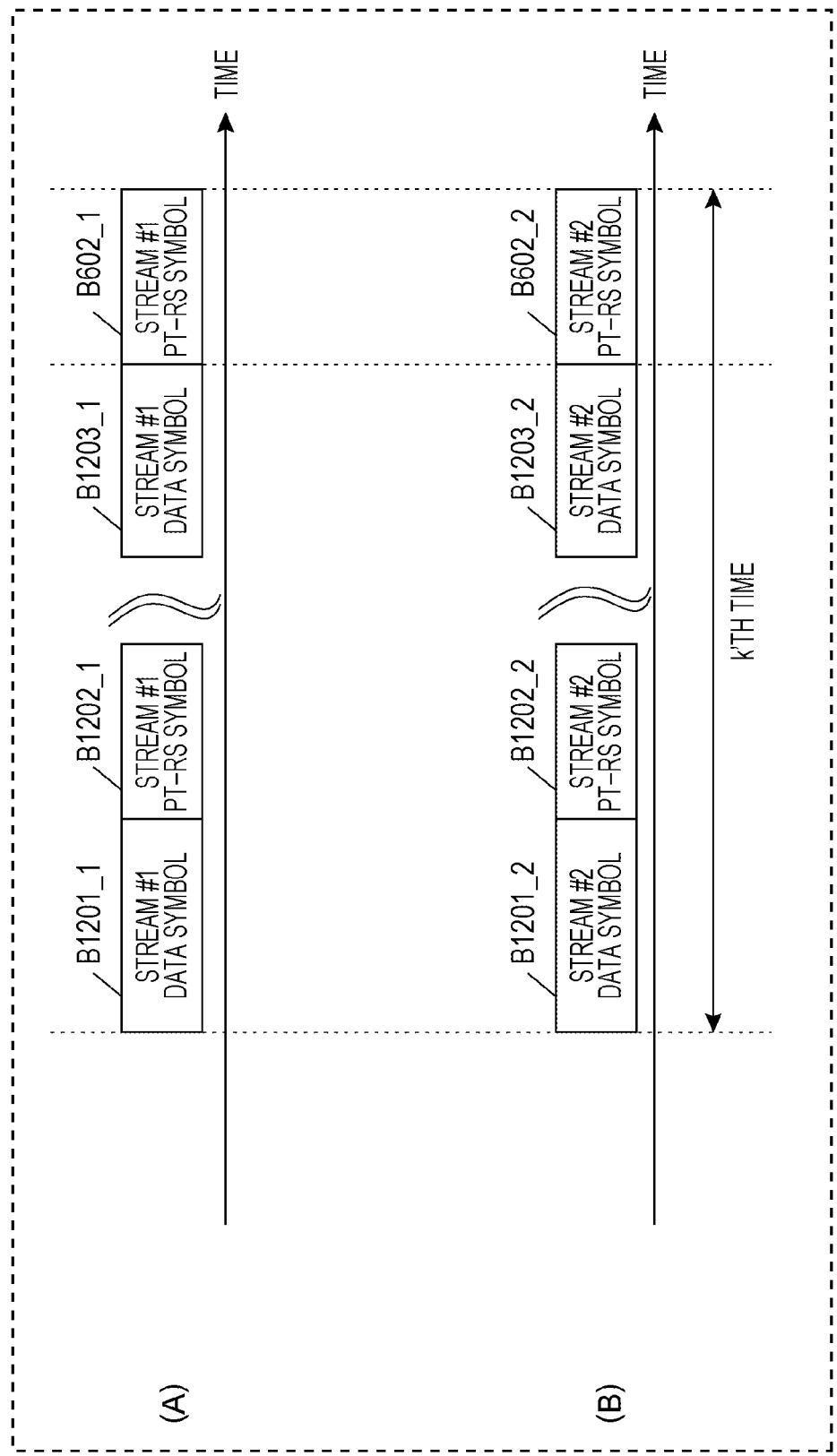
FIG. 39 is a diagram illustrating another example of the configuration of DFT-s-OFDM symbols according to the second embodiment.

For example, in a "DFT-s-OFDM symbol", a stream #1 PT-RS symbol (B1202_1) may be temporally placed before stream #1 data symbols (B1201_1 and B1203_1), as illustrated in FIG. 39(A). Note that as illustrated in FIG. 39(A), the stream #1 PT-TS symbol (B602_1) preferably is placed at the end portion of the DFT-s-OFDM symbol, in the same way as in FIG. 33(A). Appropriate configuration method and configuration requisites (e.g., time width) for the "stream #1 PT-TS symbol" are as described above.

In the same way, in a "DFT-s-OFDM symbol", a stream #2 PT-RS symbol (B1202_2) may be temporally placed before stream #2 data symbols (B1201_2 and B1203_2), as illustrated in FIG. 39(B). Note that as illustrated in FIG. 39(B), the stream #1 PT-RS symbol (B602_2) preferably is placed at the end portion of the DFT-s-OFDM symbol, in the same way as in FIG. 33(B). Appropriate configuration method and configuration requisites (e.g., time width) for the "stream #2 PT-TS symbol" are as described above.

Taking the description of FIG. 33(A) and FIG. 33(B) into consideration, the symbol count of the DFT-s-OFDM symbols (B201_1_1, B201_2_1, and B201_1_3) and (B201_2_1, B201_2_2, and B201_2_3) in FIG. 29(A) and FIG. 29(B) preferably is $2^n$ symbols (where n is an integer of 1 or greater), such as 4, 8, 16, 32, 64, 128, 256, 512, 1024, 2048, 4096, 8192, 16384, 32768, 65536, and so on. Note that while "symbol" is used here, terms of "chip" and "sample" may be used for expression.

Accordingly, taking the description of FIG. 33(A) and FIG. 33(B) into consideration, the symbol count (chip count)

of the DFT-s-OFDM symbols (B201_1_1, B201_2_1, and B201_1_3) and (B201_2_1, B201_2_2, and B201_2_3) in FIG. 29(A) and FIG. 29(B) preferably is $2^n$ chips (where n is an integer of 1 or greater), such as 4, 8, 16, 32, 64, 128, 256, 512, 1024, 2048, 4096, 8192, 16384, 32768, 65536, and so on.

To rephrase this, taking the description of FIG. 33(A) and FIG. 33(B) into consideration, the symbol count (sample count) of the DFT-s-OFDM symbols (B201_1_1, B201_2_1, and B201_1_3) and (B201_2_1, B201_2_2, and B201_2_3) in FIG. 29(A) and FIG. 29(B) preferably is $2^n$ samples (where n is an integer of 1 or greater), such as 4, 8, 16, 32, 64, 128, 256, 512, 1024, 2048, 4096, 8192, 16384, 32768, 65536, and so on.

Also, although an example illustrated in FIG. 34(A) has been described as an example of the configuration of "DFT-s-OFDM transmission region" in FIG. 30(A), the configuration of "DFT-s-OFDM transmission region" is not restricted to this in the present embodiment. For example, the "DFT-s-OFDM transmission region" may include transmission regions other than the "data transmission region of modulated signal A" and "PT-RS transmission region of modulated signal A" illustrated in FIG. 34(A). Note however, that the "PT-TS transmission region of modulated signal A" preferably is placed at the end portion of the "DFT-s-OFDM transmission region" as described above. Appropriate configuration method and configuration requisites (e.g., time width) for the "PT-RS transmission region of modulated signal A" are as described above.

In the same way, although an example illustrated in FIG. 34(B) has been described as an example of the configuration of "DFT-s-OFDM transmission region" in FIG. 30(B), the configuration of "DFT-s-OFDM transmission region" is not restricted to this. For example, the "DFT-s-OFDM transmission region" may include transmission regions other than the "data transmission region of modulated signal B" and "PT-RS transmission region of modulated signal B" illustrated in FIG. 34(B). Note however, that the "PT-TS transmission region of modulated signal B" preferably is placed at the end portion of the "DFT-s-OFDM transmission region" as described above. Appropriate configuration method and configuration requisites (e.g., time width) for the "PT-RS transmission region of modulated signal B" are as described above.

Figure 40:
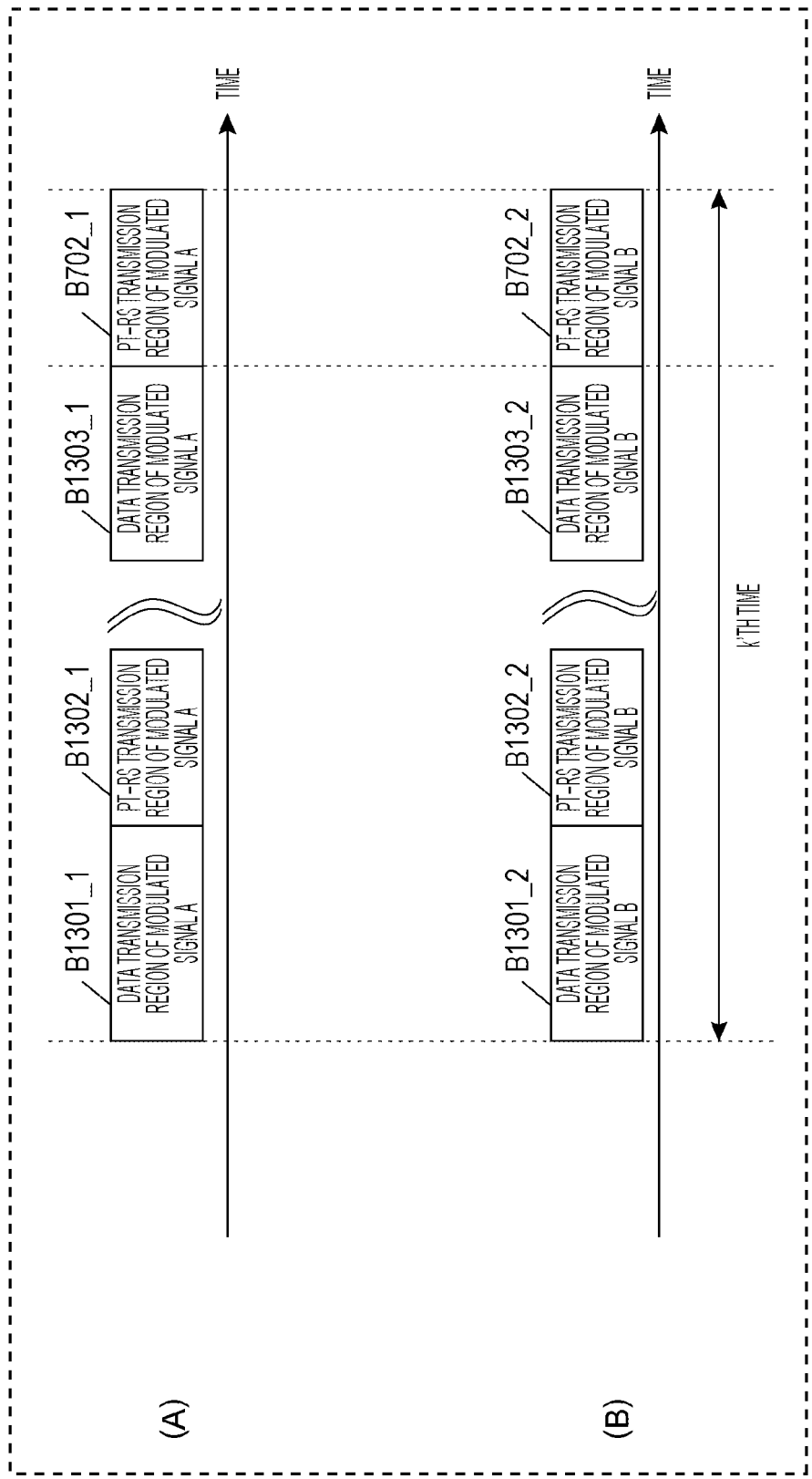
FIG. 40 is a diagram illustrating another example of the DFT-s-OFDM transmission region configuration according to the second embodiment.

For example, in a "DFT-s-OFDM transmission region", a PT-RS transmission region of modulated signal A (B1302_1) may be temporally placed before data transmission regions of modulated signal A (B1301_1 and B1303_1), as illustrated in FIG. 40(A). Note that as illustrated in FIG. 40(A), the PT-TS transmission region of modulated signal A (B702_1) preferably is placed at the end portion of the DFT-s-OFDM transmission region, in the same way as in FIG. 34(A). Appropriate configuration method and configuration requisites (e.g., time width) for the "PT-TS transmission region for modulated signal A" are as described above.

In the same way, in a "DFT-s-OFDM transmission region", a PT-RS transmission region of modulated signal B (B1302_2) may be temporally placed before data transmission regions of modulated signal B (B1301_2 and B1303_2), as illustrated in FIG. 40(B). Note that as illustrated in FIG. 40(B), the PT-TS transmission region of modulated signal B (B702_2) preferably is placed at the end portion of the DFT-s-OFDM transmission region, in the same way as in FIG. 34(B). Appropriate configuration method and configuration requisites (e.g., time width) for the "PT-TS transmission region for modulated signal B" are as described above.

Second Modification

Although MIMO transmission (where a plurality of streams are transmitted using a plurality of antennas) has been described in the above embodiment, the transmission format is not restricted to MIMO transmission.

For example, the transmission apparatus (terminal) illustrated in FIG. 28 may apply a single-stream transmission method.

In this case, at the modulated signal generator B106 illustrated in FIG. 28, for example, the baseband signals B107_1 (stream #1) and the baseband signals B107_2 (stream #2) are the same stream.

An example will be described regarding this point.

For example, the baseband signals B107_1 and the baseband signals B107_2 may be the same modulated signal.

As another example, in a case where a first bit sequence is being transmitted by the baseband signals B107_1, the first bit sequence is transmitted at the baseband signals B107_2 as well.

As another example, assumption will be made that a first symbol that transmits a first bit sequence exists in the baseband signals B107_1. At this time, a symbol that transmits a first bit sequence exists in the baseband signals B107_2.

The baseband signals B107_1 and B107_2 that are the same stream may be transmitted from the antenna unit #A (B121_A) and antenna unit #B (B121_B) that are different, or the baseband signals B107_1 and B107_2 may be transmitted from a plurality of antennas.

Alternatively, an arrangement may be made where, at the modulated signal generator B106 illustrated in FIG. 28, for example, only the baseband signal B107_1 (stream #1) is output, the modulated signal B109_A is output from the processing unit B108, and the modulated signal B109_A is transmitted from one antenna unit #A (B121_A). That is to say, single antenna transmission of a single stream is executed by the modulated signal generator B106 and processing unit B108 outputting modulated signals corresponding to the configuration of one antenna system (e.g., discrete Fourier transform unit B100_A through antenna unit B121_A). Note that precoding is not performed at the processing unit B108 at this time.

Alternatively, an arrangement may be made where, at the modulated signal generator B106 illustrated in FIG. 28, for example, wherein only the baseband signal B107_1 (stream #1) is output, modulated signals B109_A and B109_B subjected to CDD at the processing unit B108 are output, and the modulated signals B109_A and B109_B are transmitted from the two of the antenna unit #A (B121_A) and antenna unit #B (B121_B), respectively. That is to say, multi-antenna transmission of a single stream is executed by the processing unit B108 outputting modulated signals corresponding to the configuration of two antenna systems (e.g., discrete Fourier transform unit B110 through antenna unit B121) with regard to one baseband signal output from the modulated signal generator B106.

Advantages the same as the examples described in the present embodiment can be obtained with regard to a case where the terminal transmits single-stream modulated signals, as described above. For example, arrangements may be made where the terminal transmits FIG. 29(A) out of FIG. 29(A) and FIG. 29(B), the terminal transmits FIG. 30(A) out of FIG. 30(A) and FIG. 30(B), the terminal transmits FIG. 31(A) out of FIG. 31(A) and FIG. 31(B), the terminal transmits FIG. 32(A) out of FIG. 32(A) and FIG. 32(B), the terminal transmits FIG. 33(A) out of FIG. 33(A) and FIG.

33(B), the terminal transmits FIG. 34(A) out of FIG. 34(A) and FIG. 34(B), the terminal transmits FIG. 35(A) out of FIG. 35(A) and FIG. 35(B), the terminal transmits FIG. 36(A) out of FIG. 36(A) and FIG. 36(B), the terminal transmits FIG. 37(A) out of FIG. 37(A) and FIG. 37(B), the terminal transmits FIG. 38(A) out of FIG. 38(A) and FIG. 38(B), the terminal transmits FIG. 39(A) out of FIG. 39(A) and FIG. 39(B), and the terminal transmits FIG. 40(A) out of FIG. 40(A) and FIG. 40(B). Appropriate transmission method, frame configuration method, configuration requisites (e.g., time width), and so forth, are as described above.

The terminal also may transmit single-stream modulated signals of the configuration in FIG. 29(A) and FIG. 29(B). The method of generating the modulated signals in FIG. 29(A) and FIG. 29(B) at this time is as described above. Appropriate transmission method, frame configuration method, configuration requisites (e.g., time width), and so forth, are as described above.

The terminal also may transmit single-stream modulated signals of the configuration in FIG. 30(A) and FIG. 30(B). The method of generating the modulated signals in FIG. 30(A) and FIG. 30(B) at this time is as described above. Appropriate transmission method, frame configuration method, configuration requisites (e.g., time width), and so forth, are as described above.

The terminal also may transmit single-stream modulated signals of the configuration in FIG. 31(A) and FIG. 31(B). The method of generating the modulated signals in FIG. 31(A) and FIG. 31(B) at this time is as described above. Appropriate transmission method, frame configuration method, configuration requisites (e.g., time width), and so forth, are as described above.

The terminal also may transmit single-stream modulated signals of the configuration in FIG. 32(A) and FIG. 32(B). The method of generating the modulated signals in FIG. 32(A) and FIG. 32(B) at this time is as described above. Appropriate transmission method, frame configuration method, configuration requisites (e.g., time width), and so forth, are as described above.

The terminal also may transmit single-stream modulated signals of the configuration in FIG. 33(A) and FIG. 33(B). The method of generating the modulated signals in FIG. 33(A) and FIG. 33(B) at this time is as described above. Appropriate transmission method, frame configuration method, configuration requisites (e.g., time width), and so forth, are as described above.

The terminal also may transmit single-stream modulated signals of the configuration in FIG. 34(A) and FIG. 34(B). The method of generating the modulated signals in FIG. 34(A) and FIG. 34(B) at this time is as described above. Appropriate transmission method, frame configuration method, configuration requisites (e.g., time width), and so forth, are as described above.

The terminal also may transmit single-stream modulated signals of the configuration in FIG. 35(A) and FIG. 35(B). The method of generating the modulated signals in FIG. 35(A) and FIG. 35(B) at this time is as described above. Appropriate transmission method, frame configuration method, configuration requisites (e.g., time width), and so forth, are as described above.

The terminal also may transmit single-stream modulated signals of the configuration in FIG. 36(A) and FIG. 36(B). The method of generating the modulated signals in FIG. 36(A) and FIG. 36(B) at this time is as described above. Appropriate transmission method, frame configuration method, configuration requisites (e.g., time width), and so forth, are as described above.

The terminal also may transmit single-stream modulated signals of the configuration in FIG. 37(A) and FIG. 37(B). The method of generating the modulated signals in FIG. 37(A) and FIG. 37(B) at this time is as described above. Appropriate transmission method, frame configuration method, configuration requisites (e.g., time width), and so forth, are as described above.

The terminal also may transmit single-stream modulated signals of the configuration in FIG. 38(A) and FIG. 38(B). The method of generating the modulated signals in FIG. 38(A) and FIG. 38(B) at this time is as described above. Appropriate transmission method, frame configuration method, configuration requisites (e.g., time width), and so forth, are as described above.

The terminal also may transmit single-stream modulated signals of the configuration in FIG. 39(A) and FIG. 39(B). The method of generating the modulated signals in FIG. 39(A) and FIG. 39(B) at this time is as described above. Appropriate transmission method, frame configuration method, configuration requisites (e.g., time width), and so forth, are as described above.

The terminal also may transmit single-stream modulated signals of the configuration in FIG. 40(A) and FIG. 40(B). The method of generating the modulated signals in FIG. 40(A) and FIG. 40(B) at this time is as described above. Appropriate transmission method, frame configuration method, configuration requisites (e.g., time width), and so forth, are as described above.

Embodiments of the present disclosure have been described above.

It is needless to say that a plurality of embodiments and other contents described in the present specification may be combined and implemented.

The embodiments are only examples, so for example, even if "modulation scheme, error correction encoding format (error correction code used, code length, encoding efficiency, etc.) control information, and so forth" is exemplified, the same configuration can implement application to a different "modulation scheme, error correction encoding format (error correction code used, code length, encoding efficiency, etc.) control information, and so forth".

With regard to the modulation scheme, the embodiments and other contents described in the present specification can be implemented even if a modulation scheme other than a modulation scheme described in the present specification is used. For example, APSK (Amplitude Phase Shift Keying) (e.g., 16APSK, 64APSK, 128APSK, 256APSK, 1024APSK, 4096APSK. Etc.), PAM (Pulse Amplitude Modulation) (e.g., 4PAM, 8PAM, 16PAM, 64 PAM, 128PAM, 256PAM, 1024PAM, 4096PAM, etc.), PSK (Phase Shift Keying) (e.g., BPSK, QPSK, 8PSK, 16PSK, 64PSK, 128PSK, 256PSK, 1024PSK, 4096PSK, etc.), QAM (Quadrature Amplitude Modulation) (e.g., 4 QAM, 8QAM, 16QAM, 64QA, 128QAM, 256QAM, 1024QAM, 4096QAM etc.) or the like may be applied, and uniform mapping or non-uniform mapping may be used in each modulation scheme.

Also, a layout method of 2, 4, 8, 16, 64, 128, 256, 1024, and so forth, signal points on an I-Q plane (modulation scheme having 2, 4, 8, 16, 64, 128, 256, 1024, and so forth, signal points) is not restricted to the signal point layout method of the modulation scheme shown in the present specification. Accordingly, functions of outputting in-phase components and orthogonal components based on a plurality of bits are the functions at the mapping unit, and the subsequently-performed precoding and phase change is an effective function according to an aspect of the present disclosure.

Also, in a case where there is a complex plane, increments of phase such as the argument is expressed as "radian" in the present specification. Using a complex plane allows expression in polar form, as an expression by polar coordinates of a complex number. When a point (a, b) on the complex plane is associated with a complex number z=a+jb (where a and b are both real numbers and j is an imaginary unit), and this point is expressed in polar coordinates as [r, θ], $$a = r \times \cos\theta, b = r \times \sin\theta$$

and $$r = \sqrt{a^2 + b^2}$$ [Math 32]

hold, with r being the absolute value of z (r=|z|), and θ being the argument. z=a+jb is then expressed as $re^{j\theta}$.

A configuration may be made in the present specification where the reception apparatus and antenna are separate. For example, the reception apparatus has an interface that inputs, via a cable, signals which are signals received at the antenna, or signals received at the antenna and subjected to frequency conversion, and the reception apparatus performs subsequent processing. Data/information that the reception apparatus has obtained is later converted into video or audio, and displayed on a display (monitor) or output from a speaker as sound. The data/information that the reception apparatus has obtained may be subjected to signal processing related to video or audio (or does not have to be subjected to signal processing) and output from RCA terminals (video terminal and audio terminals), USB (Universal Serial Bus), HDMI (a registered trademark) (High-Definition Multimedia Interface), digital terminal, or the like.

In the present specification, it is conceivable that the transmission apparatus is provided to, for example, a broadcast station, base station, access point, terminal, cellular phone (mobile phone), and other such communication/broadcast equipment, and at this time, it is conceivable that the reception apparatus is provided to a television set, radio, terminal, personal computer cellular phone, access point, base station, and other such communication equipment. It is also conceivable in the present disclosure that the transmission apparatus and reception apparatus is equipment having communication functions, with the equipment having a form of being connected to a apparatus for executing an application, such as a television set, radio, personal computer, cellular phone, or the like, via some sort of interface. Embodiments have been described in the present specification using the names of base station and terminal, but these are only examples, and what is called "base station" in the embodiments may be called by other names (e.g., access point, terminal, cellular phone, personal computer, etc.), and what is called "terminal" in the embodiments may be called by other names (e.g., access point, base station, cellular phone, personal computer, etc.).

Also, in the embodiments above, symbols other than data symbols, e.g., pilot symbols (preamble, unique word, postamble, reference symbol, etc.), symbols for control information, and so forth, may be laid out any way in a frame. Although the names of pilot symbols and symbols for control information have been given here, any sort of naming may be used, and what is important are the functions themselves.

It is sufficient for pilot symbols to be, for example, a known symbol modulated using PSK modulation at the transmission/reception apparatus (or it is sufficient for the reception apparatus to be able to know the symbol transmitted by the transmission apparatus by the reception apparatus performing synchronization), and the reception apparatus uses this symbol to perform frequency synchronization, time synchronization, channel estimation (estimation of CSI (Channel State Information)) (of the modulated signal), signal detection, and so forth.

Also, symbols for control information are symbols for transmitting information that needs to be transmitted to a communication partner (e.g., modulation scheme, error correction encoding format, and encoding efficiency of error correction encoding format, used in communication, settings information of upper layer, etc.), in order to realize communication of other than data (of an application or the like).

Note that the present disclosure is not restricted to the embodiments, and be carried out with various alterations made. For example, the embodiments describe a case being carried out as a communication apparatus, but this is not restrictive, and this communication method may be carried out as software.

Although a precoding switching method in a method of transmitting two modulated signals from two antennas has been described in the above embodiments, this is not restrictive, and this can be carried out in the same way as a precoding switching method where a precoding weight (matrix) is changed in a method of performing precoding on four post-mapping signals to generate four modulated signals and transmit from four antennas, i.e., a method of performing precoding on N post-mapping signals to generate N modulated signals and transmit from N antennas, in the same way.

Although terms such as "precoding", "precoding weight", and so forth are used in the present specification, the names themselves are irrelevant, with the signal processing itself being important in the present disclosure.

One antenna illustrated in the drawings may be configured of a plurality of antennas, for both the transmitting antenna of the transmission apparatus and the receiving antenna of the reception apparatus.

With regard to the transmission apparatus and reception apparatus, the reception apparatus, which is dependent on a frame that the transmission apparatus transmits, omitted depending on the embodiment, that is necessary for notification of the transmission method (MIMO, SISO, space-time block code, interleaving format), modulation scheme, or error correction encoding format, receives the same, and operations are changed.

Also, an arrangement may be made where a program for executing the above communication method, for example, is stored in ROM (Read Only Memory) beforehand, and a CPU (Central Processor Unit) runs the program.

The program that executes the above communication method may be stored in a computer-readable storage medium, and the program stored in the storage medium recorded in RAM (Random Access Memory) of a computer, and the computer made to operate in accordance with the program.

The configurations such as the above embodiments typically are configured as LSI (Large Scale Integration) that is an integrated circuit. These may be individually formed into one chip, or part or all of configurations of the embodiments may be included in one chip. While description has been made here regarding an LSI, there are different names such as IC (Integrated Circuit), system LSI, super LSI, and ultra LSI, depending on the degree of integration. The circuit integration technique is not restricted to LSIs, and dedicated circuits or general-purpose processors may be used to realize the same. An FPGA (Field Programmable Gate Array) which can be programmed after manufacturing the LSI, or a reconfigurable processor where circuit cell connections and settings within the LSI can be reconfigured, may be used.

Further, in the event of the advent of an integrated circuit technology which would replace LSIs by advance of semiconductor technology or a separate technology derived therefrom, such a technology may be used for integration of the functional blocks, as a matter of course. Application of biotechnology is a possibility.

The present disclosure is broadly applicable to wireless systems where different modulated signals are transmitted from a plurality of antennas. For example, this is suitable for application to a single-carrier MIMO communication system and an OFDM-MIMO communication system. This is also applicable to cases of performing MIMO transmission in a wired communication system having a plurality of transmission locations (e.g., PLC (Power Line Communication) system, optical communication system, DSL (Digital Subscriber Line: digital subscriber line) system), and communication systems using light or visible light.

Also, in the present specification, the reception apparatus that is the communication partner may perform channel estimation by PT-RS transmission regions (PT-RS symbols). The reception apparatus that is the communication partner may also perform phase noise estimation by DM-RS transmission regions (DM-RS symbols).

Other distortion estimation may be performed by PT-RS transmission regions (PT-RS symbols) or DM-RS transmission regions (DM-RS symbols). For example, estimation of intercarrier interference, estimation of inter-symbol interference, estimation of frequency offset, time synchronization, frequency synchronization, and signal detection may be performed.

The number of antennas that transmit modulated signals is not restricted to the number of antennas illustrated in the drawings of the present specification. The embodiments can be carried out in the same way as long as the number of antennas is one or more. Each antenna may be made up of a plurality of antennas.

Although terms such as DM-RS and PT-RS have been used in the present specification, the names are not restricted to this. Any names may be used, such as for example, reference signals (RS: Reference Signal), pilot signals, pilot symbols, reference signals, channel estimation symbols, unique words, and so forth.

INDUSTRIAL APPLICABILITY

The resent disclosure is useful in communication apparatuses such as base stations and terminals.

REFERENCE SIGNS LIST

104_1 through 104_n user #1 modulated signal generator through user #n modulated signal generator
107_A, 107_B multiplexer (signal processing unit)
109_A, 109_B, 703X, 703Y, B119_A, B119_B wireless unit
111_A, 111_B, B121_A, B121_B antenna unit #A, antenna unit #B
113 control information mapping unit
203, B104 error correction encoder
205 mapping unit
207, 306, B108 processor
302 serial/parallel conversion unit
304 inverse Fourier transform unit
701X, 701Y antenna unit #X, antenna unit #Y
705_1, 707_1 modulated signal u1 channel estimating unit
705_2, 707_2 modulated signal u2 channel estimating unit
709 control information demodulator
711, 713 phase noise estimating unit
715 signal processing unit
B106 modulated signal generator
B110_A, B110_B discrete Fourier transform unit
B113_A, B113_B subcarrier mapping unit
B115_A, B115_B inverse (fast) Fourier transform unit
B117_A, B117_B cyclic prefix adding unit

The invention claimed is:

1. An integrated circuit for a reception apparatus comprising:
at least one input which, in operation, receives an input; and
control circuitry coupled to the at least one input, the control circuitry, in operation, controls:
receiving a first data signal and first Reference Signals for Phase Tracking (PT-RS) for the reception apparatus, wherein the first PT-RS is mapped to first resource elements based on a first Modulation and Coding Scheme (MCS) configured for the first data signal; and
estimating a phase noise using the first PT-RS, and
in a case where a modulation scheme of the first MCS is Quadrature Phase Shift Keying (QPSK), assuming that the first PT-RS is not present in a downlink signal.

2. The integrated circuit according to claim 1, wherein presence of the first PT-RS depends on a modulation order corresponding to the first MCS.

3. The integrated circuit according to claim 1, wherein density of PT-RS insertion in a time axis, a frequency axis, or time and frequency domain depends on the first MCS.

4. The integrated circuit according to claim 1, wherein a correction coefficient of transmission power for the first PT-RS and a correction coefficient of transmission power for the first data signal are different from each other.

5. The integrated circuit according to claim 1, comprising:
in a case where a modulation order corresponding to the first MCS is equal to or greater than a threshold value, assuming that the first PT-RS is present with a first mapping pattern; and
in a case where the modulation order is smaller than the threshold value, assuming that the first PT-RS is not present.

6. The integrated circuit according to claim 1, comprising receiving a second data signal and second PT-RS for another reception apparatus, wherein the second PT-RS is mapped to second resource elements based on a second MCS configured for the second data signal and wherein presence of the second PT-RS is determined according to the second MCS.

* * * * *